(12) United States Patent
Morioka et al.

(10) Patent No.: US 7,681,244 B2
(45) Date of Patent: Mar. 16, 2010

(54) PACKET TRANSMITTER APPARATUS

(75) Inventors: Yoshihiro Morioka, Nara (JP); Yasushi Ayaki, Osaka (JP); Naoshi Usuki, Kyoto (JP)

(73) Assignee: Panasonic Corporation, Osaka (JP)

( * ) Notice: Subject to any disclaimer, the term of this patent is extended or adjusted under 35 U.S.C. 154(b) by 951 days.

(21) Appl. No.: 10/582,077

(22) PCT Filed: Dec. 10, 2004

(86) PCT No.: PCT/JP2004/018491

§ 371 (c)(1),
(2), (4) Date: Jun. 8, 2006

(87) PCT Pub. No.: WO2005/057865

PCT Pub. Date: Jun. 23, 2005

(65) Prior Publication Data

US 2007/0162981 A1    Jul. 12, 2007

(30) Foreign Application Priority Data

Dec. 11, 2003  (JP)  ............................. 2003-412979
Sep. 8, 2004   (JP)  ............................. 2004-261033

(51) Int. Cl.
*G06F 7/04*      (2006.01)
*G06F 17/30*     (2006.01)
*H04N 7/16*      (2006.01)
*G06F 9/00*      (2006.01)
*G06F 15/16*     (2006.01)
*G06F 17/00*     (2006.01)
*G06F 11/30*     (2006.01)
*G06F 12/14*     (2006.01)
*H04N 7/167*     (2006.01)
*H04K 1/00*      (2006.01)

(52) U.S. Cl. ........................... 726/29; 726/14; 713/191; 380/218; 380/255

(58) Field of Classification Search ............... 713/153, 713/163, 168, 191; 380/210, 218, 255; 726/14
See application file for complete search history.

(56) References Cited

U.S. PATENT DOCUMENTS 7,218,738 B2 *  5/2007  Pedlow et al. ............... 380/218

(Continued)

FOREIGN PATENT DOCUMENTS

JP         4-223787         8/1992

(Continued)

*Primary Examiner*—Shin-Hon Chen
(74) *Attorney, Agent, or Firm*—Wenderoth, Lind & Ponack, L.L.P.

(57) ABSTRACT

To provide a packet transmitter apparatus which can transmit contents protected by a content protection technique such as DTCP or the like, using packets such as IP packets which have become widespread.

The packet transmitter apparatus includes a transmitting condition setting management unit (404) which extracts at least one of charge information, playback control information and copy control information of AV data from the inputted non-AV data or AV data and generates, based on the extracted information, encryption mode information indicating an encryption mode which becomes a condition at the time of transmitting the AV data; an encrypted data generation unit (406) which generates encrypted data by encrypting, based on the transmitting condition, the inputted AV data and adding encryption information headers based on the encryption mode information to the encrypted AV data; and a packet generation unit (403) which generates packets by adding packet headers to the generated encrypted data. The transmitting condition is to be determined as a combination of input terminal information, data format information and attribute information.

42 Claims, 33 Drawing Sheets

U.S. PATENT DOCUMENTS

| | | |
|---|---|---|
| 7,433,472 B2 * | 10/2008 | McLean et al. ............. 380/255 |
| 2003/0145329 A1 * | 7/2003 | Candelore .................... 725/87 |
| 2004/0049694 A1 * | 3/2004 | Candelore ................... 713/200 |
| 2007/0271470 A9 * | 11/2007 | Candelore et al. ........... 713/191 |

FOREIGN PATENT DOCUMENTS

| | | |
|---|---|---|
| JP | 11-341040 | 12/1999 |
| JP | 2000-059323 | 2/2000 |
| JP | 2000-287192 | 10/2000 |
| JP | 2000-332745 | 11/2000 |
| JP | 2001-127785 | 5/2001 |
| JP | 2001-285283 | 10/2001 |

* cited by examiner

PACKET TRANSMITTER APPARATUS

TECHNICAL FIELD

The present invention relates to a packet transmitter apparatus which generates IP packets of an encrypted audio and video (AV) stream and transmits the packetized stream using an Ethernet (registered trademark, a wired LAN) such as IEEE 802.3 or a wireless LAN such as IEEE 802.11.

BACKGROUND ART

With recent development of communication techniques, various techniques for transmitting packets efficiently have been provided (for example, refer to Patent Reference 1). As one of these, a Moving Picture Experts Group Transport Stream (MPEG-TS) signal defined in the IEC 61883-4 has been conventionally transmitted by connecting a digital broadcasting tuner with a DVHS system video recorder in a room in a general home, using an IEEE 1394 method digital interface. Here, in the case where broadcast contents have been subjected to content protection such as Copy One Generation, the contents are encrypted and transmitted in order to protect the contents from unauthorized copying. As an example of a scheme for encrypting AV data such as an MPEG-TS obtained by receiving and selecting digital broadcast in this way and transmitting the AV data, the Digital Transmission Content Protection (DTCP) is defined. DTCP is a content protection technique used on a transmission medium such as the IEEE 1394 and a USB. The DTCP method has defined by Digital Transmission Licencing Administrator (DTLA), and described in the following: hyperlink "http://www.dtcp.com" "http://www.dtcp.com"; hyperlink "http://www.dtcp.com/data/dtcp#tut.pdf" "http://www.dtcp.com/data/dtcp#tut.pdf"; hyperlink "http://www.dtcp.com/data/wp#spec.pdf" "http://www.dtcp.com/data/wp#spec.pdf"; and book "*IEEE* 1394*, AV Kiki e no Ouyo* (Appkication to IEEE 1394, and apparatuses)", edited by Shinji Takada, THE NIKKAN KOGYO SHIMBUN, LTD., Chapter 8, Copy Protection, pp. 133 to 149.

An MPEG-TS will be described. A transport stream is composed of transport packets (TS packets). A TS packet is a fixed-length packet of 188 bytes. The length is determined considering consistency with an ATM cell length and applicability in the case of performing error correction coding of a Reed-Solomon code or the like. A TS packet is composed of packet header having a fixed length of 4 bytes, and an adaptation field and a payload each having a variable length. In the packet header, a packet identifier (PID) and various types of flags are defined. According to this PID, the type of TS packet is identified. There may exist both adaptation_field and payload or only one of them. The presence can be identified by a flag (adaptation_field_control) in the packet header. An Adaptation_field has a function of transmitting information such as Program_Clock_Reference (PCR) and a function of stuffing within a TS packet in order to generate a TS packet with a fixed length of 188 bytes. Also, PCR is a timestamp of 27 MHz. The value of the PCR is referred to in order to reproduce a reference time at the time of coding in the System Time Clock (STC) of a decoding apparatus. In a TS of MPEG-2, the STC of the decoding apparatus has a PLL synchronous function by the PCR. In order to stabilize this PLL synchronous function, the transmission interval of the PCR is 0.1 ms at most. An MPEG-PES packet in which individual video streams, audio streams and the like are segmented into payloads of TS packets each of which has an identical PID number, and the TS packets are transmitted. In addition, such PES packet is configured to start with a starting position of a TS packet. Since a transport stream can transmit plural programs, table information is used. The table information indicates relationship between each program included in the stream and the program components such as video and audio streams which constitute the program. This table information is called Program Specific Information (PSI), and a Program Association Table (PAT) and a Program Map Table (PMT) are used. PSI such as a PAT and a PMT are positioned in the payload of a TS packet on a so-called section basis, and transmitted. The PIDs of PMTs corresponding to program numbers are specified in the PAT, and video, audio and additional data included in the corresponding program and the PIDs of the PCRs are described in the PMT. Therefore, with reference to the PAT and PMT, it is possible to extract only the TS packet which constitutes a desired program from among the streams. As a Reference Document concerning TS, there is, for example, "*Gazo & Onsei Asshuku Gijutsu no Subete (Intanetto/dejitaru terebi, mobairu tsushin jidai no hissu gijutsu)* (The Everything of Video and Audio Compression Technology (The Essential Technology in the Internet/a Digital Television and Mobile Communication Era)", CQ Publishing, TECH I, Vol. 4, edited by Hiroshi Fujiwara, Chapter 6, *"Gazo ya Onsei wo Tajuka suru MPEG Shisutemu* (The MPEG System of Multiplexing Video and Audio)", and the book explains TS.

As for logical hierarchical structures concerning a PSI and an SI, a processing procedure example, and a station-selection processing example, they are explained in "*Dejital Hoso jushinki ni okeru Senkyoku Gijutsu* (A Channel Selection Techniqhe by a Digital Broadcast Receiver)", Miyake et. al., SANYO TECHNICAL REVIEW, Vol. 36, June, 2004, No. 74, pp. 31 to 44.

In addition, as for an access control scheme used in digital broadcasting, the ARIB standard and the ARIB STD-B25 define scrambling, specifications of related information and specifications of receivers concerning them. ARIB technical documents, the ARIB TR-B14, and the ARIB TR-B15 define the operation.

FIG. 1A is an example of transmission in the IEEE 1394 of an MPEG-TS using the DTCP method. In the DTCP method, the transmitter side (packet transmitter apparatus) is called source 1801, and the receiver side (packet receiver apparatus) is called sink 1802. Encrypted contents such as an MPEG-TS are transmitted from a source 1801 to a sink 1802 through a network 1803. As supplemental information, an example of a source apparatus and a sink apparatus will also be described in FIG. 1B.

FIG. 2 is a diagram illustrating the outline of a conventional packet communication unit in the DTCP method. Here, both of the packet transmitter unit provided with the source 1801 and the packet receiver unit provided with the sink 1802 in FIG. 1 are shown as packet transmitter and receiver units. First, authentication and key exchange (abbreviated as AKE) according to the DTCP method are performed. In an AKE unit 1901, the setting information of the authentication and key exchange is inputted. This information is transmitted to a packet generation unit 1902. The packet generation unit 1902 generates packets each having a prescribed header, and the packets are outputted to a network 1907. Here, the packet generation unit 1902 generates packets of inputted data using transmitting parameters determined by a transmitting condition setting unit 1903, and transmits the packets. In the receiver side, a packet receiver unit 1904 filters signals to be inputted through the network 1907 by identifying packet headers, and the obtained signals are inputted in the AKE unit 1901. In this way, the AKE unit of the transmitter side (source) and the AKE unit of the receiver side (sink) can perform message communication with each other through the networks 1803 and 1907. In other words, according to the DTCP method, authentication and key exchange are executed.

Once the authentication and key exchange are established between the transmitter side (source) and the receiver side (sink), AV data is transmitted next. In the source, an MPEG-TS signal is inputted into an encryption unit 1905, and encrypts the MPEG-TS signal. Subsequently, this encrypted MPEG-TS signal is inputted into the packet generation unit 1902, and outputted to the network 1907. In the sink, the packet receiver unit 1904 filters signals to be inputted through the network 1907 by identifying packets based on packet headers, and the obtained signals are inputted into the decryption unit 1906, and the decrypted MPEG-TS signal are outputted.

Next, a supplemental description of the above procedure will be provided next with reference to FIG. 3. In FIG. 3, the source and the sink are connected through the IEEE 1394. First, a content transmission request is made in the source side. Subsequently, encrypted contents and content protection mode information are transmitted from the source to the sink. The sink analyzes the copy protection information of the contents, determines the authentication method among a full authentication and a restricted authentication, and transmits the authentication request to the source. The source and the sink share an authentication key according to the processing prescribed in the DTCP. Subsequently, the source encrypts an exchange key using the authentication key, and transmits the encrypted exchange key to the sink. The sink decrypts the exchange key. The source generates seed information which changes as time passes in order to change the encryption key temporally, and transmits it to the sink. The source generates an encryption key, based on the exchange key and the seed information. The source causes the encryption unit to encrypt the MPEG-TS using this encryption key and transmits it to the sink. The sink receives the seed information, and restores a decryption key, based on the exchange key and the seed information. The sink decrypts the encrypted MPEG-TS signal, based on this decryption key.

FIG. 4 is an example of an IEEE 1394 isochronous packet in the case of transmitting an MPEG-TS signal in FIG. 1. Each of these packets is composed of a header of 4 bytes (32 bits), a header CRC of 4 bytes (32 bits), a data field of 224 bytes, and a trailer of 4 bytes (32 bits). Among the CIP header and TS signal which constitute the data field of 224 bytes, only the TS signal is encrypted before being transmitted. Here, the information which is unique to the DTCP method is a 2-bit Encryption Mode Indicator (EMI) which is copy protection information and an Odd/Even (O/E) which is the LSB of the seed information. Since they exist in the header of the above 32 bits, they are transmitted without being encrypted.

However, in the above conventional technique, there are the following problems. The conventional DTCP method is intended for transmitting an MPEG-TS signal using isochronous packet in real time in the IEEE 1394. However, it has a big problem that it cannot transmit the MPEG-TS signal through the networks such as the Ethernet (registered trademark) (IEEE 802.3), the wireless LAN (IEEE 802.11), and other networks which are available for transmission of IP packets, using the Internet Protocol (IP) which is the standard protocol of the Internet.

In other words, it has a big problem that it cannot transmit contents subjected to digital copyright protection such as ground/BS digital broadcasting and server broadcasting between the packet transmitter apparatus and the packet receiver apparatus which are logically connected through IP, while protecting the copyright of the contents.

In addition, in the case of using the HyperText Transfer Protocol (HTTP) in live-broadcast transmission, a receiver side needs to calculate a header length to be added in the encryption and the transmission content length, each time an HTTP request is made. Therefore, it has a problem that the processing load in a receiver side is heavy.

Further, it has a problem that it has difficulty in performing trick playback of contents stored in a hard disc or the like in a simple manner. Such trick playback includes fast forwarding, rewinding and slow playback.

Further, it has a problem that it has difficulty in performing trick playback of contents which have different storage formats and are stored in a hard disc, an optical disc or the like using a common scheme in a simple manner. Such trick playback includes fast forwarding, rewinding and slow playback. As an example of local operations (at an apparatus body) not operations via a network, as to trick playback in an apparatus body of Blu-ray disc scheme, the following explains the EP_map data structure for trick playback: "Logical Specifications and Content Protection System of Bru-ray Disk Rewritable Format (2)" in the Matsushita Technical Journal, October, 2004, pp. 34 to 38.

In particular, in a home, a digital television or a home server or the like needs to distribute contents which are subjected to digital copyright protection and obtained through broadcasting or the like to various types of apparatuses which are set in the home. Accordingly, it is necessary in the home to distribute contents according to the DTCP method in a form of wide-spread IP packets in order to enable content transfer between apparatuses of various manufacturers, while protecting the copyrights of the contents. In other words, there is a need to realize the Digital Transmission Contents Protection over IP (DTCP-IP).

(Patent Reference 1) Japanese Laid-Open Patent Application No. 2000-59463.

DISCLOSURE OF INVENTION

Problems that Invention is to Solve

An object of the present invention is to provide a packet transmitter apparatus which is capable of transmitting contents protected by a content protection technique such as DTCP using HTTP and RTP in a form of wide-spread packets such as IP packets.

Means to Solve the Problems

In order to achieve the above object, the packet transmitter apparatus of the present invention is intended for transmitting packet data to a packet receiver apparatus. The packet transmitter apparatus includes: an audio and video (AV) data information obtainment unit which obtains AV data information including input terminal information indicating a terminal to which AV data is inputted, data format information indicating the data format of the AV data, and attribute information indicating the attribute of the AV data; a data input unit which receives the AV data and non-AV data; a transmitting condition setting management unit which extracts at least one of charge information, playback control information and copy control information of the AV data, from the non-AV data or the AV data, and generates, based on the extracted information, encryption mode information indicating an encryption mode which serves as a condition at the time when the AV data is transmitted; an encrypted data generation unit which generates encrypted data by encrypting, based on transmitting conditions determined as a combination of the input terminal information, the data format information and the attribute information, the AV data received by the data input unit, and adding encryption information headers based on the encryption mode information to the encrypted AV data; a packet generation unit which generates packets by adding packet headers to the encrypted data generated by the encrypted data generation unit; an authentication unit which performs authentication processing with the packet receiver apparatus; a transmission protocol determination unit which determines a transmission protocol of the AV data between the packet transmitter apparatus and the packet receiver apparatus, using at least one of the input terminal information, the attribute information and information indicating a transmission mode specified by the packet receiver apparatus; and a transmission unit which transmits the packets including the encrypted data generated by the packet generation unit to the packet receiver apparatus according to the transmission protocol determined by the transmission protocol determination unit, after the authentication processing with the packet receiver apparatus is completed.

More specifically, according to a first invention, a packet transmitter and receiver unit includes: a data input unit which inputs AV data and non-AV data respectively; an encrypted data generation unit which inputs outputs of the data input unit and "executes encryption or addition of an encryption information header" according to prescribed receiving conditions; and a packet header addition unit. The encrypted data generation unit includes an authentication unit, an encryption unit and an encrypted information header addition unit, and includes a control unit which controls the encryption unit to or not to execute encryption according to the prescribed transmitting and receiving conditions and controls the encryption information header addition unit to or not to perform addition of encryption information headers. In this way, an encryption mode is determined according to transmitting conditions by a predetermined rule provided from outside an AV stream such as an MPEG-TS signal, and further addition of encryption information header is determined. This makes it possible to maintain confidentiality of an AV stream, securing compatibility of signals between packet transmitter and receiver apparatuses and using HTTP and RIP.

According to a second invention, the mode for executing authentication is determined based on control information inputted from outside in the authentication unit in the first invention. For example, it provides a Uniform Resource Identifier (URI) specifying an access position of each contents, as control information to be inputted from outside, and determines an authentication mode according to the URI format. For example, in the case where the URI is extended by a Query, authentication is needed. The Query information makes it possible to provide a Transmission Control Protocol (TCP) port number for authentication. In this way, it becomes possible to determine the authentication execution mode, based on the control information to be inputted from outside.

A third invention is characterized by following a copy control information (CCI) of the AV stream as the prescribed transmitting conditions to be provided from outside in the encrypted data generation unit in the first invention, and it determines an encryption mode and addition of encryption information headers. In this way, it determines an encryption mode of the AV stream such as an MPEG-TS signal according to the copy control information, adds encryption information headers. Subsequently, it generates packets of the AV stream and then transmits the packets, succeeding the copy control mode which has been set by the copyright owner of the AV contents. In other words, since the processing by a prescribed rule is performed, it becomes possible to secure compatibility of signals between packet transmitter and receiver apparatuses protecting the copyright of the AV contents.

A fourth invention inputs the AV data and non-AV data in the first invention into data buffers respectively, and outputs them to the packet header addition unit by performing output priority control of these two buffers. For example, it preferentially outputs the AV data from the data buffer while controlling the buffer of the non-AV data in order not to overflow. In this way, it becomes possible to preferentially transmit data with high importance among the AV data and the non-AV data.

A fifth invention adds a timestamp to each data block which constitutes AV data in the first invention, and maps integrated one or more data blocks with timestamps onto the payload part of a Real-time Transport Protocol (RTP) packet or the payload part of an HTTP packet. For example, in the case of MPEG-TS AV data, it adds a timestamp to each TS packet, and maps integrated TS packets with timestamps onto an RTP packet or an HTTP packet. For example, it is possible to use an MPEG system clock frequency as the clock of timestamps to be added to the respective TS packets. By the timestamps added to the TS packets, it becomes possible to remove transmission jitters added to a Program Clock Reference (PCR) when an MPEG-TS is transmitted through a network and enable a receiver side to restore the MPEG system clock.

A sixth invention, according to the first invention, relates to generating packets of AV data by means that the receiver side performs switching control of RTP and HTTP. For example, it generates AV data packets using RTP which provides small delays in the case where AV data output of the receiver side is outputted to the display of the receiver side, or using HTTP which reduces the number of packet losses in the case where AV data output is stored in a storage medium. In this way, in the case where the receiver side outputs the AV data to the display by performing switching control, it becomes possible to transmit AV contents at a low delay rate and to transmit AV contents which become high quality through compensation of a signal loss due to a packet loss.

A seventh invention includes a data input unit which respectively inputs AV data and non-AV data subjected to digital copyright protection such as Right Management & Protection (RMP) including charge processing, and a unit which is capable of inputting outputs of the data input unit and selecting an encryption transmission mode according to a digital copyright rule to be inputted. In other words, a packet transmitter and receiver unit which includes an encrypted data generation unit which executes encryption and a packet header addition unit which executes addition of encryption information headers. The encrypted data generation unit includes an authentication unit, an encryption unit and an encryption information header addition unit. Additionally, it includes a control unit which controls the encryption unit to or not to execute encryption based on the prescribed transmitting and receiving conditions and controls the encryption information header addition unit to or not to execute addition of encryption information headers.

In this way, it determines an encryption mode of an AV stream such as an MPEG-TS signal, which is subjected to digital copyright protection such as RMP information including charge processing, according to transmitting conditions by a predetermined rule provided from outside and further determines addition of encryption information headers. This makes it possible to maintain confidentiality of an AV stream securing compatibility of a signal between packet transmitter and receiver apparatuses An eighth invention can reduce the processing load of the receiver side by transmitting contents which are being live-broadcast using the HTTP chunk transmission scheme. With the chunk transmission scheme, it becomes unnecessary that the receiver side (client) calculates header lengths and transmission content lengths to be added concerning the encryption each time an HTTP request is made.

A ninth invention, according to the seventh invention, can realize trick playback such as fast forwarding, rewinding and slow playback by transmitting contents stored in a hard disc and the like using a range request of HTTP in a simple manner.

Further, a tenth invention, according to the ninth invention, can realize high-quality trick playback such as slow playback, fast forwarding and rewinding by generating frame position information of I, P and B pictures as common formats according to byte position information and time information of I, P and B pictures having different contents and different storage formats which are stored in a hard disc or an optical disc.

Note that the present invention can be realized not only as a packet transmitter apparatus like this but also as a packet transmitting method, as a program for a packet transmitter apparatus, and as a recording medium such as a computer-readable CD-ROM on which the program is recorded.

Effects of the Invention

With the first invention, an encryption mode in transmission of the AV contents is determined according to a predetermined rule provided from outside. Further, since a rule for adding encryption information headers is determined, it is possible to secure compatibility of a signal maintaining confidentiality of the AV stream between packet transmitter and receiver apparatuses.

With the second invention, in the authentication unit in the first invention, an authentication execution mode is determined based on control information of outside input. For example, a URI specifying an access position of each contents can be provided as control information inputted from outside, and each authentication mode is determined according to the URI format. As an example, in the case where the URI is extended by a Query format, information indicating that authentication is needed and the information of a TCP port number for authentication according to the Query information can be provided at the same time. In this way, an authentication execution mode can be determined based on control information to be inputted from outside.

With the third invention of the present invention, in the encrypted data generation in the first invention, the AV stream's copy control information is complied with as prescribed transmitting conditions provided from outside, and an encryption mode and addition of encryption information headers are determined. In this way, an encryption mode of the AV stream such as an MPEG-TS signal is determined according to the copy control information, and encryption information headers are added. Subsequently, packets of the AV data are generated and transmitted. Therefore, the packets are transmitted succeeding the copy control mode which has been set by the copyright owner of the AV contents. In other words, since processing by a predetermined rule can be performed, it becomes possible to secure compatibility of a signal between packet transmitter and receiver apparatuses protecting the copyright of the AV contents.

With the fourth invention, the AV data and non-AV data in the first invention are inputted into data buffers respectively, and outputted to the packet header addition unit while output priority control of these two buffers is performed. For example, the AV data is outputted preferentially from the data buffer while the buffer of the non-AV data is being controlled in order not to overflow. In this way, it becomes possible to preferentially transmit data with high importance among the AV data and the non-AV data.

With the fifth invention, a timestamp is added to each data block which constitutes the AV data in the first invention, and integrated one or more data blocks with timestamps are mapped onto the payload part of an RTP packet or the payload part of an HTTP packet. For example, in the case of MPEG-TS AV data, a timestamp is added to each TS packet, and integrated TS packets with timestamps are mapped onto an RTP packet or an HTTP packet. For example, it is possible to use an MPEG system clock frequency as the clock of timestamps to be added to the respective TS packets. With the timestamps added to the TS packets, it becomes possible to remove transmission jitters added to a Program Clock Reference (PCR) when an MPEG-TS is transmitted through a network and enable a receiver side to restore the MPEG system clock.

With the sixth invention of the present invention, packets of AV data in the first invention are generated by means that the receiver side performs switching control of RTP and HTTP. For example, AV data packets are generated using RTP which provides small delays in the case where AV data output is outputted to the display of the receiver side. AV data packets are generated using HTTP which reduces the number of packet losses in the case where AV data output is stored in a storage medium. In this way, in the case where the receiver side outputs the AV contents to the display by performing switching control, it becomes possible to transmit AV contents at a low delay rate and to transmit AV contents which become high quality through compensation of a signal loss due to a packet loss.

In addition, with the above invention, as to transmission of AV contents using a network, data bugging on the network is prevented and secure high-quality data transmission is realized. In this way, even in the case where a public net such as the Internet is used as a transmission path, it is possible to prevent bugging and leakage of priority data (AV data contents) to be transmitted in real time. In addition, it becomes possible to sell and charge AV data to be transmitted using the Internet or the like and to sell and distribute high-secure contents of Business to Business (B-B) and Business to Consumer (B-C).

In addition, with the above invention, even in the case where AV contents are transmitted using hardware, software processing of general data packets are conventionally performed using a CPU. Hence, the addition of software makes it possible to transmit management information and control information as general data. Since the data amount of the information is very small compared to the AV data which is priority data, they can be realized using an inexpensive microprocessor such as a microcomputer, and thus a low-cost system can be realized. Note that no costly CPU and large scale memory are required even for the protocol processing of priority packets which require a high load and a high transmission rate. In view of this, it is possible to provide a low-cost and high-function apparatus.

In addition, with the seventh invention, attribute information of AV contents, which can be detected in a digital broadcasting signal to be received via ground broadcasting, satellite broadcasting, CATV or the Internet, is transmitted between the transmitter terminal and the receiver terminal using a data exchange protocol such as Universal Plug and Play (UPnP)-AV or HTTP. This makes it possible to determine an encryption mode and a transmission method of content attribute information in the case where AV contents are transmitted between the transmitter terminal and the receiver terminal. Further, a rule for adding encryption information headers is determined. Therefore, it becomes possible to secure compatibility of a signal maintaining confidentiality of an AV stream between packet transmitter and receiver apparatuses. The standard specifications of UPnP or UPnP-AV are made public in http://upnp.org. in http://upnp.org, for example, as to "MediaServer V 1.0 and MediaRenderer V 1.0", specifications of "MediaServer V 1.0", "MediaRenderer V 1.0", "ConnectionManager V 1.0", "ContentDirectory V 1.0", "RenderingControl V 1.0", "AVTransport V 1.0", "UPnP® AV Architecture V. 83" are made public.

In addition, as to transmission of AV contents using a network, data bugging on the network is prevented and highly-secure data transmission is realized. In this way, even in the case where a public network such as the Internet is used as a transmission path, it is possible to prevent bugging and leakage of priority data (AV data contents) to be transmitted in real time. In addition, it becomes possible to sell and charge AV data to be transmitted using the Internet or the like, and to sell and distribute highly secure contents of B-B and B-C.

In addition, even in the case where AV contents are transmitted using hardware, software processing of general data packets can be performed using a CPU conventionally. Hence, the addition of software makes it possible to transmit data such as management information and control information as general data. The data amount of them is very small compared to the AV data which is priority data. Therefore, they can be realized using an inexpensive microprocessor such as a microcomputer, and a low-cost system can be realized. Note that no costly CPU and a large scale memory are required even for the protocol processing of priority packets which require a high load and a transmission rate. In view of this, it is possible to provide a low-cost and high-function apparatus.

In addition, this enables a client which is not compliant with RMP to view contents with a viewing or copying restriction by Right management & Protection Information (RMPI) including charge information used in the RMP of server broadcasting in Copy No More (CNM) or Copy Never (CN), and to accelerate propagation of server broadcasting.

With the eighth invention, the processing load of the receiver side can be reduced by transmitting contents which are being live-broadcast using the HTTP chunk transmission scheme. With the chunk transmission scheme, it becomes unnecessary that the receiver side (client) calculates header lengths and transmission content lengths to be added concerning the encryption each time an HTTP request is made.

With the ninth invention, trick playback such as fast forwarding, rewinding and slow playback can be realized by transmitting contents stored in a hard disc and the like using an HTTP range request in a simple manner.

Further, with the tenth invention, in the ninth invention, trick playback such as slow playback, fast forwarding and rewinding can be realized by generating common I-frame position information according to I-frame position information having different contents and different storage formats which are stored in a hard disc or an optical disc.

NUMERAL REFERENCES

Figure 1:
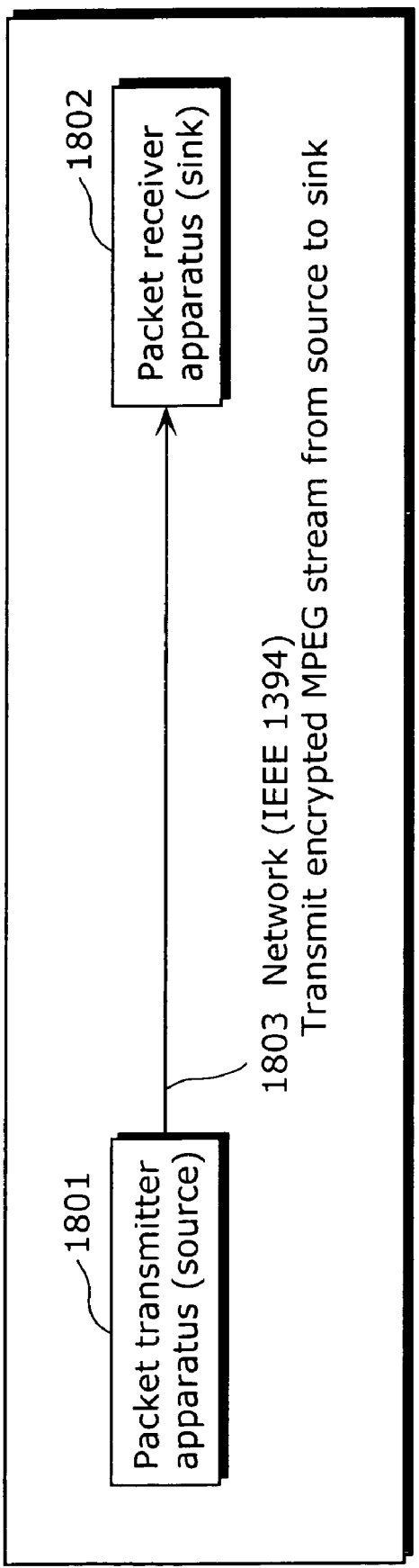
FIGS. 1A and 1B each is an illustration of a transmitting and receiving system in a conventional technique.
Figure 2:
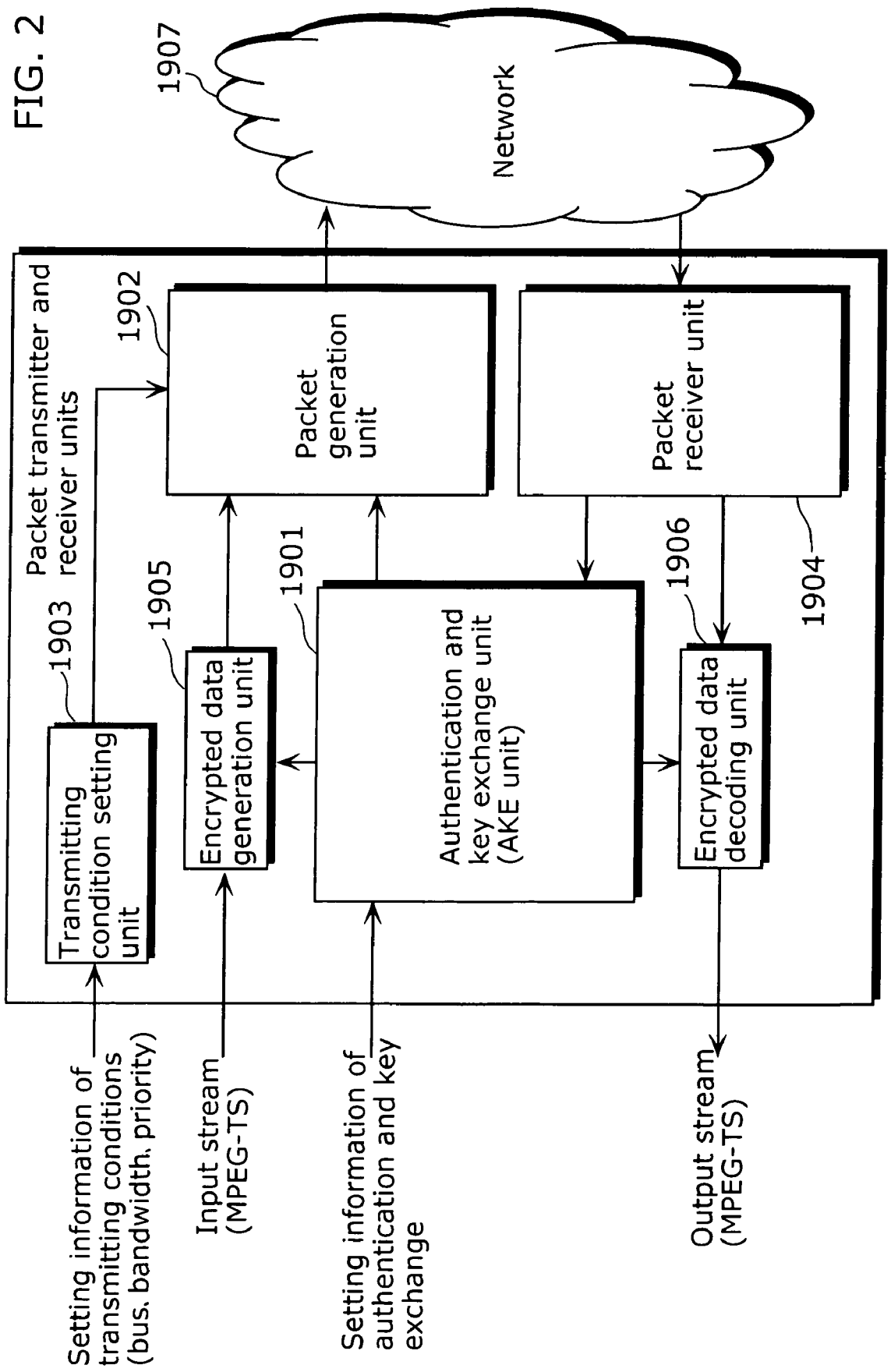
FIG. 2 is a block diagram of the packet transmitter and receiver unit in the conventional technique.
Figure 3:
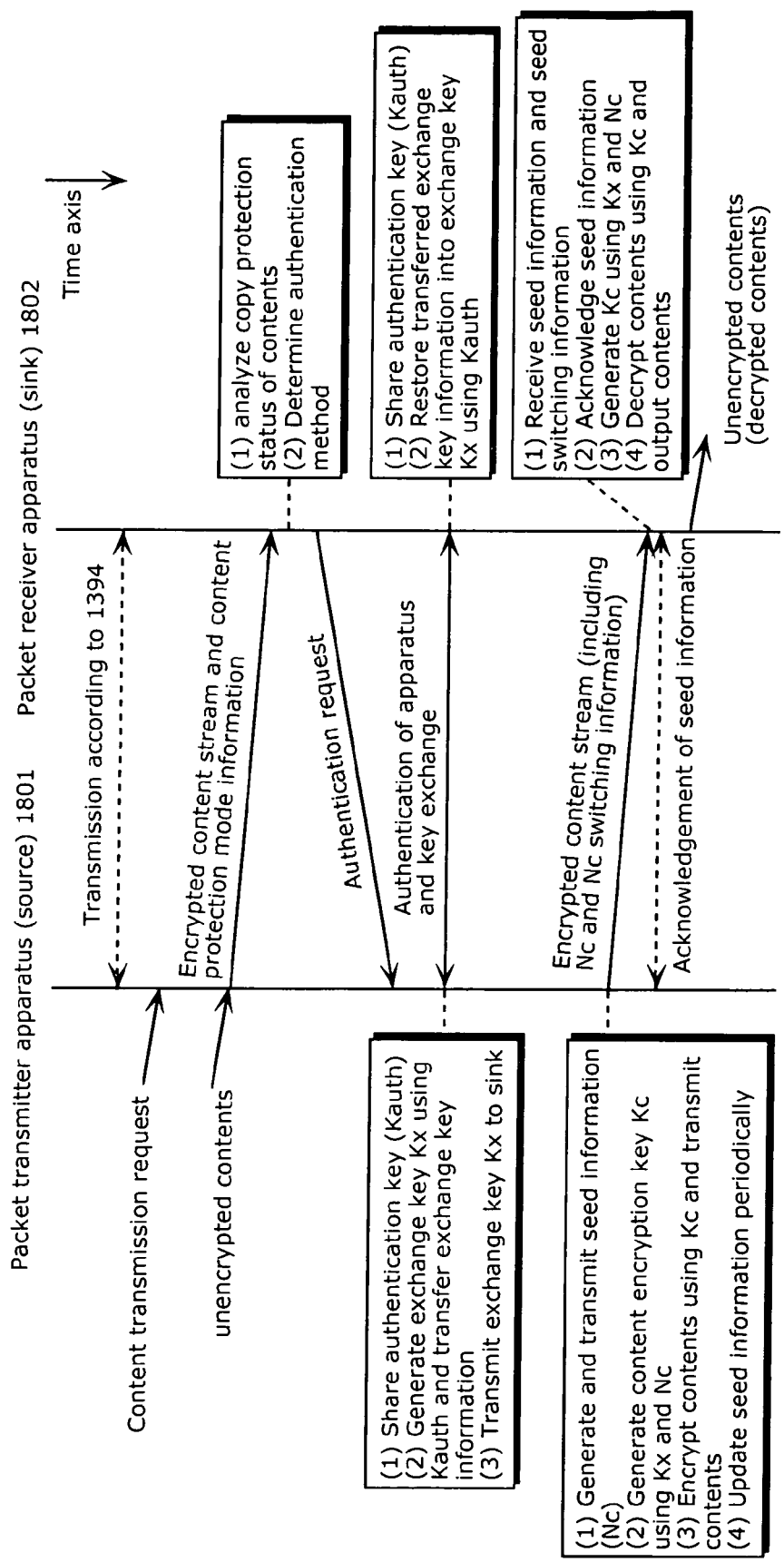
FIG. 3 is an illustration of a content transmission procedure in the case of applying the DTCP method for key exchange in the conventional technique.
Figure 4:
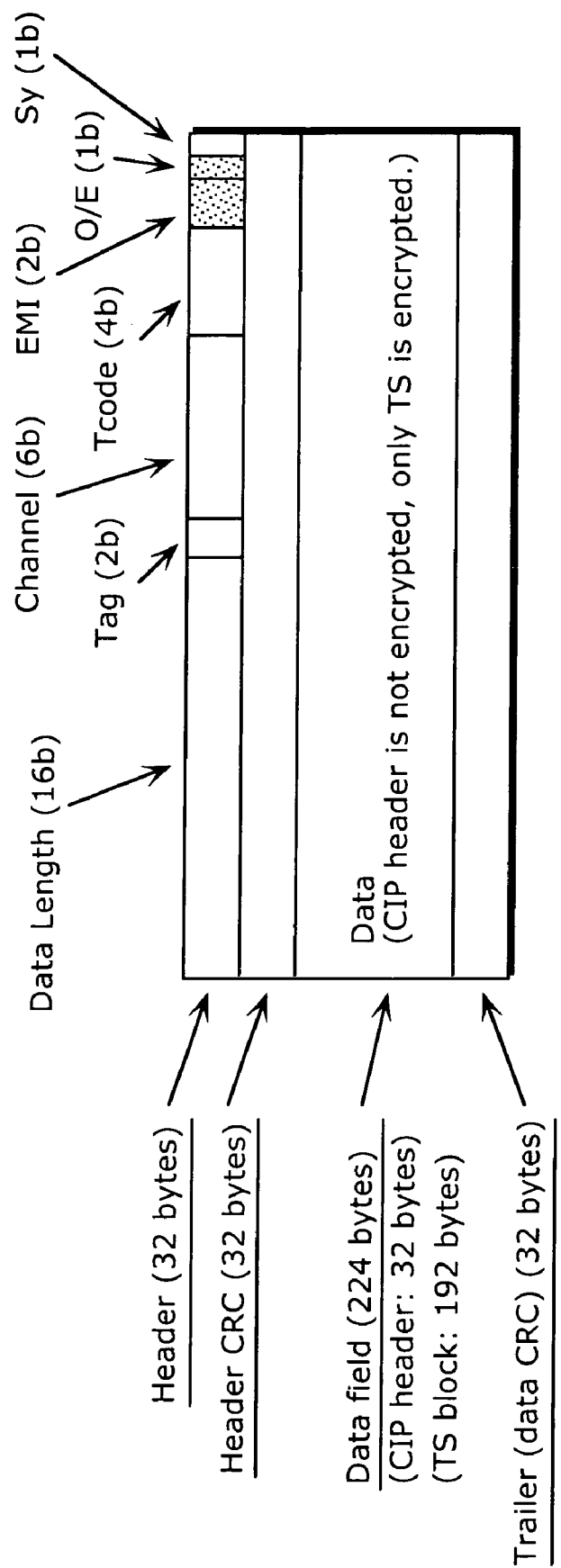
FIG. 4 is a diagram showing the configuration of an IEEE 1395 isochronous packet in the conventional technique.

101 Packet transmitter apparatus
102 Router
103 Packet receiver apparatus
401, 401a to 401h Packet transmitter and receiver unit
402 AKE unit
403 Packet generation unit
404 Transmitting condition setting management unit
405 Packet receiver unit
406 Encrypted data generation unit
407 Encrypted data decryption unit
408 Receiving condition setting management unit
409 Frame generation unit for packets to be transmitted
410 Frame receiver unit
2401, 2401a to 2401b Packet transmitter and receiver unit
2402 TS stream identification unit
2403 Transmitting condition setting management unit
2404 DRM setting management unit
2405 AKE unit
2406 Packet generation unit
2407 Encrypted data decryption unit
2408 Frame generation unit
2409 Frame receiver unit
2410 Packet receiver unit
2411 DRM content purchase settlement unit
2412 Content meta information
2413 Content buffer
2414 Encryption unit
2415 Encryption information header addition unit
2416 HTTP/RTP header addition unit
2417 Condition setting unit
2418 Decryption unit
2701 Storage unit

BEST MODE FOR CARRYING OUT THE INVENTION

Embodiments of the present invention will be described in detail with reference to figures.

First, here will be described the outline of an example communication system to be applied in order to clarify the position of the present invention.

Figure 5:
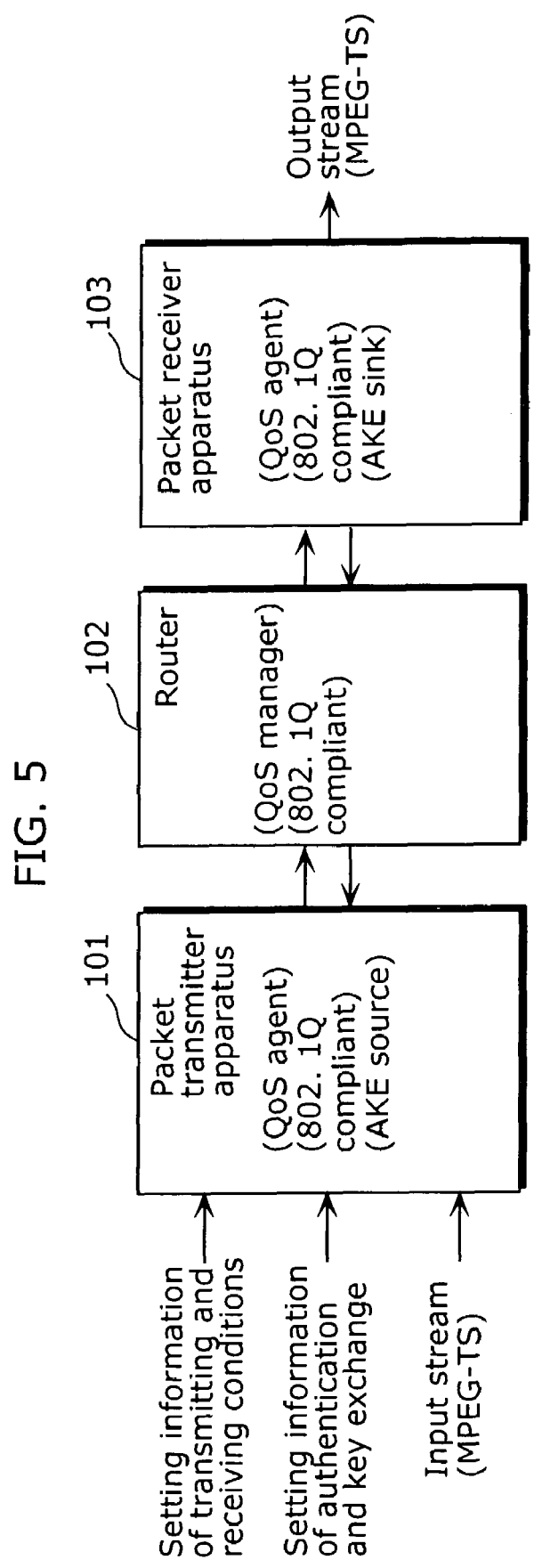
FIG. 5 is a diagram showing an example of a system applying the present invention.
Figure 6:
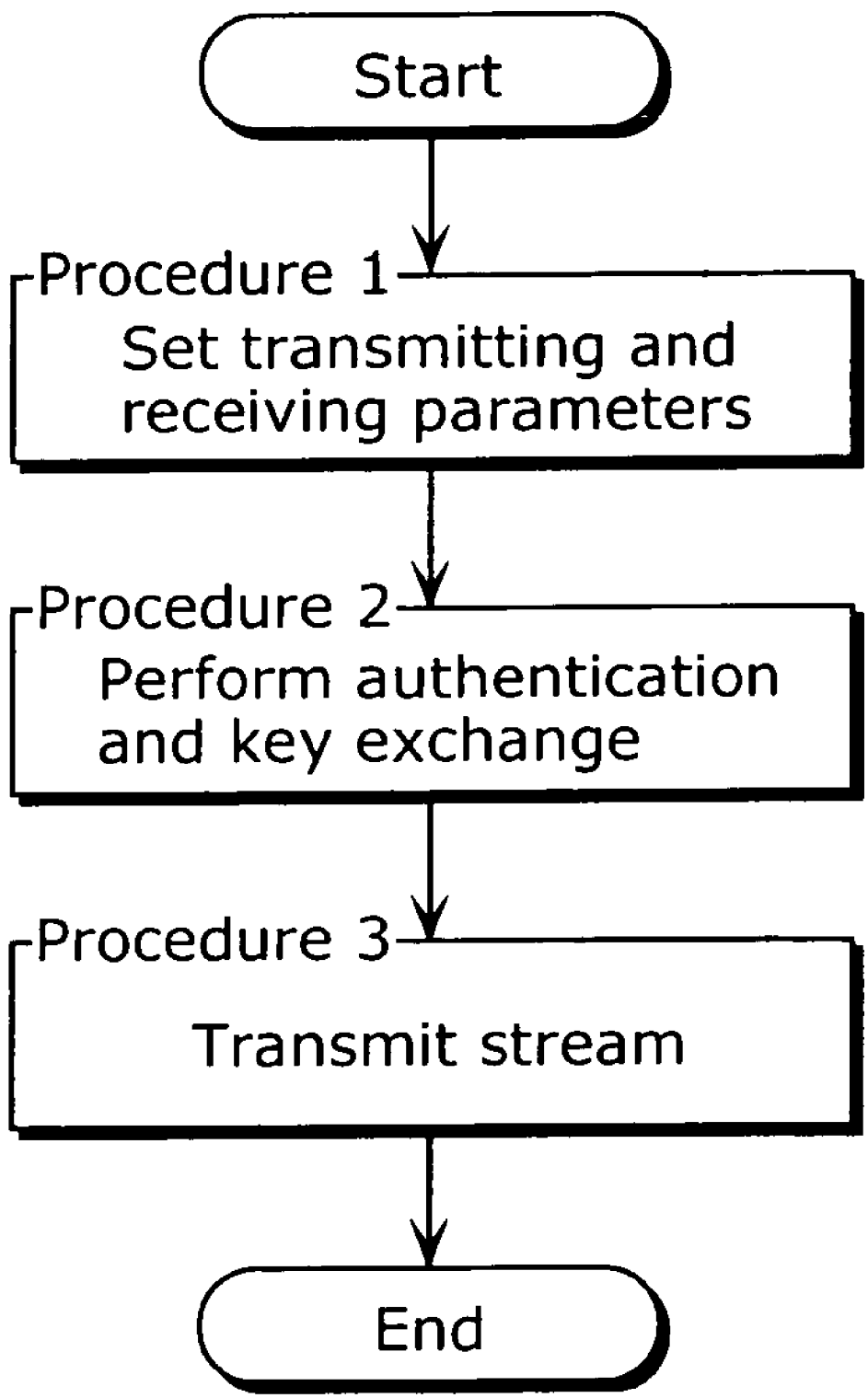
FIG. 6 is a flow chart showing a communication procedure in the system of the present invention.

FIG. 5 is an example of a communication system applying the present invention. This communication system includes a packet transmitter apparatus 101 which transmits packets, a router 102 which performs routing of the packets, and a packet receiver apparatus 103 which receives the packets. The packet transmitter apparatus 101 and the packet receiver apparatus 103 are apparatuses in the present invention. Into the packet transmitter apparatus 101, setting information of transmitting and receiving conditions, setting information of authentication and key exchange and an input stream (contents such as an MPEG-TS) are inputted. As shown in FIG. 6, it performs communication with a router 102, based on the following procedures 1 to 3.

<Procedure 1> Perform Settings of Transmitting and Receiving Parameters.

(Procedure 1-1) Perform settings of a Media Access Control (MAC) address, an IP address, a TCP/User Datagram Protocol (UDP) port number and the like of a packet transmitter and receiver apparatus.

(Procedure 1-2) Perform settings of a type of signal to be transmitted and the bandwidth. Perform settings concerning network operation using the IEEE 802.1Q (VLAN; Virtual LAN) standard between the packet transmitter apparatus 101 and the packet receiver apparatus 103 which function as Quality of Service (QoS) agents and the router 102 which functions as a QoS manager.

(Procedure 1-3) Perform setting of priority (operation by the IEEE 802.1Q/p)

<Procedure 2> Authentication and Key Exchange (Procedure 2-1) Perform authentication and key exchange. For example, it is possible to use the DTCP method.

<Procedure 3> Stream Transmission (Procedure 3-1) Transmit encrypted stream contents (an MPEG-TS) between the packet transmitter apparatus and the packet receiver apparatus.

As input signals of contents, there are an MPEG-TS, an MPEG-Program Stream (PS), an MPEG-Elementary Stream (ES), an MPEG-Packetized Elementary Stream (PES) in MPEG-1/2/4 and the like.

Here, an MPEG-TS is used in the example, but input signals are not limited to this. As for an application range of input contents which can be used in the present invention, the following are applicable: an MPEG-IS stream (ISO/IEC 13818) in MPEG-1/2/4 and the like; a stream defined by the DV (IEC 61834 and IEC 61883), the Society of Motion Picture & Television Engineers (SMPTE) 314M (DV-based), the SMPTE 259M (SDI), the SMPTE 305M (SDTI), the SMPTE 292M (HD-SDI), the ISO/IEC H. 264 and the like; and further general AV contents.

Further, as for an application range of input data used in the present invention, the present invention is applicable to data file transfer. In the case of file transfer, even content transmission which is faster than real-time transmission is possible, on condition that a data transfer speed is greater than a normal playback data rate of a content stream, due to the relationship between processing performance of transmitter and receiver terminals and propagation delay time between the transmitter and receiver terminals.

Figure 7:
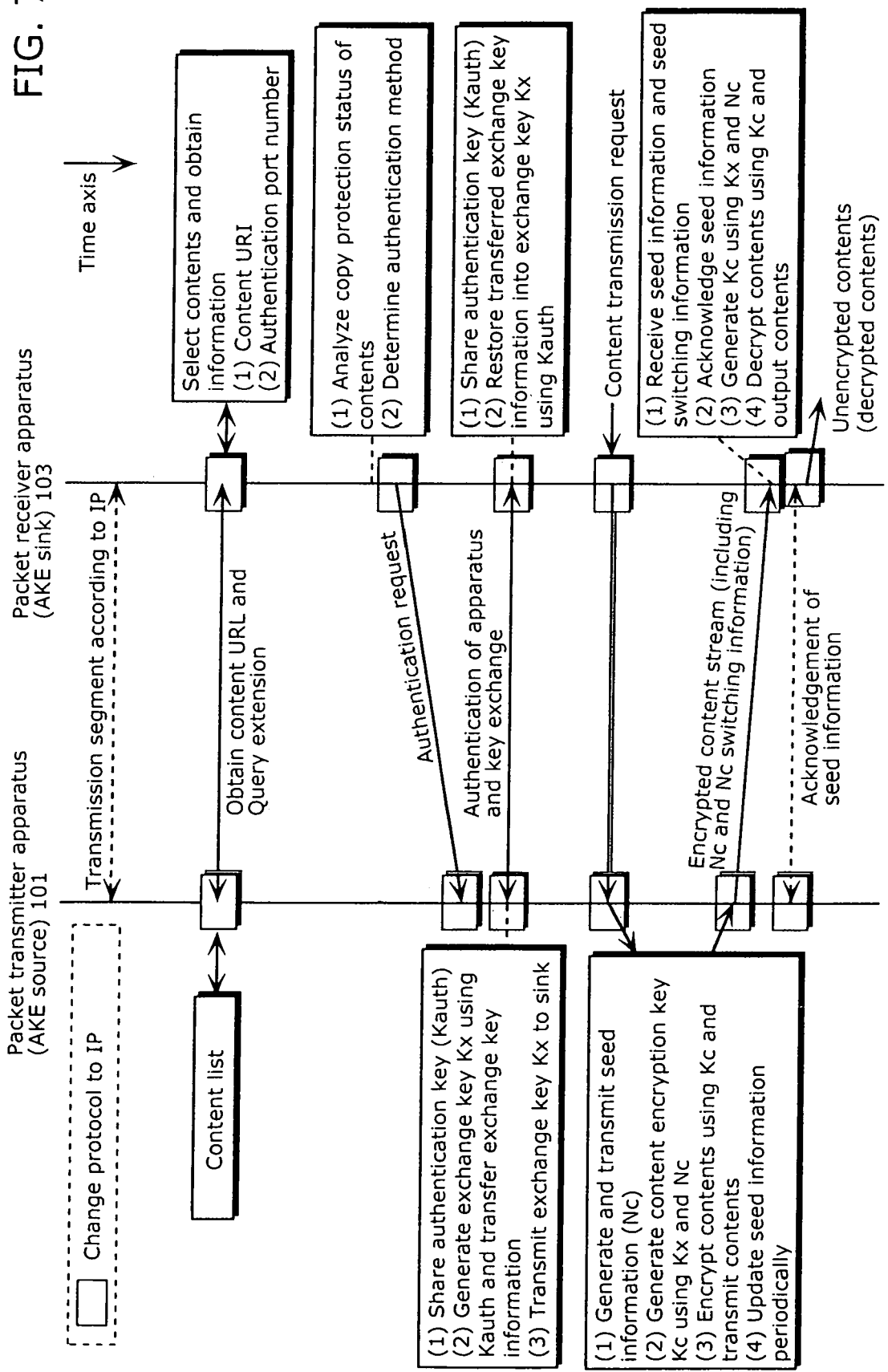
FIG. 7 is an illustration of a content transmission procedure in the case of applying the DTCP method for authentication and key exchange.

Next, authentication and key exchange in the above Procedure 2 will be additionally described. In FIG. 7, the packet transmitter apparatus 101 and the packet receiver apparatus 103 are connected via an IP network. First, content protection mode information including copy protection information of the contents is transmitted from the packet transmitter apparatus 101 to the packet receiver apparatus 103.

The packet receiver apparatus 103 analyzes the copy protection information of the contents, determines authentication method to be used, and transmits the authentication request to the packet transmitter apparatus 101.

Through this processing, the packet transmitter apparatus 101 and the packet receiver apparatus 103 share an authentication key.

Next, the packet transmitter apparatus 101 encrypts an exchange key using the authentication key, transmits it to the packet receiver apparatus 103. The packet receiver apparatus 103 decrypts the exchange key.

In order to change the encryption key temporally, the packet transmitter apparatus 101 generates key exchange information which changes temporally, and transmits it to the packet receiver apparatus 103.

The packet transmitter apparatus 101 generates an encryption key, based on the exchange key and the key exchange information, encrypts the MPEG-TS using this encryption key, and transmits it to the packet receiver apparatus 103.

The packet receiver apparatus 103 restores the decryption key using the received key exchange information and the exchange key. The packet receiver apparatus 103 decrypts the encrypted MPEG-TS signal using this decryption key.

Figure 8:
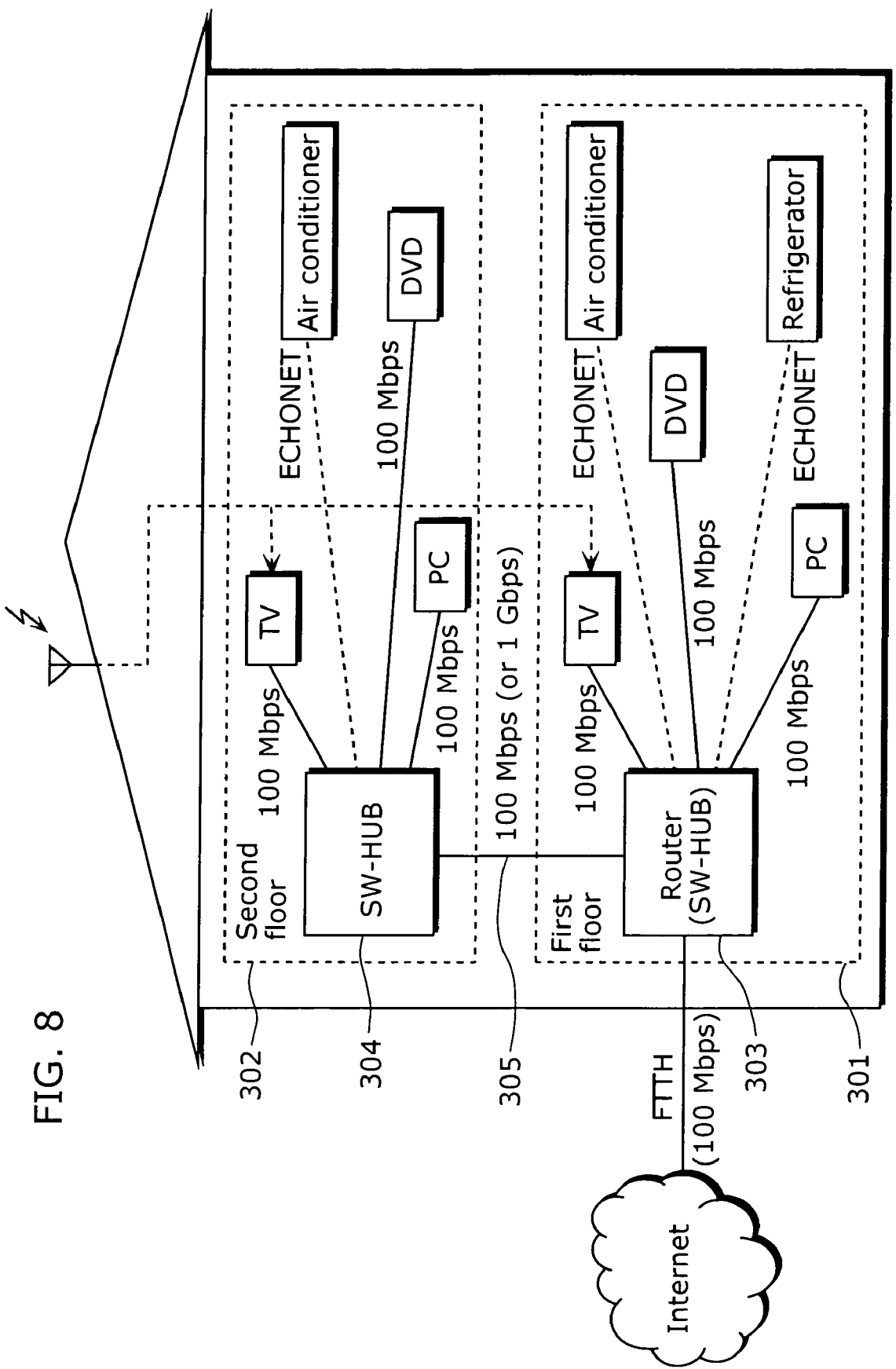
FIG. 8 is an illustration of an example in the case of applying the present invention to a general home where an Ethernet® is used.

FIG. 8 is an example in the case of applying this method to a two-floor home provided with LAN by the Ethernet®. This home includes a network system 301 including a router 303 which is placed in the first floor, and a network system 302 including a switching hub 304 which is placed in the second floor. The network 305 is the Ethernet® network which connects the router 303 and the switching hub 304. The bandwidths of all the Ethernet® networks in the home are 100 Mbps.

As a configuration of the network system 301 of the first floor, a television (TV), a personal computer (PC), a DVD recorder are connected to the router 303 using an Ethernet of 100 Mbps, and an air conditioner and a refrigerator are connected to the router 303 using an ECHONET.

In addition, in the second floor, a television (TV), a personal computer (PC), a DVD recorder are connected to the switching hub 304 using an Ethernet of 100 Mbps, and an air conditioner is connected to the switching hub 304 using an ECHONET. Note that ECHONET is a transmission scheme developed by the "ECHONET Consortium" (hyperlink "http://www.echonet.gr.jp/" http://www.echonet.gr.jp/).

Note that, in this home, for example, a TV, which receives contents subjected to digital copyright protection and distributes IP packets of the contents to apparatuses (an air conditioner, a DVD, a PC and refrigerator) in the home, corresponds to the packet transmitter apparatus 101 of the present invention, and the respective apparatuses correspond to the packet receiver apparatus 103.

In FIG. 8, the personal computer (PC), the DVD recorder, the router 303 and the switching hub 304 are compliant with the IEEE 802.1Q (VLAN). In other words, in the case where the data rates of all the ports of the router 303 and the switching hub 304 are the same (for example, 100 Mbps), on condition that the total bandwidths of data to be outputted to each specific port does not exceed a standard value or a real value of the transmission rate of the port, the data inputted to the input port is not lost inside the router (or the switching hub), and all the data are outputted to the output port.

In the switching hub, even in the case where data are inputted to, for example, eight input ports at the same time, on condition that the output ports of the respective data are different, the respective data are subjected to switching without conflicting in the buffer inside the hub and are outputted through the output ports. Therefore, no packets of the input data are lost, and all the data are outputted to the output ports. Therefore, no packets of the input data are lost, and all the data are outputted to the output ports.

In FIG. 8, the bandwidths of all the Ethernet® networks in the home are 100 Mbps. Therefore, the bandwidth of the network 305 between the first floor and the second floor is also 100 Mbps. In the case where plural data flow between plural apparatuses in the first floor and the second floor, on condition that there is no restriction in the bandwidths of the respective data, the total data rate of the data which flow on this network 305 may exceed 100 Mbps, and a stream such as video application of an MPEG-TS which needs to be transmitted in real time may become discontinuous in the middle. In this case, in order to prevent such discontinuity of a stream that needs to be transmitted in real time, it is necessary to perform priority control of data to be transmitted.

A problem like this can be solved by implementing stream transmission or a speed restriction mechanism of file transfer which will be described later on, not only in a terminal but also in a router and a switching hub.

For example, in the case of setting the transmission priority of the MPEG-TS stream higher than the transmission priority of data transferred in a file, it becomes possible to encrypt the MPEG-TS between the DVD recorder, the PC and the TV in the first floor and the second floor at the same time and to transmit it in real time using HTTP and RTP, while performing the file transfer between the PCs in the first floor and the second floor.

As for the outline, configuration and operation of HTTP (the IETF standard, the RFC 2616, and the RFC 1945), for example, the following explains them: "*Intanetto-Purotocoru Shosetsu* (1) (Detailed Explanation of the Internet Protocol (1), First Part, serialized in the Hyper Text Transfer Protocol (HTTP)"; and Web information, http://www.atmarkit.co.jp/fnetwork/rensai/netpro01/netpro01.Html.

The transmission speed restriction mechanism in the router 303 or the switching hub 304 which described earlier can be realized by data flow control. In other words, it is possible to realize it by comparing data with high priority and the data with low priority in an input data queue of the router (or the switching hub), and preferentially output the data with high priority. As a buffer control rule used in this priority control scheme, there are the Round Robin Queuing, the Fluid Fair Queuing, the Weighted Fair Queuing, the Self-synchronizing Fair Queuing, Wireless Fluid Fair Queueing, Virtual Clock Queuing, Class-based Queuing. Information concerning these queuings is described in, for example, "*Nettowaku QoS Gijutsu* (Network QoS Technique)", Chapter 12, written by Iwao Toda, published by Ohmsha, May 25, 2001 (First Edition).

First Embodiment

Figure 9:
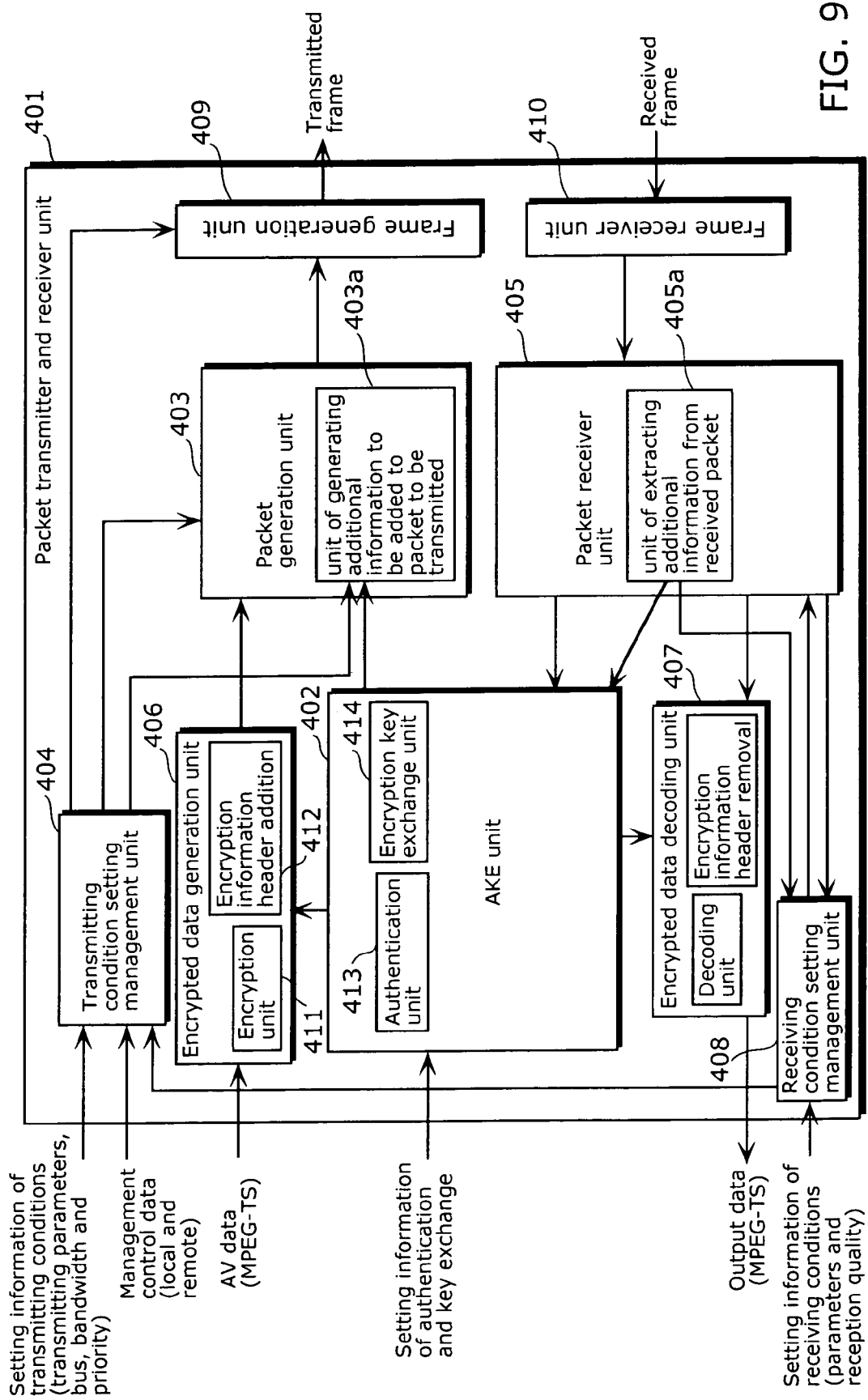
FIG. 9 is a block diagram of the packet transmitter and receiver unit in a first embodiment of the present invention.

First, a first embodiment of the present invention will be described. FIG. 9 is a block diagram showing the configuration of a packet transmitter and receiver unit 401 in this embodiment. This packet transmitter and receiver unit 401 is a virtual function block which shows a packet transmitter unit provided with the packet transmitter apparatus 101 shown in FIG. 5 and a packet receiver unit provided in the router 102. Additionally, it may be a functional block showing a single packet transmitter and receiver unit which has a packet transmitting and receiving function (this is true of the packet transmitter and receiver unit(s) in all the following embodiments).

This packet transmitter and receiver unit 401 is an apparatus which performs packet transmitting and receiving by encryption using AKE. It includes an AKE unit 402, a packet generation unit 403, a transmitting condition setting management unit 404, a packet receiver unit 405, an encrypted data generation unit 406, an encrypted data decryption unit 407, a receiving condition setting management unit 408, a frame generation unit 409 and a frame receiver unit 410. The functions of the respective functional components will be described according to a transmission procedure.

The transmitting condition setting management unit 404 obtains AV data information including input terminal information indicating a terminal to which AV data (transmission data) is inputted, data format information indicating the data format of the AV data and the attribute information indicating the attribute of the AV data, and controls generation of headers and payload data (performs settings of parameters) in the packet generation unit 403 and the frame generation unit 409. To be more specific, such AV data information is: types of data to be transmitted, information concerning transmission destination addresses and port numbers, information of paths to be used in the transmission (routing information), the bandwidths of the data to be transmitted, the setting information of the transmitting conditions such as transmission priority of the data to be transmitted, management control data of the apparatus in a transmission unit (local) and a receiving unit (remote), and the data for providing the transmitter side with a feedback of a receiving status.

In an example case where a signal to be handled is an MPEG-TS signal of AV data, it should be noted that the input terminal information indicating terminals, in the packet transmitter and receiver unit 401, to which AV data (transmission data) are inputted include: (1) an input terminal of digital broadcasting (in the case of Japan, there is an RF input terminal which is compliant with ground digital broadcasting, BS digital broadcasting, and 110 CS digital broadcasting with a wide bandwidth), (2) an IEEE 1394 D-I/, (3) a USB-I/F, (4) an IP-I/F (differentiation of an Ethernet (registered trademark) network, a wireless LAN or the like), (5) analog video and audio input (in this case, analog video and audio inputted inside the packet transmitter and receiver unit 401 is converted into an MPEG-IS signal). As for digital broadcasting, note that there is provided an explanation in the Journal of the Institute of Image Information and Television Engineers, Vol. 58, No. 5, pp. 604 to 654.

In addition, in an example case where a signal to be handled is an MPEG-TS signal of AV data, the data format information indicating the data format of the AV data in the packet transmitter and receiver unit 401 shows a MIME-Type or a media format of the MPEG-TS. For example, the media formats of the respective still picture media, music media and video media handled by the transmitter unit (server) or the receiver unit (client) are determined. As the media format of still pictures, there are JPEG, PNG, GIF and TIFF. In addition, as the media format of music, there are linear PCM, AAC, AC-3, ATRAC-3 plus, MP-3, WMA and the like. In addition, as the media format of moving pictures (video), there are MPEG-2, MPEG-1, MPEG-4, WMV and the like. They are defined also in, for example, the Digital Living Network Alliance (DLNA; homepage: www_Ddlna_Dorg). In the version 1.0 of DLNA, the server (the transmitter side of contents, the source in DTCP) is called Digital Media Server (DMS) and the client (the receiver side of contents, the sink in DTCP) is called Digital Media Player (DMP). The DMS is composed of the MediaServer (MS) and the ControlPoint (CP) of a UPnP-AV, and the DMP is composed of the MediaRenderer (MR) and ControlPoint (CP) of the UPnP-AV. As to the MS, MR and CP of the UPnP-AV, they are described in the homepage of UPnP: www/upnp_DOrg.

In the case of a video media format, it has additional parameters such as (1) differentiation of a resolution (SD or HD), (2) differentiation between TV schemes (broadcasting schemes based on NTSC, PAL and SECAM in analog, and in digital the ARIB standard such as ATSC in the United States, DVB in Europe and ISDB in Japan), (3) presence or absence of additional information such as a timestamp format. In the case of video, for example, it should be noted that the MIME-Types of an MPEG-PS and an MPEG-TS are "mpeg/video". Therefore, the use of the additional information makes it possible to perform finer handling and controlling of video media.

The outline of the ARIB standard concerning digital broadcasting is explained in, for example, the Matsushita Technical Journal, February, 2004, Vol. 50, No. 1, pp. 7 to 12.

In addition, here is an example case where a signal of the AV data to be handled is an MPEG-TS signal which has been broadcast from a broadcasting station in a ground digital broadcasting system in Japan and selected by a receiver in a home or the like (To be more exact, the MPEG-TS signal is a partial transport signal which is defined as an input and output transport stream of a serial interface, in the ARIB standard, the ARIB STD B21, Chapter 9). Attribute information indicates the attribute of AV data in the packet transmitter and receiver unit 401, and as the attribute information to be transmitted from a broadcasting station as PSI/SI information, there are a channel name (broadcasting station name), a channel number, a program name, a program genre, a scheduled broadcast starting time, a scheduled broadcast ending time, information concerning program contents, the resolution of a program, information concerning viewer restriction such as parental, copy control information, viewing fee and the like. As to PSI, it is defined in the ARIB technical document, the ARIB TR-B14 and the ARIB TR-B15.

The AKE unit 402 includes an authentication unit 413 and a key exchange unit 414. This AKE unit 402 obtains setting information (AKE setting information) concerning authentication and key exchange, and outputs information related to this AKE setting information, for example, copy protection information and encryption key exchange information to the packet generation unit 403.

The packet generation unit 403 (403a) adds the information related to the AKE setting information transmitted from the AKE unit 402 to TCP/IP packets as the headers, according to the transmission parameters transmitted from the transmitting condition setting management unit 404, and transmits them to the frame generation unit 409.

The frame generation unit 409 further adds MAC headers to the IP packets from the packet generation unit 403, according to the transmission parameters transmitted from the transmitting condition setting management unit 404. By doing this, it converts them into Ethernet (registered trademark) frames and outputs them to a network as frames to be transmitted.

At the receiver side, the frame receiver unit 410 receives IP packets by filtering, based on the MAC headers, the signals (frames) to be inputted through the network, and passes the IP packets to the packet receiver unit 405.

The packet receiver unit 405 (405a) performs filtering of the IP packets transmitted from the frame receiver unit 410 by identifying the headers of the IP packets, and outputs the IP packets to the AKE unit 402. In this way, the AKE unit of the transmitter side and the AKE unit of the receiver side are connected through the network. Therefore, they can exchange messages with each other through a communication protocol. In other words, authentication and key exchange are performed according to a setting procedure of the AKE unit.

Once the authentication and key exchange are established between the transmitter side and the receiver side, the encrypted AV data are transmitted.

At the transmitter side, an MPEG-TS signal is inputted to the encrypted data generation unit 406, and an encryption unit 411 inside the encrypted data generation unit 406 encrypts the MPEG-TS signal. Subsequently, the encryption information header addition unit 412 adds, to the packets, AKE information such as the earlier mentioned EMI and seed information (all bits of seed information or a part of bits such as O/E) to be transmitted from the AKE unit 402 as encryption information headers, and outputs them to the packet generation unit 403. The packet generation unit 403 adds TCP/IP headers to the data from the encrypted data generation unit 406, using parameters such as transmitting conditions from the transmitting condition setting management unit 404, and transmits the data to the frame generation unit 409. The frame generation unit 409 adds MAC headers to the IP packets from the packet generation unit 403 using the 802.1Q (VLAN) scheme. By doing so, it converts them into Ethernet® frames and outputs them to a network as frames to be transmitted. Here, by setting higher the Priority (user priority) inside the Tag Control Information (TCI) in the MAC headers makes it possible to set the network transmission priority of the data higher than the priority of general data.

At the receiver side, signals to be inputted via a network are filtered based on the MAC headers by the frame receiver unit 410, and obtained signals are inputted to the packet receiver unit 405 as IP packets. They are filtered based on the packet headers by the packet receiver unit 405 through identification, and inputted in the encrypted data decryption unit 407. They are subjected to removal of the encryption information headers and decryption of the encryption and the decrypted MPEG-TS signal is outputted by the encrypted data decryption unit 407.

Note that, data for providing the transmitter side with a feedback of the receiving status through the receiving condition setting management unit 408 is inputted to the transmitting condition setting management unit 404. Additionally, headers and payload data of the IP packets generated by the packet generation unit 403, and headers and payload data of the Ethernet® frames to be generated by the frame generation unit 409 are set in the transmitting condition setting management unit 404.

Figure 10:
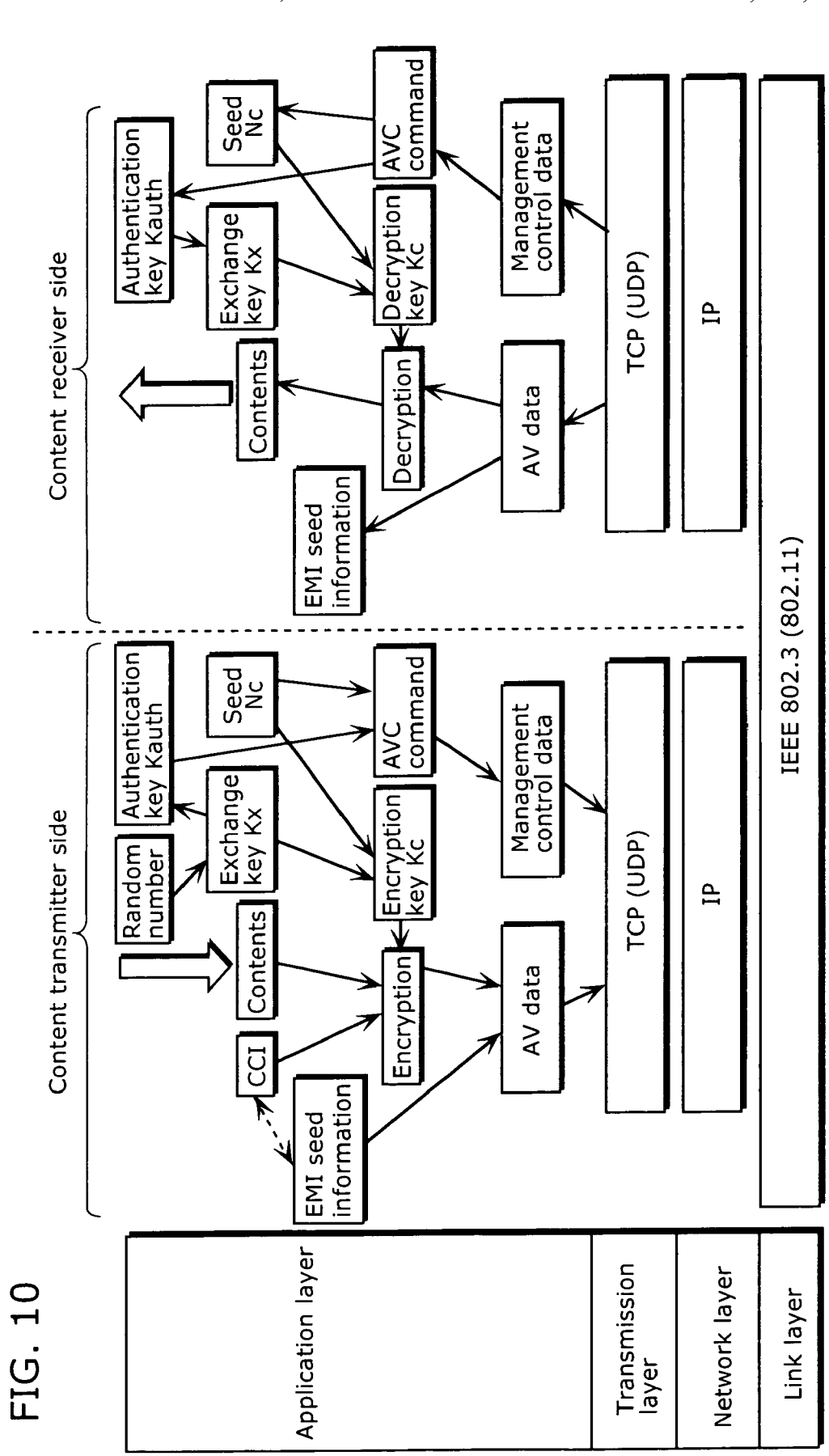
FIG. 10 is an illustration of the protocol stack in the first embodiment of the present invention.

Next, a supplemental description of the above procedure will be provided next with reference to FIG. 10. At the transmitter side shown in FIG. 10, encrypted contents and the protection mode information of the contents are transmitted from the transmitter side to the receiver side first. The receiver side analyzes the copy protection information of the contents, determines an authentication method, and transmits the authentication request to the packet transmitter apparatus. Next, it generates a random number, inputs this random number into a predetermined function so as to generate an exchange key. It inputs information of the exchange key into a predetermined function so as to generate an authentication key. The transmitter side shares the authentication key according to predetermined processing. Note that, as for encryption information used here, for example, it is the information generated as a combination of one or more units of information such as unique information of the transmitter side (the apparatus ID, the apparatus authentication information, MAC addresses and the like), information provided from a secret key, a public key and outside, and the like. The information can be strongly encrypted by using an encryption scheme with a strong encryption strength such as the DES method and the AES method. Subsequently, the transmitter side encrypts the exchange key using the authentication key and transmits the encrypted exchange key to the receiver side. The receiver side decrypts the exchange key. In addition, it inputs the exchange key and initial key update information into a predetermined function so as to generate an encryption key. Note that the transmitter side generates key update information which changes temporally and transmits it to the receiver side in order to change the encryption key temporally. The MPEG-TS which is the contents is encrypted using the encryption key. Subsequently, TCP packets are generated using the encrypted MPEG-TS which is AV data, as the payloads of TCP (or UDP) packets. Further, these TCP packets are used as the data payloads of these IP packets so as to generate IP packets. Further, these IP packets are used as the payloads of MAC frames so as to generate Ethernet® MAC frames. Note that they can be applied to not only as MAC frames by the IEEE 802.3 which is an Ethernet® but also MAC frames by the IEEE 802.11 which is a wireless LAN standard.

By the way, the Ethernet® MAC frames are transmitted from the transmitter side to the receiver side on the Ethernet®. The receiver side generates a decryption key according to a predetermined procedure. Subsequently, IP packets are selected by filtering the received Ethernet® MAC frames. Further, TCP (or UDP) packets are extracted from the IP packets. Subsequently, AV data are extracted from the TCP (or UDP) packets, the MPEG-TS (contents) is decrypted using the decryption key restored based on the exchange key and key exchange information, and the decrypted MPEG-TS (contents) is outputted.

As described above, with this embodiment, it is possible to encrypt an AV stream such as an MPEG-TS signal and transmit the IP packets via a network by the packet transmitter apparatus, and to decrypt it into an original signal by the packet receiver apparatus.

Note that, in FIG. 8, it is possible to make stream transmission and file transfer coexist by contriving a network topology using a switching hub. For example, it is possible to encrypt an MPEG-TS and transmit the encrypted MPEG-TS in real time between a DVD recorder, a PC and a TV in the first floor and the second floor at the same time while performing file transfer between the PCs in the first floor and the second floor, by extending the bandwidth of the network 305 between the first floor and the second floor from 100 Mbps mentioned in the conventional technique to 1 Gbps. For example, using an on-sale switching hub with eight ports of 100 Mbps and a port of 1 Gbps, the port of 1 Gbps is connected to the network 305 which connects the first floor and the second floor, and the remaining eight channels of 100 Mbps are connected to AV apparatuses such as a TV. Since there are eight ports of 100 Mbps, even in the case where data having 100 Mbps at most are inputted to the respective eight ports and the data are outputted to the port of 1 Gbps, 100 Mbps multiplied eight channels equals 800 Mbps and smaller than 1 Gbps, the data inputted from the eight ports are not lost inside the switching hub and all the data are outputted to the port of 1 Gbps. Hence, it is possible to transmit all the data generated in the first floor to the second floor. In addition, it is possible to transmit all the data generated in the second floor to the first floor vise versa. As described above, in the case of using a switching hub, it is possible to make stream transmission and file transfer coexist by contriving a network topology.

Second Embodiment

Figure 11:
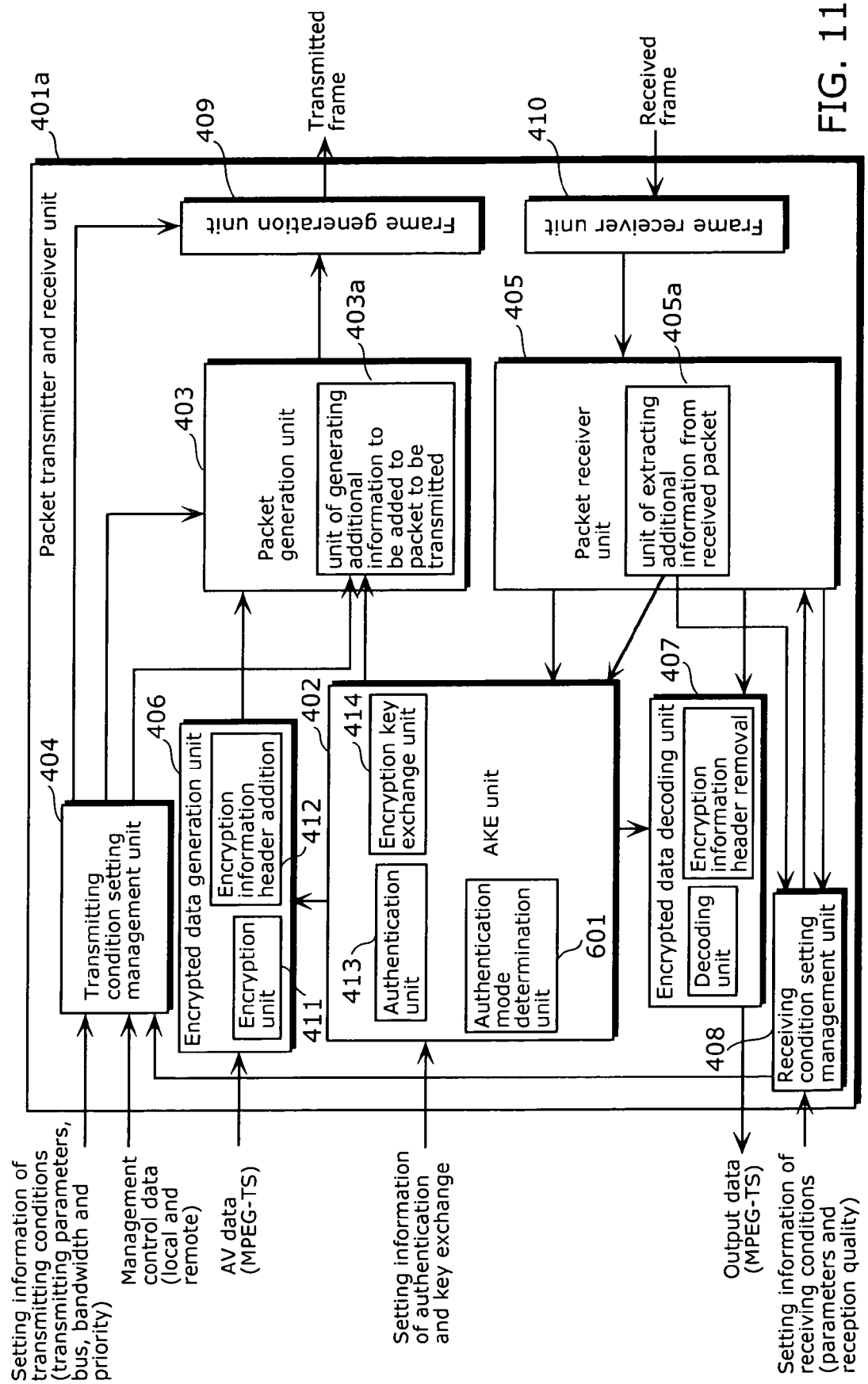
FIG. 11 is a block diagram of the packet transmitter and receiver unit in a second embodiment of the present invention.

Next, a second embodiment of the present invention will be described. FIG. 11 is a block diagram showing the configuration of a packet transmitter and receiver unit 401*a* in this embodiment. In FIG. 11, it has the same configuration as the packet transmitter and receiver unit 401 shown in FIG. 9 except that it has an authentication mode determination unit 601. Hence, the new part will be described below.

In FIG. 11, as shown in this figure, a TCP port number for authentication is inputted in the transmitting condition setting management unit 404 as management control data such as the AKE setting information to the AKE unit 402. Here, the TCP port information for authentication is provided according to the URI specifying an access position of each contents or each broadcasting channel, or URI information extended by a Query. At this time, as to the URI, URI information is mapped onto the principal data part of the contents and authentication information of the contents are mapped onto the Query part. In this way, it is possible to perform mode settings in a way that URI information with no Query part indicates that no authentication is necessary for transmitting the contents and that URI information with Query part indicates that authentication is necessary for transmitting the contents. An example of URI and a Query can be provided according to the following format or the like.

<service>://<host>:<port>/<path>/<filename>.
<ext>?AKEPORT=<port2>

Here, <host>:<port>/<path>/<filename>. <ext> represents the URI and the file name of AV contents, and <port2> in the Query part starting with "?" represents the port number for authentication. Note that this is true of a case where the IP address of the port for authentication is the same as the IP address of the AV contents.

The transmitter side provides authentication execution mode information using the URI and Query to the receiver side. The receiver side can receive the URI and Query using a Web brouser or Content Directory service (CDS) of a UPnP-AV, and the authentication mode determination unit 601 can determine an authentication mode. The other operations are the same as the ones in the first embodiment.

Third Embodiment

Figure 12:
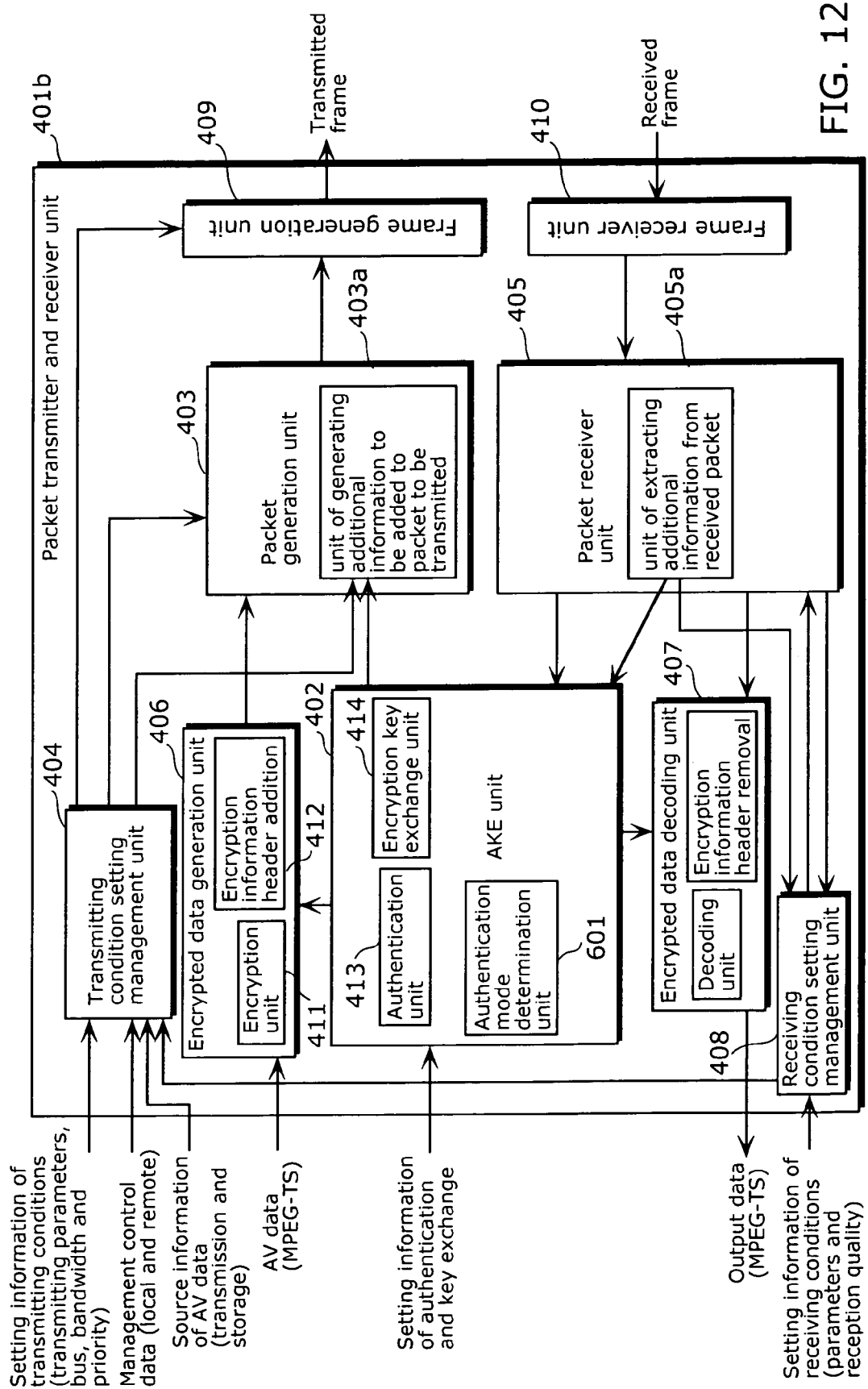
FIG. 12 is a block diagram of the packet transmitter and receiver unit in a third embodiment of the present invention.

Next, a third embodiment of the present invention will be described. FIG. 12 is a block diagram showing the configuration of a packet transmitter and receiver unit 401b in this embodiment. In FIG. 12, the packet transmitter and receiver unit 401a has the same configuration as the packet transmitter and receiver unit 401a in the second embodiment shown in FIG. 11 except that input source information (broadcast or stored) of AV data is inputted into the transmitting condition setting management unit 404. Hence, the new part will be described below.

From the transmitting condition setting management unit 404, necessary data among the input source information (broadcast or stored) of inputted AV data are extracted and outputted to the encrypted data generation unit 406. Subsequently, the encryption information header addition unit 412 inside the encrypted data generation unit 406 adds the necessary data transmitted from the transmitting condition setting management unit 404 as encryption information headers in the following manner.

As for the input source information (broadcast or stored) of the AV data to be inputted into the transmitting condition setting management unit 404, for example, next cases are conceivable.

(Case 1) The case where AV data is the contents to be received by a broadcasting channel which broadcasts copy-free contents. As an example of broadcasting channels like this, there are a broadcasting channel of VHF and UHF which are analog broadcasting or BS analog broadcasting.

(Case 2) The case where AV data is the contents received by a broadcasting channel which broadcasts contents other than copy-free contents even in a predetermined period. As an example of broadcasting channels like this, there are toll channels of BS digital broadcasting and toll channels by CATV broadcasting. Copy control information of broadcasting channels which broadcast contents other than copy-free contents even in this predetermined period is characterized by that it changes from minutes to minutes depending on the broadcast contents. The copy control information is Copy Never, Copy One Generation and Copy Free with an Encryption Plus Non-assertion (EPN) flag.

Here, receiving broadcasting channels which broadcast contents other than copy-free contents even in a predetermined period can be controlled to be done in the case where the authentication unit of a provider which distributes broadcast authenticates the receiver apparatus or the receiving user as authorized receiver apparatus or receiving user. As examples of authentication, authentication by a security module such as a BS-Conditional Access Systems (B-CAS) card of digital satellite broadcasting in Japan, a POD card used in CATV broadcasting in the United States and the like are conceivable.

In addition, addition control of encryption information headers is performed in the following manner or the like. More specifically, they are not added in the case where a broadcasting channel which broadcasts copy-free contents is received, but they are added in the case where a broadcasting channel, which broadcasts contents other than copy-free contents even in a predetermined period, is received. Further, in the case where AV data is contents, having a Copy Free title, played back from a storage medium, they are not added. Additionally, in the case where AV data is contents, having a title other than the Copy Free title, played back from a storage medium, they are added.

As described above, it is possible to succeed and transmit the copy control information (CCI) of the AV contents which has been set by the copyright owner even in network transmission, by performing addition control of the encryption information headers. Further, that the transmitter side and the receiver side use the same addition control rule of encryption information headers makes it possible to secure operation compatibility between different apparatuses.

Fourth Embodiment

Figure 13:
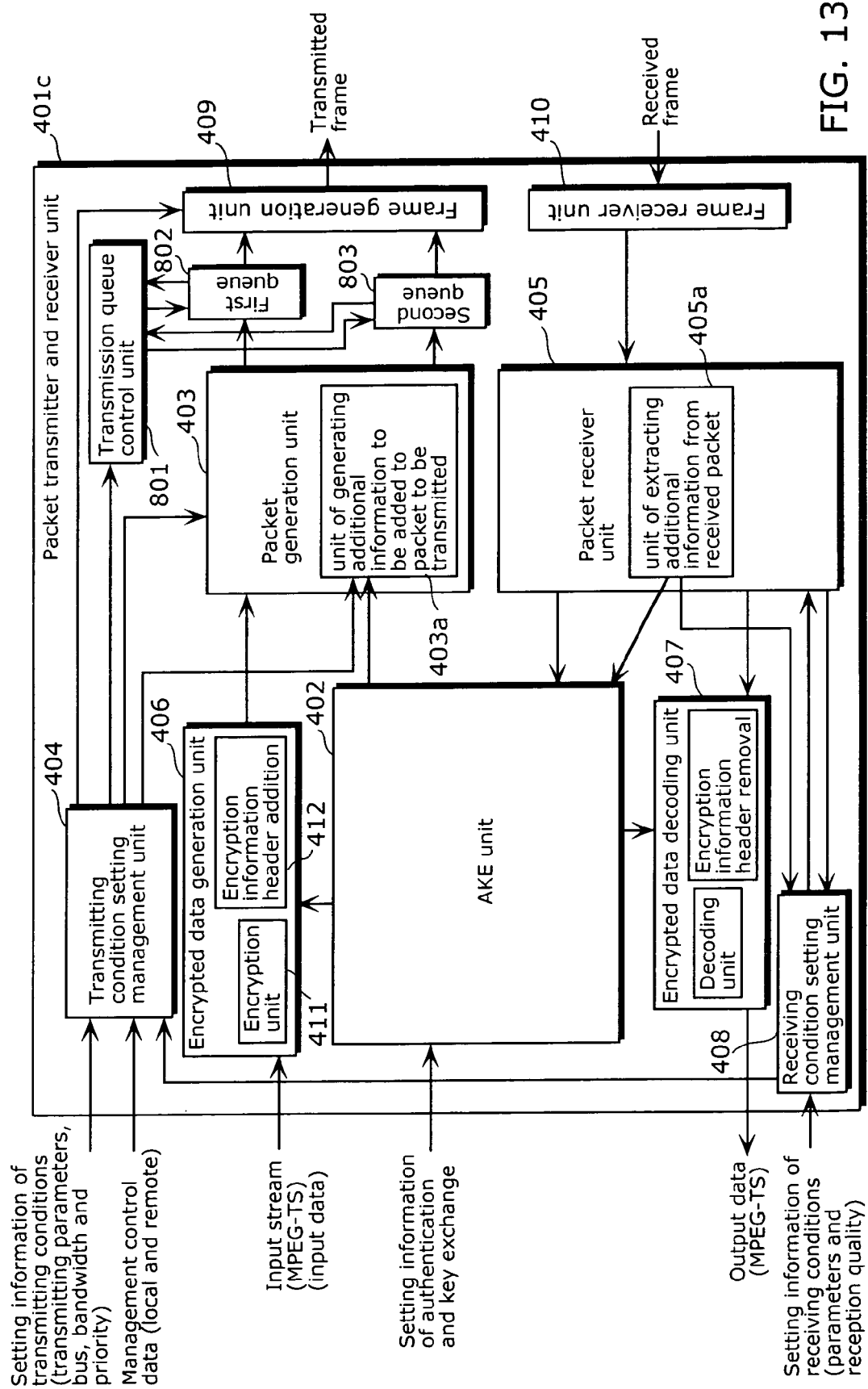
FIG. 13 is a block diagram of the packet transmitter and receiver unit in a fourth embodiment of the present invention.

Next, a fourth embodiment of the present invention will be described. FIG. 13 is a block diagram showing the configuration of a packet transmitter and receiver unit 401c in this embodiment. In FIG. 13, the packet transmitter and receiver unit 401c has the same configuration as the packet transmitter and receiver unit 401 in the first embodiment shown in FIG. 9 except that it has a transmission queue control unit 801, a first queue 802 and a second queue 803. Hence, the new parts will be described below.

AKE setting information is inputted to the AKE unit 402. The followings are inputted from the transmitting condition setting management unit 404 to the packet generation unit 403: setting information of transmitting conditions such as information related to this AKE setting information (for example, copy protection information and encryption key update information), types of data to be transmitted, information of a transmission destination address and a port number, information of a path to be used in transmission (routing information), the bandwidth of the data to be transmitted, transmission priority of the data to be transmitted and the like; management control data of the apparatuses in the transmitter unit (local) and the receiver unit (remote); and the data for providing the transmitter side with a feedback of a receiving status. The data is subjected to the TCP/IP processing performed in the packet generation unit 403, and TCP/IP packets are inputted into the first queue 802. In addition, in the transmitter side, an MPEG-TS signal is inputted to the encrypted data generation unit 406, and the MPEG-TS signal is encrypted in the encrypted data generation unit 406. Subsequently, this encrypted MPEG-TS signal is inputted into the packet generation unit 403. The signal is subjected to TCP/IP processing performed in the packet generation unit 403, and the packets are inputted into the second queue 803.

The transmission queue control unit 801 performs output priority control of data in the case where data exist in the first queue 802 and the second queue 803. In a normal state, it performs output control so that contents data such as an MPEG-TS is outputted preferentially to general data. For example, in the case where an MPEG-TS is transmitted at a low latency (low delay) between packet transmitter and receiver apparatuses, a buffer for MPEG-TSs becomes smaller and thus a buffer tends to overflow. In the case where a buffer for MPEG-TSs at the transmitter side is likely to overflow, or in the case where it is found that a buffer for MPEG-TSs at the receiver side is likely to overflow, referring to the feedback information provided by the receiver side, it is possible to prevent buffer failures by adaptively increasing the priority of the second queue 803 so that the MPEG-TS data is outputted preferentially.

It is good to increase the priority of the first queue 802 adaptively in order to increase a response speed of apparatus control such as playback and pause of the receiver side apparatus (remote apparatus). However, it should be noted that the earlier-mentioned buffer for MPEG-TSs may overflow or underflow in this case.

As another method of preventing such buffer overflow or underflow and increasing the response speed of apparatus control such as playback and pause of the receiver side apparatus (remote apparatus), to output packets for apparatus control directly to the frame generation unit 409 bypassing the first queue 802 and the second queue 803 makes it possible to realize a fast control response. Otherwise, according to a method of preparing a new, third queue for the packets for apparatus control makes it possible to realize a fast control response. Note that the operations of the receiver side are the same as the ones in the first embodiment.

Fifth Embodiment

Figure 14:
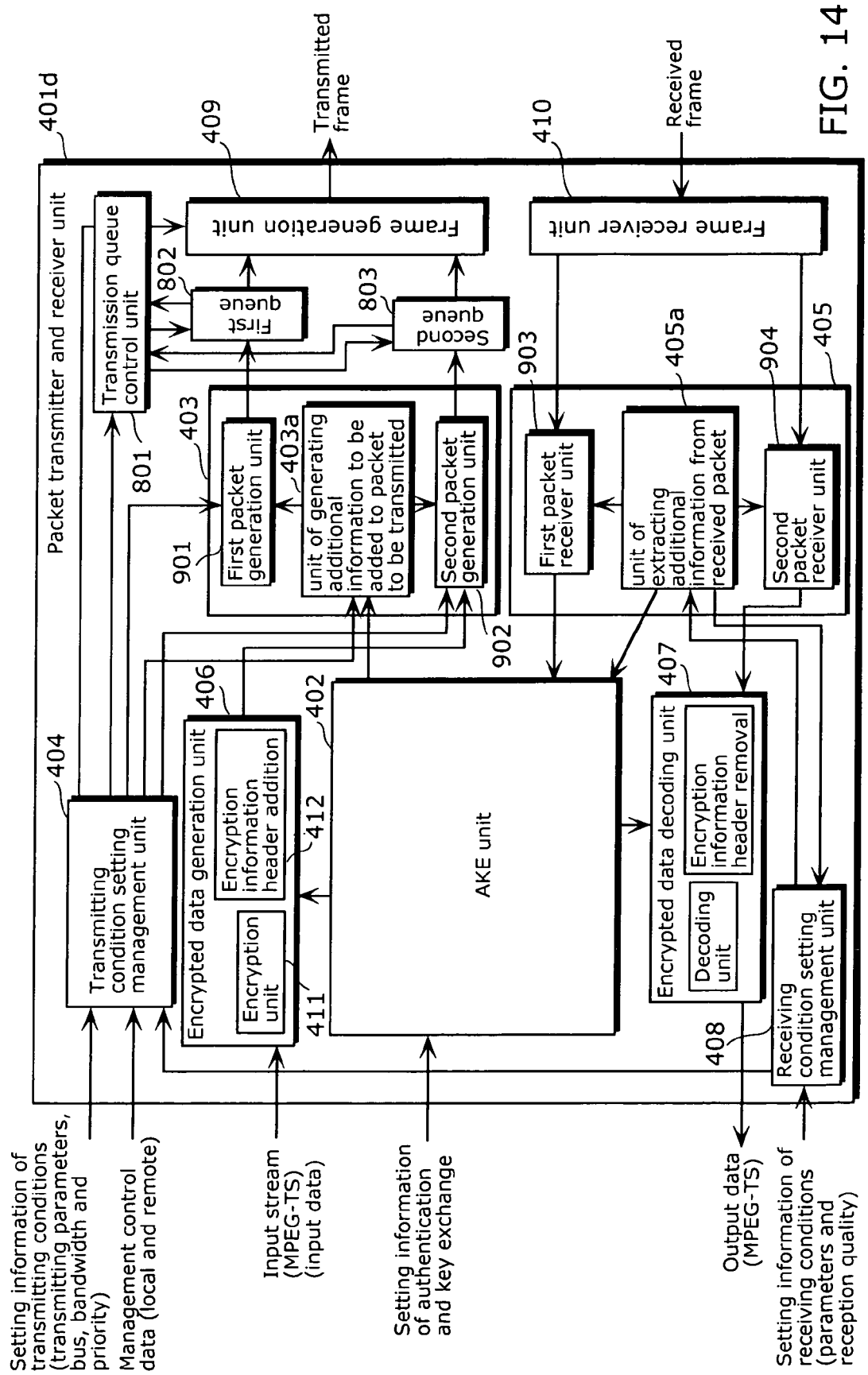
FIG. 14 is a block diagram of the packet transmitter and receiver unit in a fifth embodiment of the present invention.

Next, a fifth embodiment of the present invention will be described. FIG. 14 is a block diagram showing the configuration of a packet transmitter and receiver unit 401d in this embodiment. In FIG. 14, the packet transmitter and receiver unit 401d has the same configuration as the packet transmitter and receiver unit 401c in the fourth embodiment shown in FIG. 13 except that it has: a first packet generation unit 901 and a second packet generation unit 902 inside the packet generation unit 403; and a first packet receiver unit 903 and a second packet receiver unit 904 inside the packet receiver unit 405.

In FIG. 14, AKE setting information is inputted to the AKE unit 402. The followings are inputted to a first packet generation unit 901: setting information of transmitting conditions such as information related to this AKE setting information (for example, copy protection information and encryption key update information), types of data to be transmitted, information of a transmission destination address and a port number, information of a path to be used in transmission (routing information), the bandwidth of the data to be transmitted, transmission priority of the data to be transmitted and the like; management control data of the apparatuses in the transmitter unit (local) and the receiver unit (remote); and the data for providing the transmitter side with a feedback of a receiving status. The data is subjected to TCP/IP processing performed in the packet generation unit 901, according to software processing using a processor, and the TCP/IP packets are inputted into the first queue 802.

In the transmitter side, an MPEG-TS signal is inputted to the encrypted data generation unit 406, and the MPEG-TS signal is encrypted in the encrypted data generation unit 406. Subsequently, this encrypted MPEG-TS signal is inputted into the packet generation unit 403 so as to be subjected to UDP/IP processing by hardware, and the UDP/IP packets are inputted into the second queue 803.

The transmission queue control unit 801 performs output priority control of data from these two queues in a similar manner to the earlier mentioned second embodiment, in the case where data exist in both the first queue 802 and the second queue 803.

By the way, in the receiver side, signals are filtered based on MAC headers in the frame receiver unit 410 so as to obtain IP packets to be inputted via a network. Here, the IP packets outputted from the first packet generation unit 901 are inputted into the first packet receiver unit 903, and the IP packets outputted from the second packet generation unit 902 are inputted into the second packet receiver unit 904. In the first packet receiver unit 903, TCP/IP receiving processing of the packets is performed according to software processing using a processor, and the packets are outputted to the AKE unit 402 or the receiving condition setting management unit 408. In addition, in the second packet receiver unit 904, UDP/IP receiving processing of the packets is performed according to hardware processing, and the packets are inputted to the encrypted data decryption unit 407. The encrypted packets are decrypted in the encrypted data decryption unit 407 so as to output an MPEG-TS.

Figure 15:
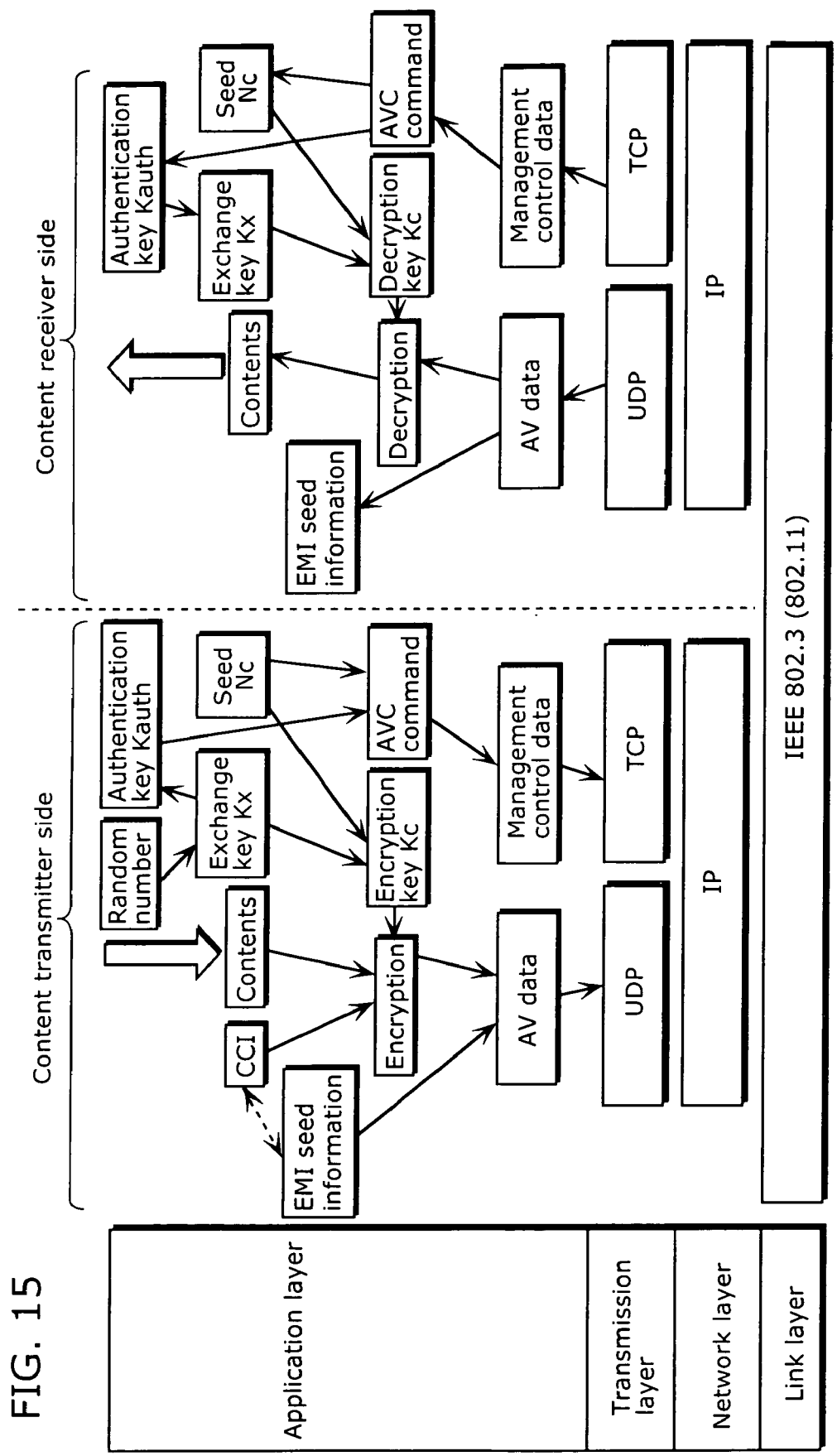
FIG. 15 is an illustration of the protocol stack in the fifth embodiment of the present invention.

Next, the procedure will be described with reference to the protocol stack in FIG. 15. In FIG. 15, the protocol stack is the same as the protocol stack shown in FIG. 10 except that the transmission layer of the AV data such as MPEG-TS is UDP. Hence, the new part will be described below. In the transmitter side shown in FIG. 15, the MPEG-TS which is contents is encrypted using an encryption key Kc. Subsequently, as AV data, the encrypted MPEG-TS with the earlier-mentioned EMI and seed information are made into payloads of UDP packets by hardware so as to be made into UDP packets. Further, these UDP packets are used as the data payloads of IP packets so as to generate IP packets.

As a transmission method of EMI and seed information from the transmission side to the receiver side, for example, note that it is possible to generate and transmit other packets exclusive for them. By doing so, it becomes more difficult to perform restoration of an encryption key, and perform bugging and leakage of the contents. In addition, in the case where AV data to be transmitted in real time via a public net such as the Internet are subjected to encryption parameter change or transmitted in different packets, it is possible to make it difficult to perform bugging and leakage of the AV data. As for management control data, similar to the example of FIG. 10, TCP packets are generated through software processing and the TCP packets are made into IP packets.

By the way, Ethernet® MAC frames are transmitted from the transmitter side to the receiver-side on the Ethernet®. A description key is generated according to a predetermined procedure at the receiver side. Subsequently, IP packets are obtained by filtering the received Ethernet® MAC frames. Further, UDP packets are extracted from the IP packets, and AV data is extracted from the UDP packets. An MPEG-TS (contents) are decrypted by the decryption key Kc restored based on the exchange key and the seed information, and the decrypted MPEG-TS is outputted.

Figure 16:
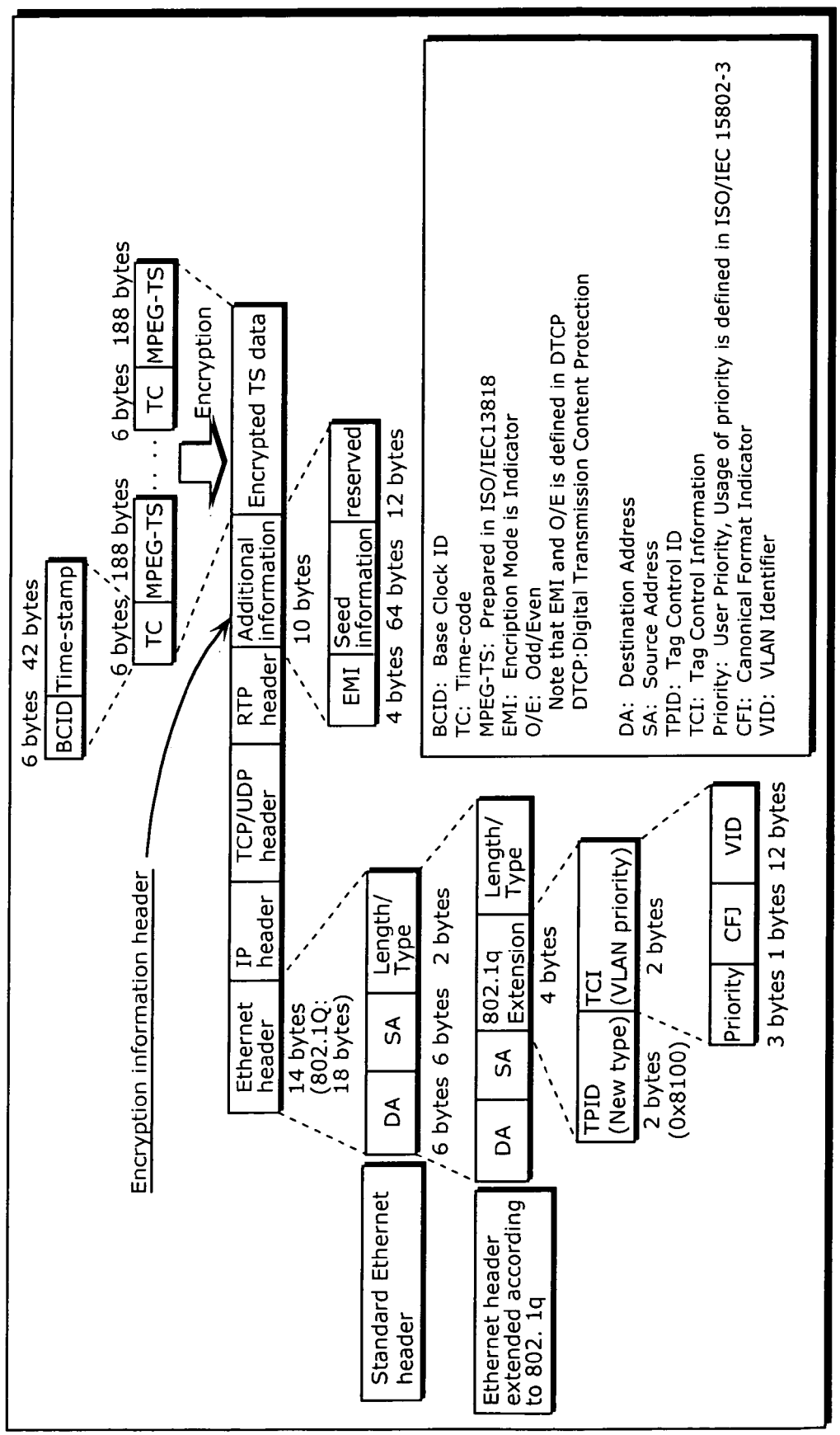
FIG. 16 is a diagram showing an example of specifications of an MPEG-TS frame configuration by the Ethernet® in the fifth embodiment of the present invention.

FIG. 16 shows an example of a packet format in the case where an MPEG-TS is made into IP packets, and the IP packets are further made into Ethernet® frames, and the Ethernet frames are transmitted. A time code (TC) of 6 bytes is added to an MPEG-TS of 188 bytes so as to generate a unit of 194 bytes. A TC is composed of a timestamp of 42 bits and a base clock ID (BCID) of 6 bits. It is possible to represent frequency information of a timestamp by the BCID. For example, in the case where the BCID is 0x00 (Case 1), there is no frequency information of a timestamp. In the case where the BCID is 0x01 (Case 2), as for frequency information of a timestamp, it is 27 MHz (MPEG-2 system clock frequency). In the case where the BCID is 0x02 (Case 3), as for frequency information of a timestamp, it is 90 kHz (the clock frequency used in MPEG-1). In the case where the BCID is 0x03 (Case 4), as for frequency information, it is 24.576 MHz (the clock frequency used in the IEEE 1394. In the case where the BCID is 0x04 (Case 5), as for frequency information of a timestamp, it is 100 MHz (the clock frequency used in the Ethernet®). In this way, the BCID can represent frequency information of a timestamp. Data of two 194-byte units are combined and encrypted, and further combined with an encryption information header of 14 bytes so as to generate an RTP payload. Here, the encryption information header is composed of EMI of 4 bits, seed information of 64 bits and Reserved Data of 12 bits. The RTP packets are made into UDP packets, IP packets, and then Ethernet® frames. As for Ethernet® headers, as shown in FIG. 16, it supports both a standard Ethernet® header and an Ethernet® header extended by the IEEE 802.1Q (VLAN). Note that it is possible to set priority of an Ethernet® frame by the Priority flag of 3 bits in the TCI field in the Ethernet® header extended by the IEEE 802.1Q (VLAN).

In this way, it becomes possible to encrypt an MPEG-TS signal and transmit it in real time between packet transmitter and receiver apparatuses. Further, since the second packet generation unit 902 is configured to be hardware, no left packet to be transmitted and unreceived packet is generated inherently stemming from software processing. In this way, all the priority data packets are completely transmitted, and it becomes possible to transmit high-quality video with guaranteed real-timeliness. In addition, general data is temporarily stored in a buffer unit, and intermittently transmitted while transmission of the priority data is preferentially performed. In addition, the first packet generation unit 901 with a small data amount can be processed by an inexpensive processor such as a microcomputer.

Further, by hardware processing, it is also possible to receive Ethernet® frames in receiving processing and check the IP headers in the third layer and the UDP headers in the fourth layer in the OSI reference model. By separating MPEG-TS packets and general packets and performing the processing of these MPEG-TS packets, it is possible to prevent occurrence of unreceived frames and realize high-quality reception where real-timeliness is guaranteed.

In the case of controlling packet transmission timings or the data transmission ratio from two transmission data queues by not software but hardware, it is possible to perform transmission control on a clock-by-clock basis. In this way, all the priority packets are completely transmitted, and it becomes possible to perform high-quality transmission where real-timeliness is guaranteed. In addition, shaping of packets to be outputted is performed finely by a clock-by-clock basis. Therefore, it becomes possible to perform high-quality communication with a low occurrence probability of packet discarding in a first-step router or a switching hub.

Figure 17:
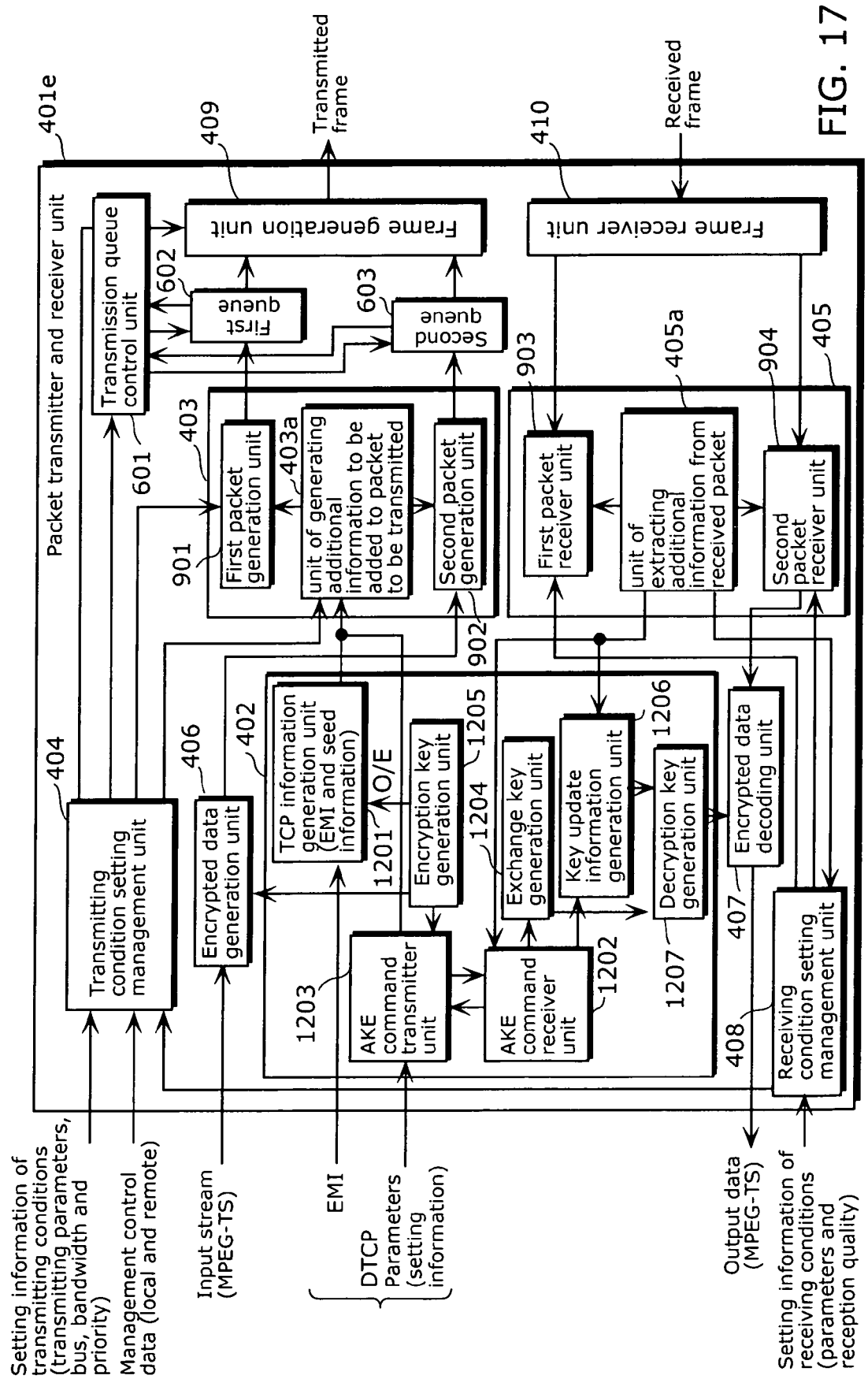
FIG. 17 is a block diagram of the packet transmitter and receiver unit in a first variation and a second variation of the fifth embodiment of the present invention.
Figures 18A, 18B:
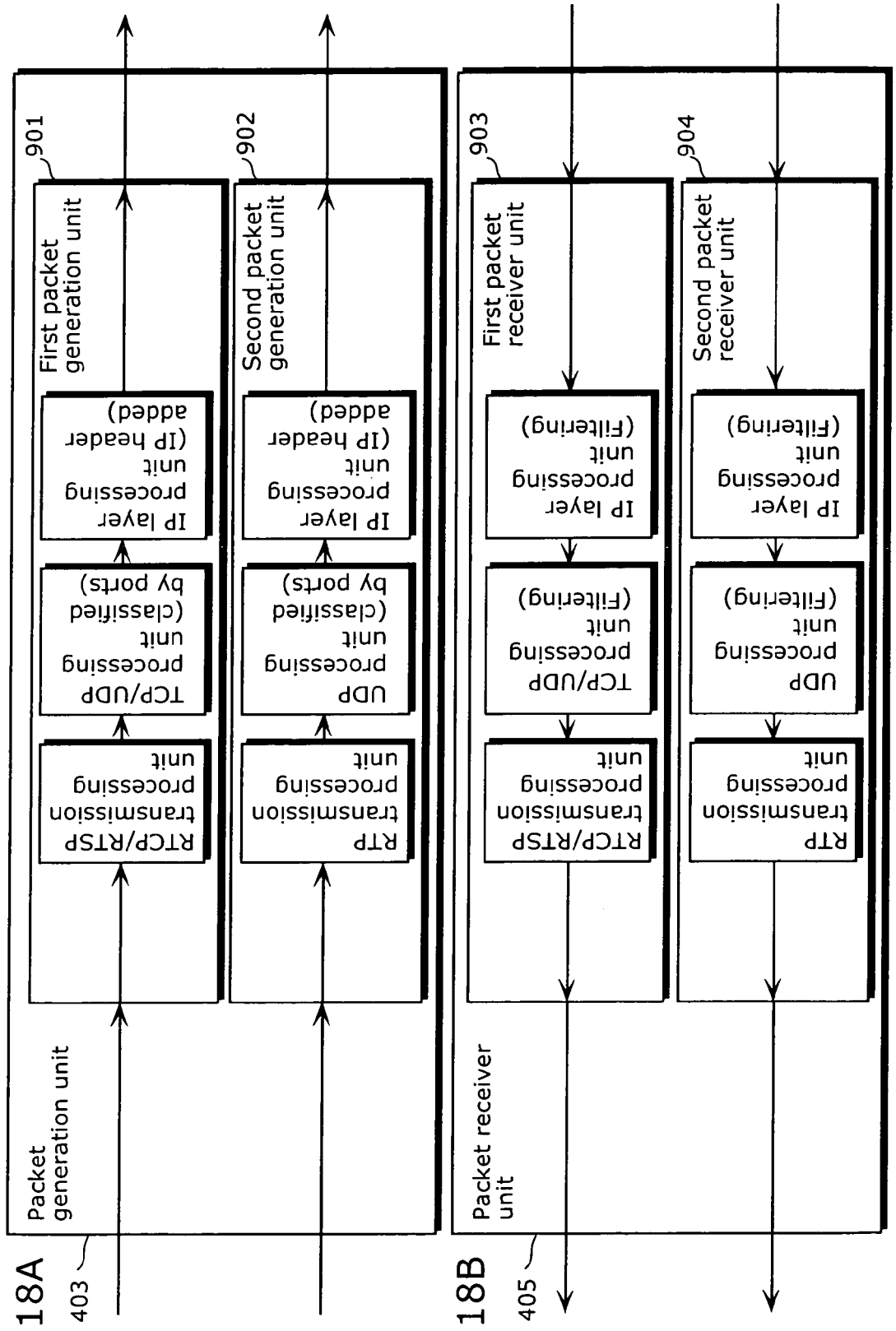
FIG. 18A is an illustration of the packet generation unit in the first variation of the fifth embodiment of the present invention.
FIG. 18B is an illustration of the packet receiver unit in the first variation of the fifth embodiment of the present invention.

Here, a first variation in this embodiment will be described. FIG. 17 is a block diagram showing the configuration of a packet transmitter and receiver unit 401e in the variation, and it is an example in the case where the DTCP method is used for the AKE unit. In addition, FIG. 18A is an illustration of a first packet generation unit 901 and a second packet generation unit 902 inside the packet generation unit 403. FIG. 18B is an illustration concerning packet processing in a first packet receiver unit 903 and a second packet receiver unit 904 inside the packet receiver unit 405.

As shown in FIG. 17, the packet transmitter and receiver unit 401e has the same configuration as the packet transmitter and receiver unit 401d in the fifth embodiment shown in FIG. 14 except that it has a DTCP information generation unit 1201 inside the AKE unit 402, an AKE command receiving processing unit 1202, an AKE command transmission processing unit 1203, an exchange key generation unit 1204, an encryption key generation unit 1205, an encryption key exchange information generation unit 1206 and a decryption key generation unit 1207. Thus, these new parts will be described below.

Figure 19:
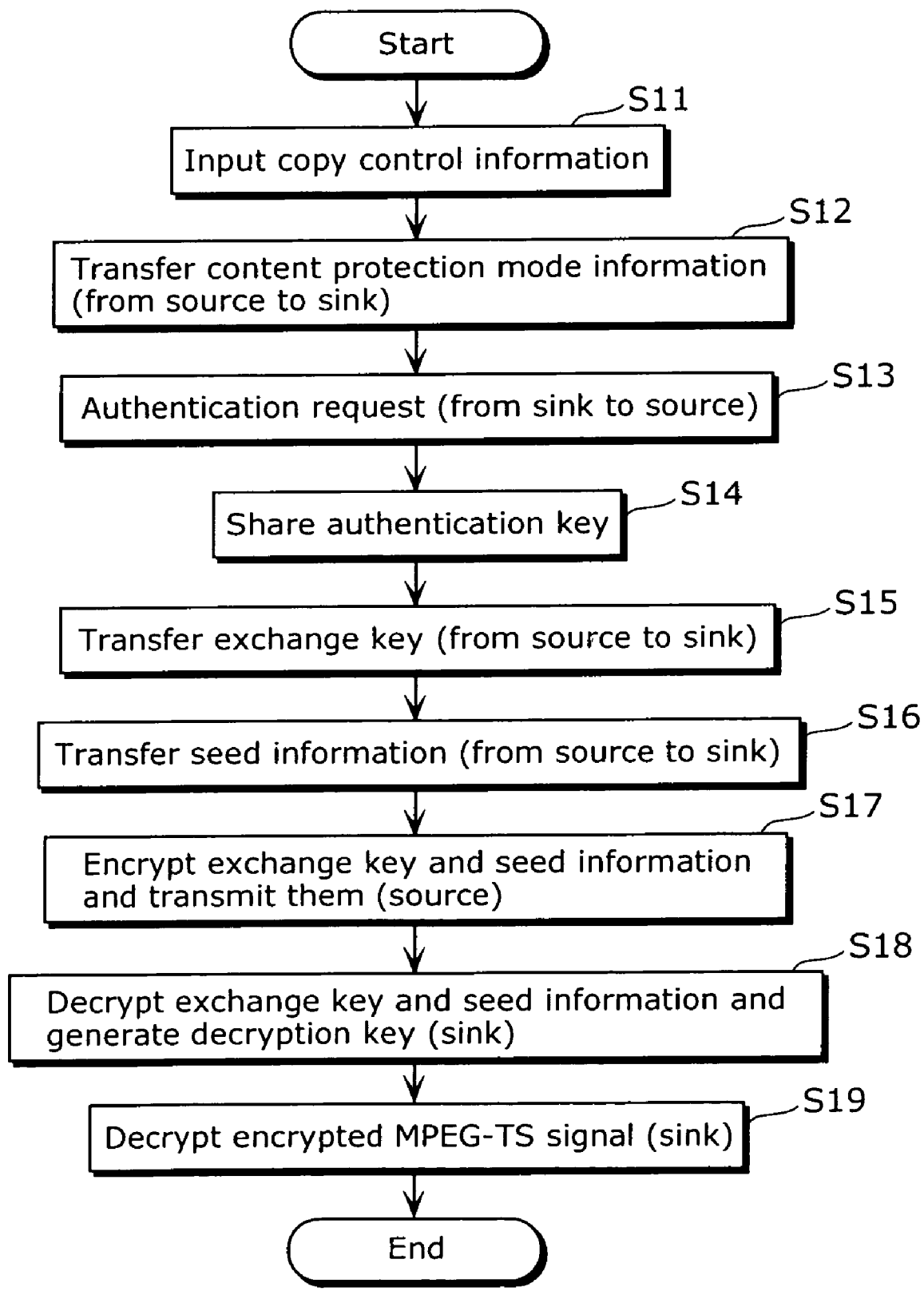
FIG. 19 is a flow chart showing a transmission procedure of encrypted contents by the DTCP method in the first variation of the fifth embodiment of the present invention.

This packet transmitter and receiver unit 401e performs transmission of encrypted contents according to the DTCP method in the following steps as shown in the flow chart of FIG. 19.

(Step S11) Copy control information is inputted to the DTCP information generation unit 1201.

(Step S12) First, the source side is caused to make a transmission request of contents, and protection mode information (EMI information) of the contents is outputted to the first packet generation unit 901 by the DTCP information generation unit 1201. Packets of the contents are generated by the packet generation unit 901, and the packets are transmitted to the sink.

(Step S13) Subsequently, when the copy protection information of the contents is inputted to the AKE command receiving processing unit 1202 by the first packet receiver unit 903, in the receiver side (sink), the AKE command receiving processing unit 1202 analyzes the copy protection information, determines an authentication method to be used from among the full authentication or restricted authentication, and it transmits the authentication request through the AKE command transmission processing unit 120.

(Step S14) The processing predetermined in DTCP is performed between the source and the sink, and an authentication key is shared.

(Step S15) Next, in the source, the AKE transmission processing unit 1203 encrypts an exchange key using the authentication key, and transmits it to the sink via the first packet generation unit 901. In the sink, the exchange key is decrypted in the exchange key generation unit 1204 according to the information provided by the AKE command receiving processing unit 1202.

(Step S16) In the source, in order to change the encryption key temporally, seed information (O/E) which changes temporally is generated in the encryption key generation unit 1205, and it is transmitted to the sink via the DTCP information generation unit 1201 and the first packet generation unit 901.

(Step S17) In the source, an encryption key is generated using the exchange key and the seed information in the encryption key generation unit 1205, and the MPEG-TS is encrypted in the encrypted data generation unit 406 and outputted to the second packet generation unit 902.

(Step S18) In the sink, the encryption key exchange information generation unit 1206 receives seed information from the first packet receiver unit 903, and the decryption key generation unit 1207 restores a decryption key using this seed information and the information of the exchange key generation unit 1204.

(Step S19) In the encrypted data decryption unit 407 in the sink, the encrypted MPEG-TS signal is decrypted using this decryption key.

As shown in FIG. 18A, in the first packet generation unit 901, inputted data is subjected to the processings by RTCP or RTSP, TCP or UDP and further IP, and outputted. Note that, RTCP (rfc1889) makes it also possible to transmit a real bandwidth of a network, delay time and the like from a receiver device to a transmitter device. It enables the transmitter device to adjust the quality of data to be transmitted in accordance with a reported communication state using RTP and transmit the data. In addition, RTSP (rfc2326) makes it possible to transmit control commands such as playback, pause, fast forwarding and the like, and to playback contents while downloading the data from an AV file. In addition, in the second packet generation unit 902, the inputted data is subjected to the processings by RTP, UDP and IP, and the IP packets are outputted.

On the other hand, as shown in FIG. 18B, in the first packet receiver unit 903, the received data are subjected to IP receiving processing, TCP or UDP receiving processing, and further RTCP or RTSP receiving processing such as filtering, and outputted. In addition in the second packet receiver unit 904, the received data is subjected to IP receiving processing, UDP receiving processing and further RTP receiving processing such as filtering, and outputted.

In this way, encryption of an MPEG-TS signal between the packet transmitter and receiver apparatuses using the DTCP method makes it possible to perform real-time transmission of the packets. Further, since the second packet generation unit 902 is configured to be hardware, no left packet to be transmitted and unreceived packet is generated inherently stemming from software processing. In addition, the first packet generation unit 901 with a small data amount can be processed by an inexpensive processor such as a microcomputer.

Figure 20:
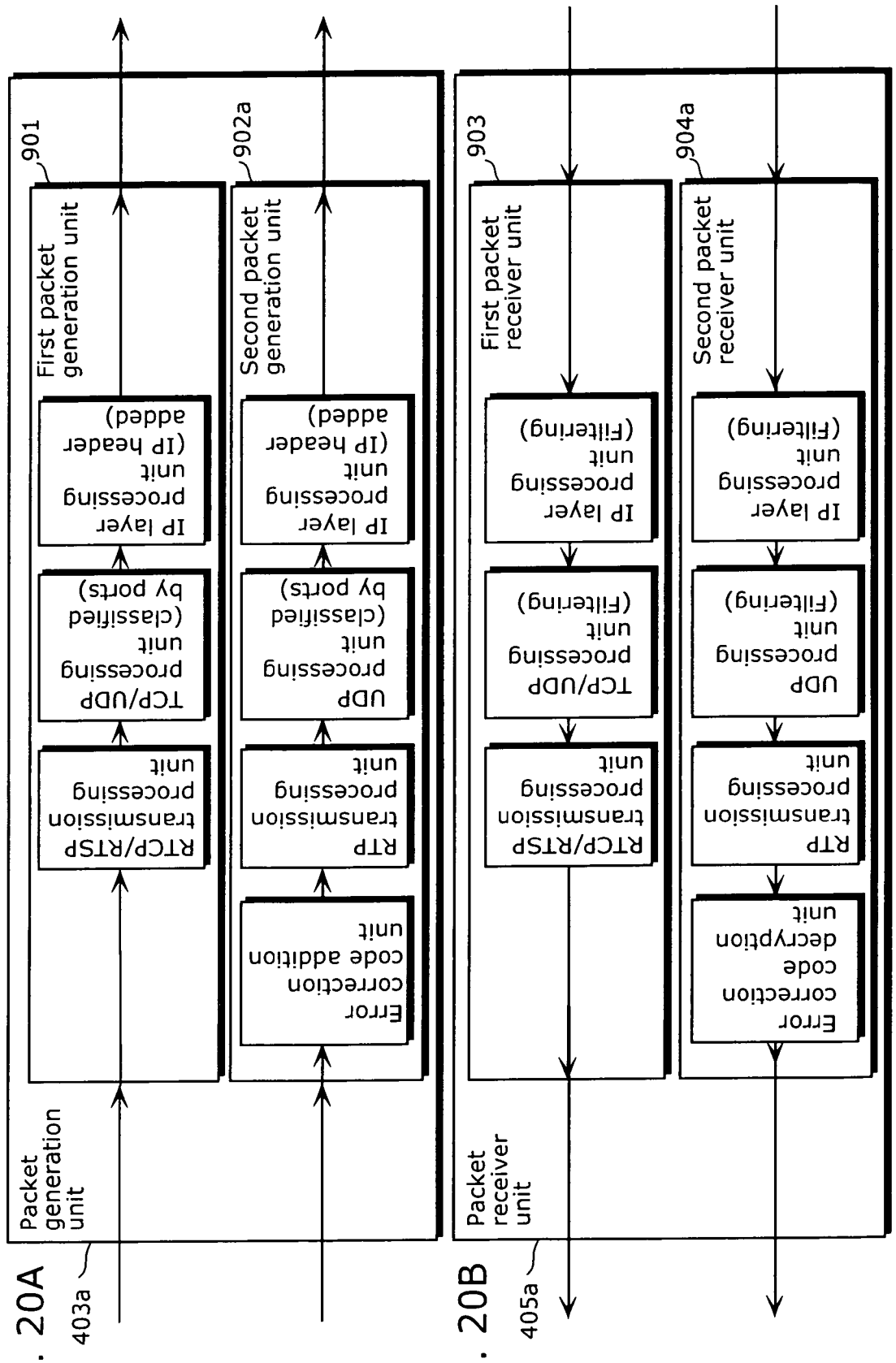
FIG. 20A is an illustration of the packet generation unit in the second variation of the fifth embodiment of the present invention.
FIG. 20B is an illustration of the packet receiver unit in the second variation of the fifth embodiment of the present invention.

Consequently, a second variation in this embodiment will be described. The basic configuration of the packet transmitter and receiver unit concerning this variation is the same as the first variation shown in FIG. 17. Note that, as shown in FIG. 20, the packet generation unit 403a (to be more precise, it is a packet generation unit 902a) and the packet receiver unit 405a (to be more precise, it is a packet receiver unit 904a) are different from the configuration in the first variation. In other words, as shown in FIG. 20, the packet transmitter and receiver unit has the same configuration as the first variation shown in FIG. 18 except that it has the second packet generation unit 902a of FIG. 20A and the second packet receiver unit 904a of FIG. 20B. Hence, the new parts will be described below.

The second packet generation unit 902a locally performs error correction processing of input data, and performs processing by RTP, UDP, and IP, and outputs IP packets of the input data.

In addition, the second packet receiver unit 904a locally performs IP receiving processing, UDP receiving processing and RTP receiving processing such as filtering, and further error correction decryption processing, and outputs the data subjected to error correction.

Figure 21:
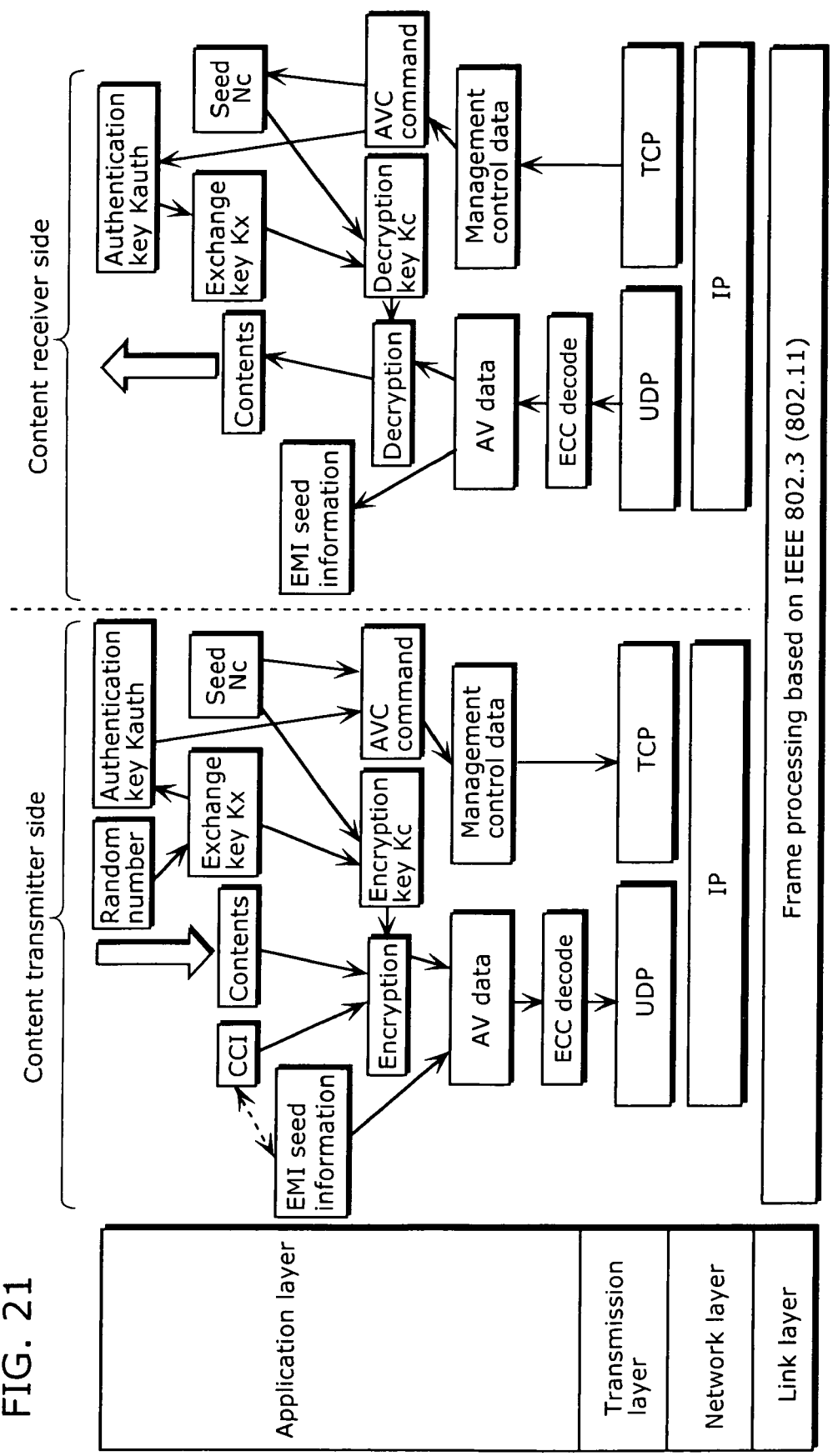
FIG. 21 is an illustration of the protocol stack in the second variation of the fifth embodiment of the present invention.

FIG. 21 is an illustration of the protocol stack in the second variation. At the transmitter side, an error correction code (ECC encode) is added to the AV data, and the AV data is passed to UDP. In addition, at the receiver side, the data is received by the UDP processing, and subjected to error correction, and then passed to the upper layer as the AV data.

Figure 22:
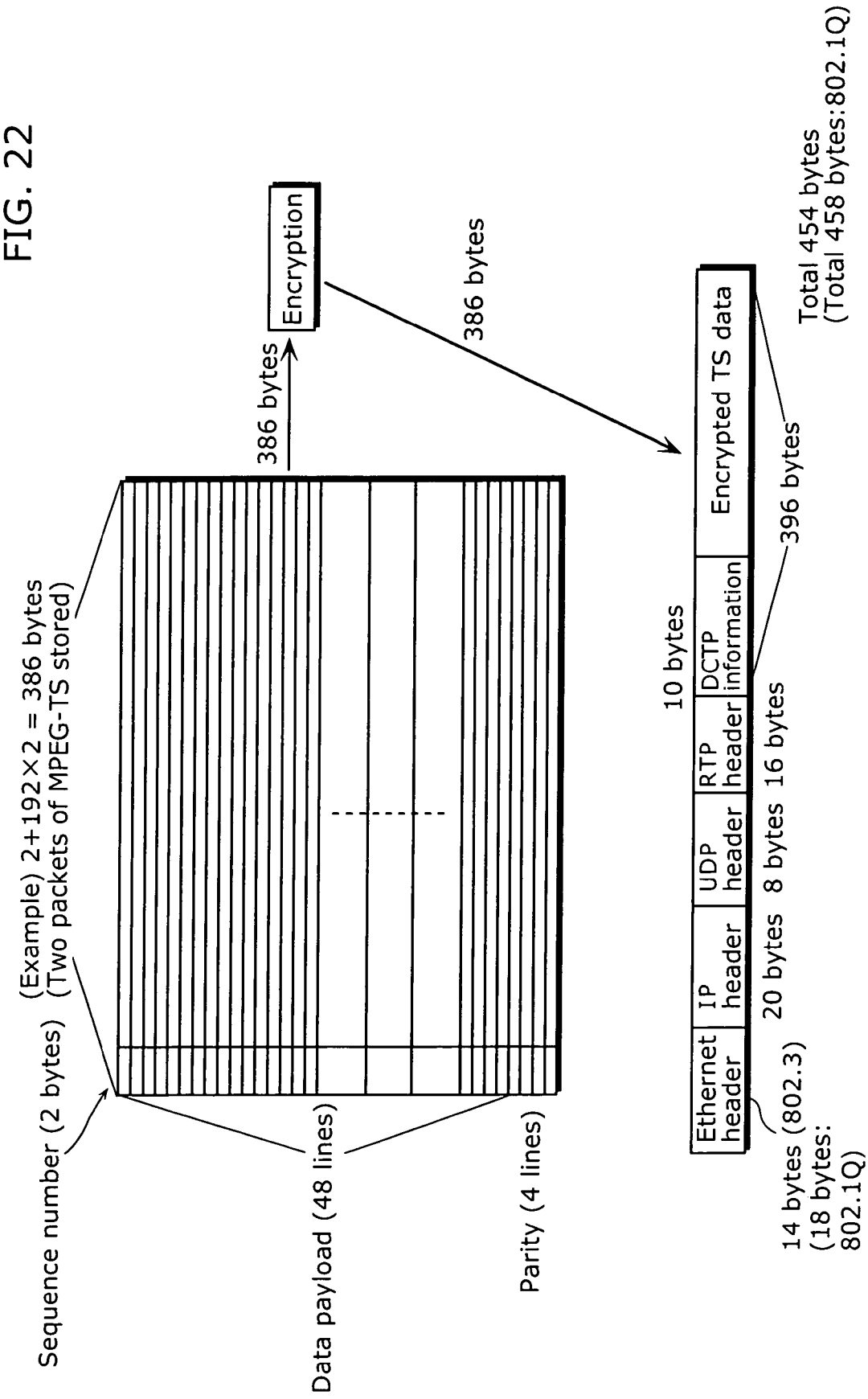
FIG. 22 is an illustration in the case where an error correction scheme is the Reed-Solomon scheme.
Figure 23:
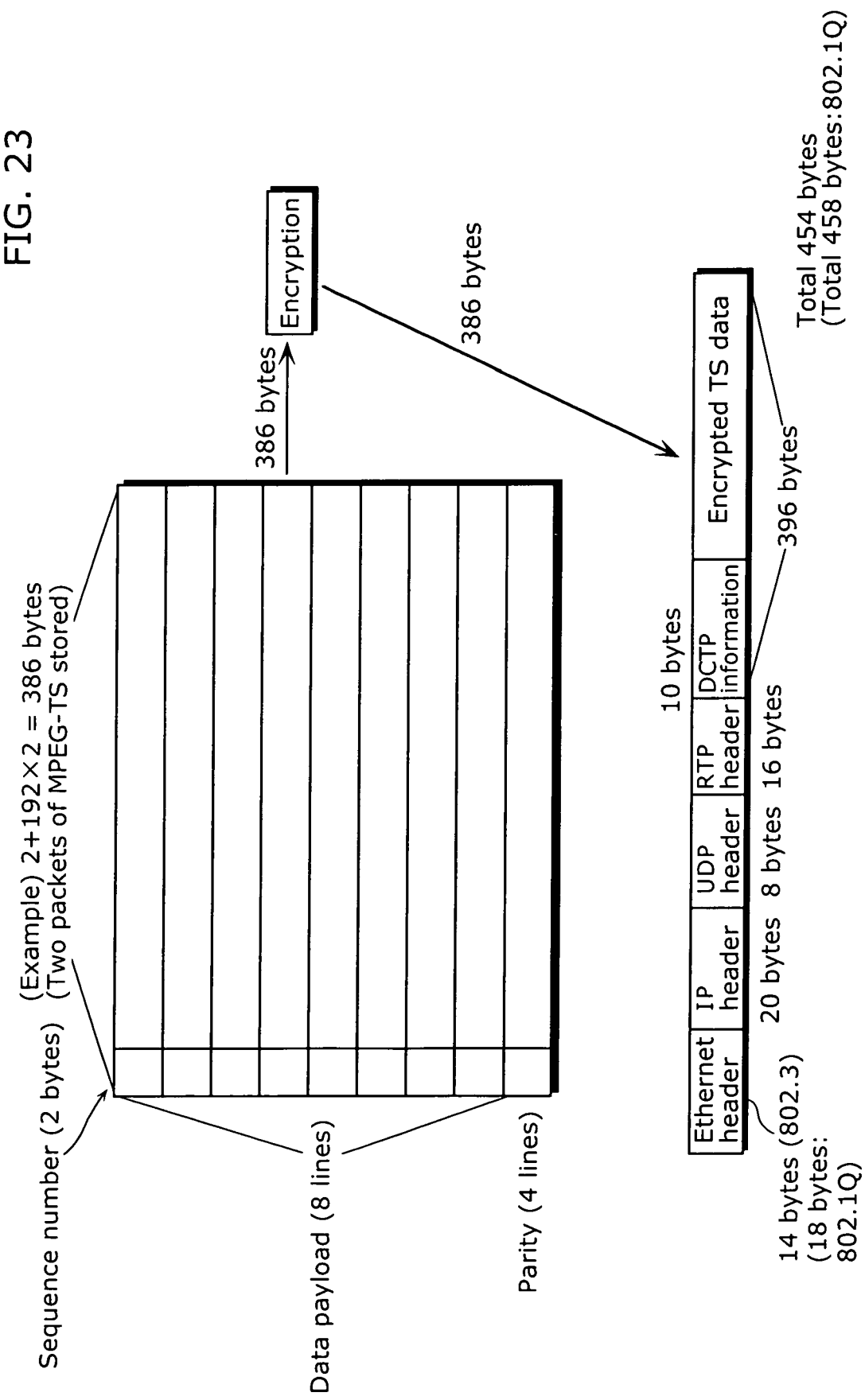
FIG. 23 is an illustration in the case where an error correction scheme is the parity scheme.

Here, an example of error correction processing will be described with reference to FIG. 22 and FIG. 23. FIG. 22 is an illustration of the correction processing in the case where the error correction scheme is the Reed-Solomon scheme. FIG. 23 is an illustration of the correction processing in the case where the error correction scheme is the Parity scheme. An MPEG-TS is inputted to an error correction interleave matrix on a two-unit basis. Note that two-byte sequence numbers are used for each line. Subsequently, as shown in FIGS. 22 and 23, for example, the earlier-mentioned 10-byte DTCP information (4-bit EMI information, 64-bit seed information and other 12 bits) is used, and further an RTP header, a UDP header, an IP header, and an Ethernet® header are added so as to configure an Ethernet® frame.

In this way, an MPEG-TS signal is encrypted between the packet transmitter and receiver apparatuses using the DTCP scheme and further an error correction code is added. This makes it possible to perform real-time transmission of the MPEG-TS signal. Further, since the second packet generation unit 902 is configured to be hardware, no left packet to be transmitted and unreceived packet is generated inherently stemming from software processing. In addition, the first packet generation unit 901 with a small data amount can be processed by an inexpensive processor such as a microcomputer.

Sixth Embodiment

Figure 24:
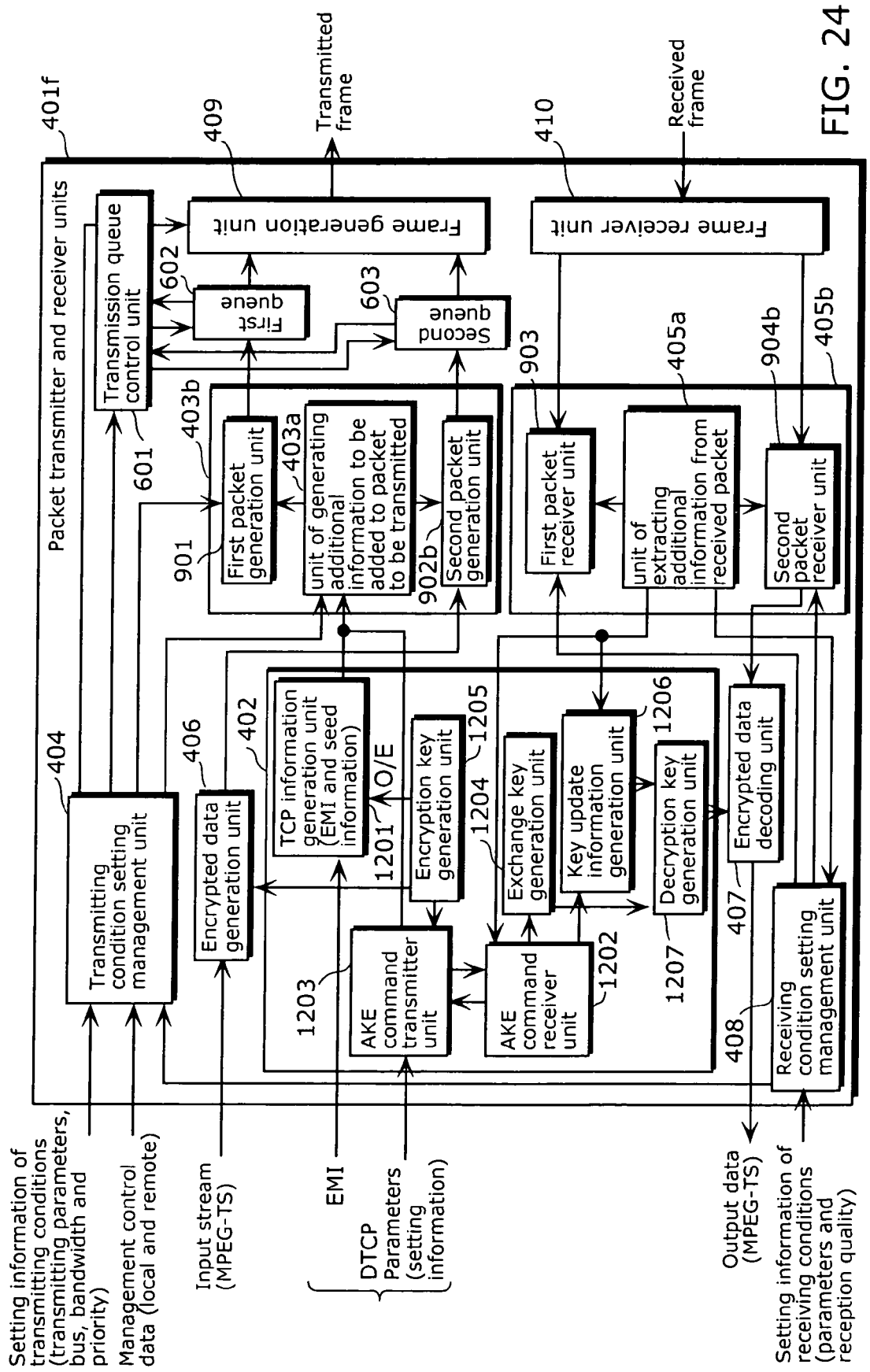
FIG. 24 is a block diagram of the packet transmitter and receiver unit in a sixth embodiment of the present invention.

Next, a sixth embodiment of the present invention will be described. FIG. 24 is a block diagram showing the configuration of a packet transmitter and receiver unit 401f in this embodiment. In FIG. 24, the packet transmitter and receiver unit 401f has the same configuration as the packet transmitter and receiver unit 401e shown in FIG. 17 except that it has a packet generation unit 403b (to be more precise, it is a second packet generation unit 902b) and a packet receiver unit 405b (to be more precise, it is a second packet receiver unit 904b). Hence, the new parts will be described below.

Figure 25:
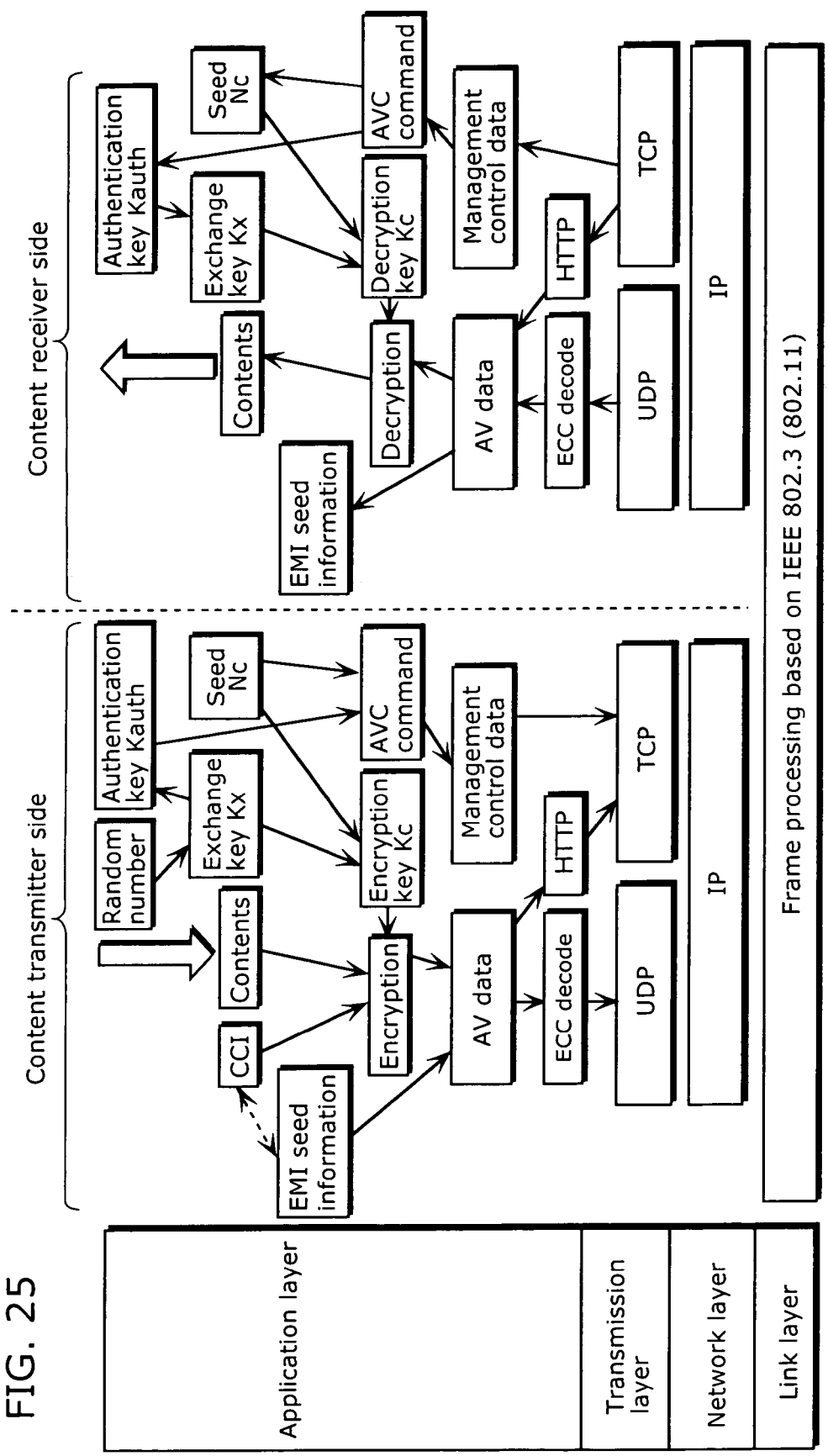
FIG. 25 is an illustration of the protocol stack in the sixth embodiment of the present invention.

FIG. 25 is an illustration of a protocol stack in this embodiment. At the transmitter side, an error correction code (ECC encode) is added to the AV data. There is a case where the AV data is passed to UDP, and a case where it is passed to TCP via HTTP. Here, whether the AV data is passed to RTP or HTTP is controlled by the receiver side. It performs switching control of RTP and HTTP. For example, in generation of packets of AV data, RTP which provides a small delay is used in the case where the AV data output of the receiver side is outputted to the display, and HTTP which reduces the number of packet losses by re-transmission is used in the case where the AV data output of the receiver side is stored in the recording medium. In this way, in the case of outputting it to the display at the receiver side by switching control, it becomes possible to transmit AV contents at low delay. In addition, in the case of storing it at the receiver side, it becomes possible to transmit the AV contents which has become high-quality through the compensation of signal losses due to packet losses. Note that, in FIG. 25, the protocol processing at the receiver side is performed by performing the procedures at the transmitter side inversely.

Figure 26:
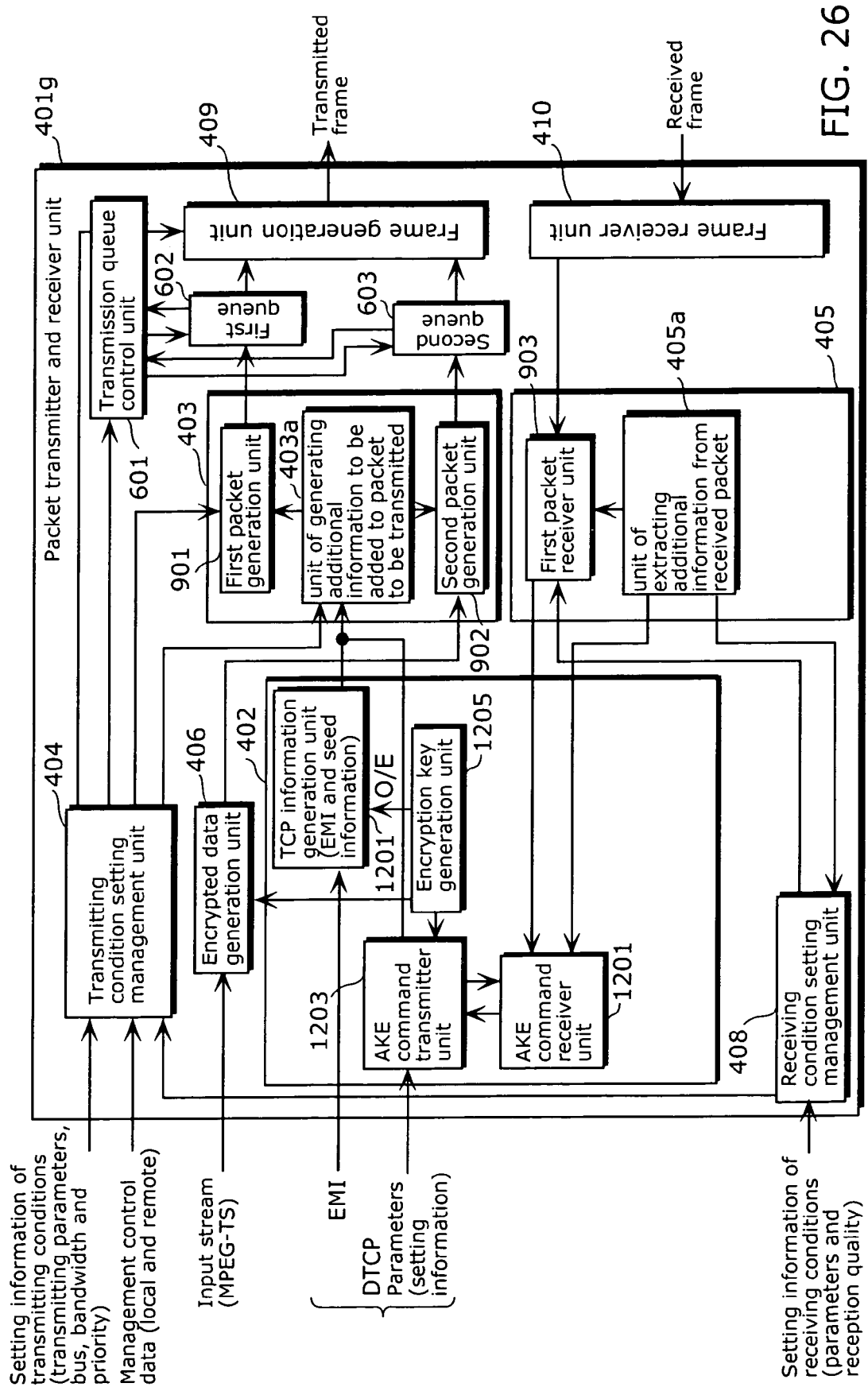
FIG. 26 is a block diagram of the packet transmitter and receiver unit in a first variation of the sixth embodiment of the present invention.
Figure 27:
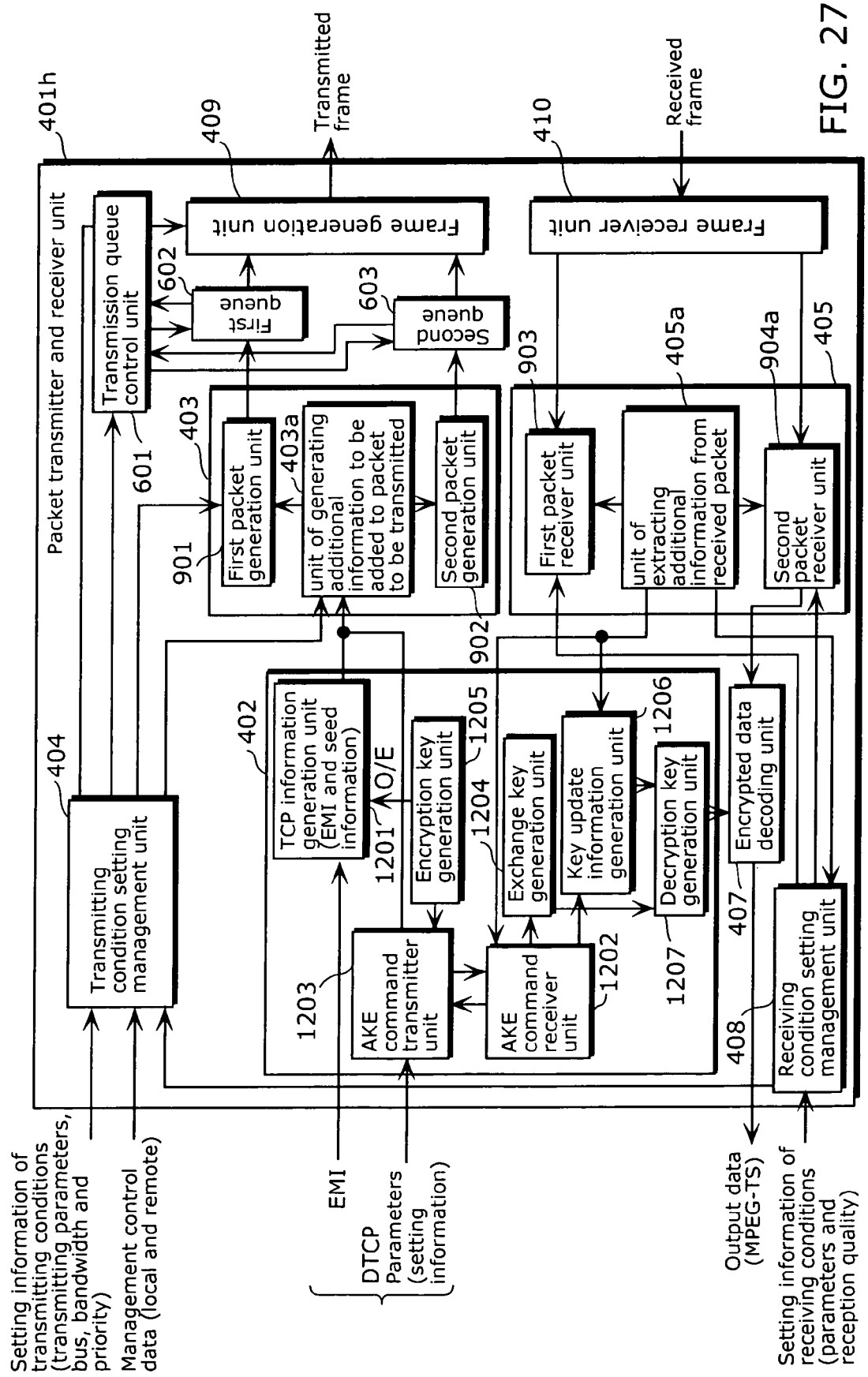
FIG. 27 is a block diagram of the packet transmitter and receiver unit in a second variation of the sixth embodiment of the present invention.

Here, FIG. 26 shows a block diagram showing the configuration of a packet transmitter and receiver unit 401g in a first variation of this embodiment. FIG. 27 shows a block diagram showing the configuration of a packet transmitter and receiver unit 401h in a second variation of this embodiment. A receiving function or a transmitting function of AV contents such as an MPEG-TS is omitted from the configurations of them, but others are the same as the configuration of the packet transmitter and receiver unit 401*f* in this embodiment. The packet transmitter and receiver unit 401*g* and the packet transmitter and receiver unit 401*h* like this can be applied to an apparatus for transmitting or receiving only, and the cost can be reduced.

Seventh Embodiment

Figure 28:
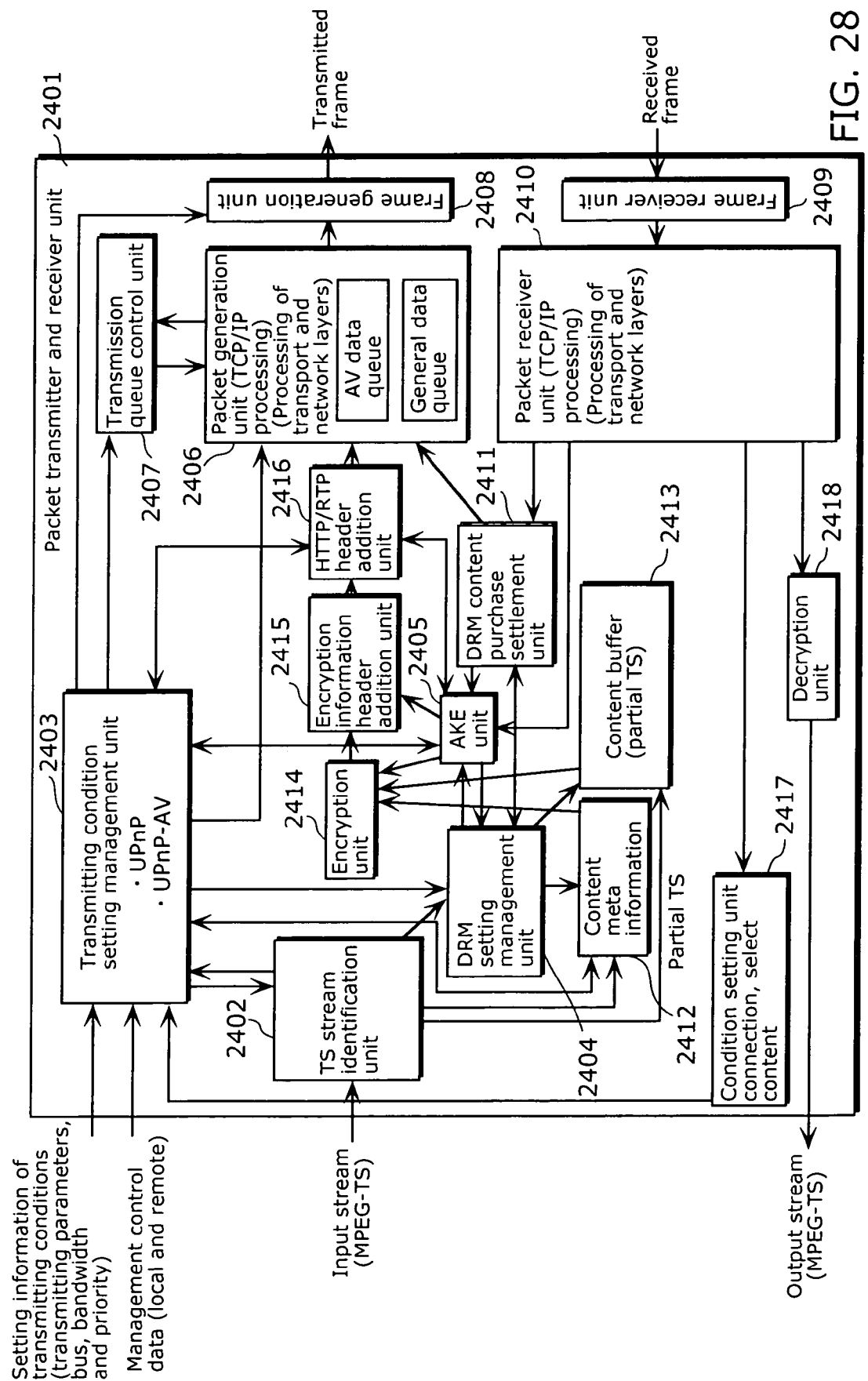
FIG. 28 is a block diagram of the packet transmitter and receiver unit in a seventh embodiment and an eighth embodiment of the present invention.

Next, a seventh embodiment of the present invention will be described. FIG. 28 is a block diagram showing the configuration of a packet transmitter and receiver unit 2401 in this embodiment. This packet transmitter and receiver unit 2401 is intended for performing encryption of inputted AV contents according to transmitting conditions included in the related meta information, addition of the related meta information, and generation of packets of the AV contents. It is composed of a TS stream identification unit 2402, a transmitting condition setting management unit 2403, a Digital Rights Management (DRM) setting management unit 2404, an AKE unit 2405, a packet generation unit 2406, a transmission queue control unit 2407, a frame generation unit 2408, a frame receiver unit 2409, a packet receiver unit 2410, a DRM content purchase settlement unit 2411, a content buffer 2413, an encryption unit 2414, an encryption information header addition unit 2415, an HTTP/RTP header addition unit 2416, a condition setting unit 2417, and a decryption unit 2418.

Here, input terminal information indicating a terminal to which AV data to be transmitted is inputted, and AV data information including data format information indicating the data format of the AV data and attribute information indicating the attribute of the AV data are inputted into the transmitting condition setting management unit 2403. More specifically, the information include: transmission information such as a format type, a transmission destination address and a port number of the data to be transmitted; setting information of transmitting conditions such as information of a path used in the transmission (routing information), the bandwidth of the data to be transmitted, the transmission conditions such as the transmission priority of the data to be transmitted; management control data of apparatuses in the transmitter unit (local) and the receiver unit (remote); and data for providing the receiver side with a feedback of a receiving status.

Concerning a selection of contents, URI information extended by Query is provided for each contents stored in a storage medium or each broadcasting channel. Here, as to the URI, URI information of the contents is mapped onto the principal data part and the authentication information of the contents is mapped onto the Query part. In this way, it is possible to set modes so that no authentication is necessary for transmitting contents provided by the URI information with no Query part and authentication is necessary for transmitting contents provided by the URI information with a Query part. An example of URI and a Query can be provided in the following format.

<service>://<host>:<port>/<path>/<filename>.
    <ext>?AKEPORT=<port2>

Here, "<host>:<port>/<path>/<filename>. <ext>" represents the URI of the AV contents and the file name, and "<port2>" of the following Query part represents the port number for authentication. Here, in general, in the case where an authentication server serves also as a content providing server, the IP address of the port for authentication is the same as the IP address of the AV contents. However, in the case where an authentication server is different from a content providing server, the IP address of the port for authentication is different from the IP address of the AV contents. The transmitter side provides the receiver side with these units of execution mode information for authentication by the URI and the Query. The receiver side can receive the URI and the Query information using a Web brouser or the CDS of a UPnP-AV, and determine an authentication mode.

In addition, the DRM setting management unit 2404 receives DRM setting information (charge information, playback control information, or copy control information) from a transmitting condition setting management unit 2403 or a TS stream identification unit 2402, holds and manages the information, and passes related information which is necessary for authentication and key exchange to the AKE unit 2405. More specifically, the DRM setting management unit 2404 generates at least one of charge information, copy control information, valid period information and valid playback times information for performing playback control, output control and copy control of the AV data. The information is generated based on the DRM setting information to be passed from the transmitting condition setting management unit 2403 and the like. It passes the generated information to the AKE unit 2405 as the authentication information. Here, "DRM" is digital copyright management. In the case where this DRM setting management unit 2404 judges that DRM charging and purchase processing is necessary for transmitting the contents, the DRM content purchase settlement unit 2411 performs purchase processing of the contents. After the content purchase processing is finished, the DRM content purchase settlement unit 2411 sets the copy control information (CCI) of the contents, and passes it to the AKE unit 2405. Note that the AKE unit 2405 includes an authentication unit which performs authentication processing, and an encryption key exchange unit which exchanges an encryption key with the receiver side.

When AKE setting information is inputted to the AKE unit 2405, the information related to this AKE setting information such as copy protection information and encryption key update information are inputted to the packet generation unit 2406. A TCP/IP header is added in the packet generation unit 2406, and further a MAC header is added in the frame generation unit 2408 so as to be converted into an Ethernet® frame and outputted to a network as a frame to be transmitted.

Figure 29:
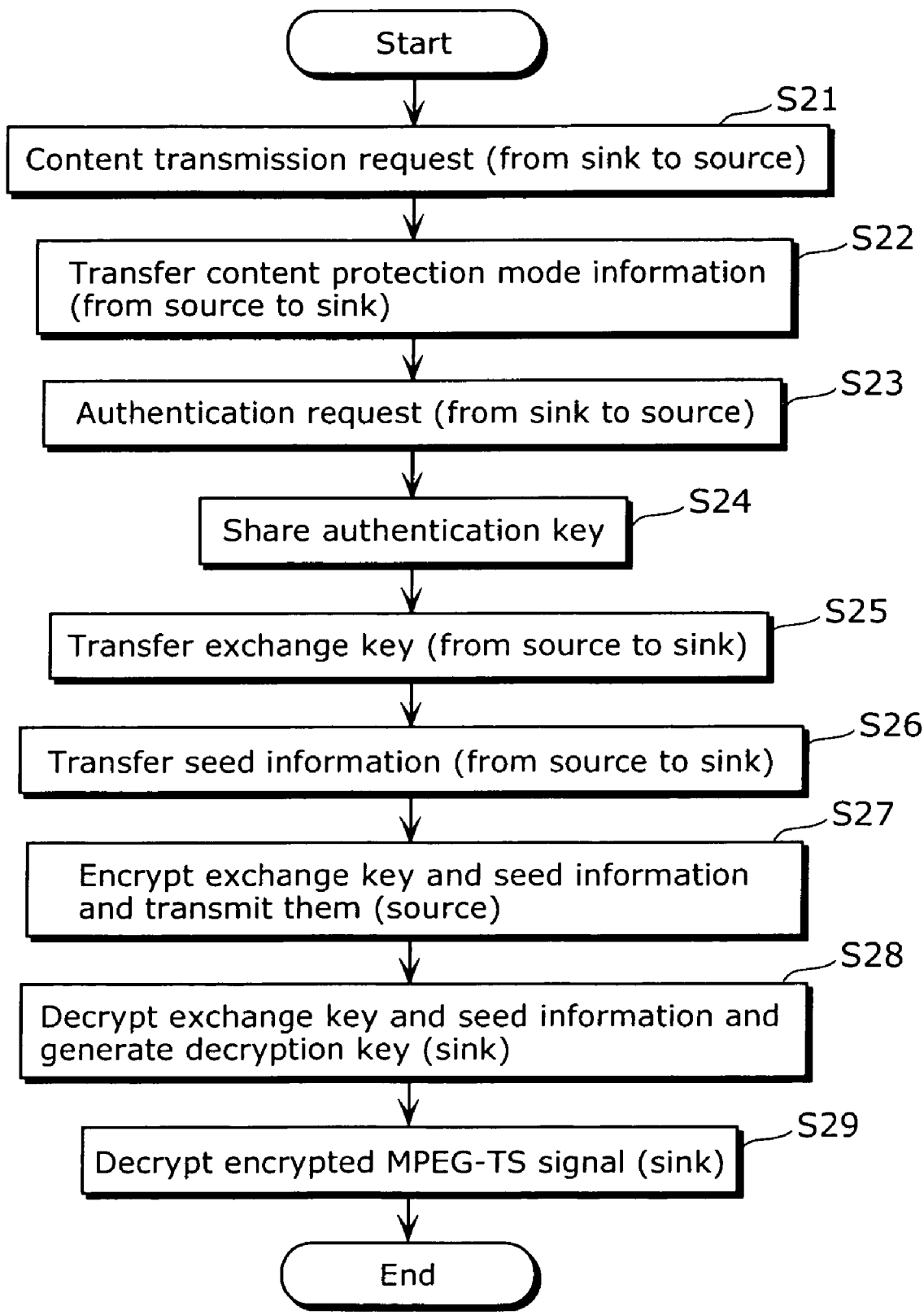
FIG. 29 is a flow chart showing a transmission procedure of encrypted contents by the DTCP method in the seventh embodiment of the present invention.

FIG. 29 is a flow chart showing a transmission procedure of encrypted contents according to the DTCP method in an implementation of the present invention. An example of a transmitting step of AV contents subjected to a copyright protection according to the DTCP method will be described with reference to this flow chart. Here, the AV contents compliant with DRM represents copy control of digital broadcasting, the Right Management and Protection (RMP) method which is handled in server broadcasting (the ARIB standard and the STD-B38), or content protection information handled in various types of network DRMs.

Here, RMP is a specification developed for the purpose of copyright management of contents and privacy protection of users in a system proposed by the TV Anytime forum (http://www.tv-anytime.org/). In addition, the Rights Management & Protection Information (RMPI) is a description and definition of right information indicating content use conditions. Functions which can be described by RMPI include use conditions such as viewable times of contents by a user, copy availability and copy times. The RMPI is also encrypted and transmitted securely, and the contents protected by the RMPI can be viewed within the range of the described conditions. In the server broadcasting, there is a demand for preventing an unauthorized use or manipulation of a program of digital information which is stored in a storage device such as a hard disc inside a receiver and includes video with no deterioration.

In addition, it becomes easy to edit and reconstruct a program using meta data such as a program name, a starting/ending time, program contents concerning a broadcast program to be transmitted along with the broadcast program and view the program. Therefore, a control mechanism concerning how a broadcast receiver plays back, transmits and views a received program is important.

A right management protection like this is performed, and as an example, contents are encrypted using an encryption key of a scrambled broadcast which is updated on a second-by-second basis, stored as it is in a hard disc inside the receiver side, and the encryption of the contents is decrypted at the time of playing back and viewing the contents. In addition, a scramble key is encrypted using a content key to be provided on a program-by-program basis so as to also perform protection on a program-by-program basis. Encryption like this makes it possible to prevent unauthorized manipulation of a stored program, and makes it impossible to prevent a program from being viewed even in the case where the program is copied in an unauthorized manner because a content key is necessary for viewing it. A broadcasting station can control allowed period for viewing of even a program stored by a receiver by adding use conditions such as valid period to the earlier-mentioned content key.

The use of playback control function like this makes it possible to develop a broadcast program into a licensing service or a charging service. For example, in the case of viewing contents which has expired, a broadcast receiver can request a license for viewing the program to a broadcasting station, and obtain a content key with a new varied period through broadcast, a telephone circuit or the Internet so as to view the program.

(Step S21) First, a receiver side selects desired contents in a content list provided by a UPnP-AV or a CDS from a transmitter side, and casts a transmission request of the content to the source side.

(Step S22) Data including copy control information or DRM information is extracted from a TS stream identification unit 2402, and inputted to the AKE unit 2405 via the DRM setting management unit 2404.

As DTCP information, protection mode information (EMI information) of contents is outputted from the AKE unit 2405 to the encryption information header addition unit 2415, and added as header information in the encryption information header addition unit 2415, and then inputted to the packet generation unit 2406.

(Step S23) In the receiver side (sink), when copy protection information of contents is inputted from the packet receiver unit 2410 to the AKE unit 2405 which performs AKE command receiving processing, the AKE unit 2405 analyzes the copy protection information, determines an authentication method to be used from among a full authentication and a restricted authentication, and transmits an authentication request to the source.

(Step S24) A processing predetermined by the DTCP is performed between the source and the sink, and an authentication key is shared. In this way, authentication by the AKE unit 2405 is performed. For example, authentication with the receiver side (sink) is performed based on input terminal information, data format information, attribute information, and authentication conditions to be generated based on charge information, copy control information, valid period information and valid playback times information.

(Step S25) Next, the source encrypts an exchange key using the authentication key in the AKE unit 2405, transmits it to the sink via the packet generation unit 2406, and the exchange key is decrypted in the AKE unit of the sink.

(Step S26) In the source, in order to change the encryption key temporally, seed information (O/E) which changes temporally is generated in the encryption key generation unit of the AKE unit 2405, and it is transmitted to the sink via the AKE unit 2405, the encryption information header addition unit 2415, and the HTTP/RTP header addition unit 2416.

(Step S27) In the source, an encryption key is generated based on the exchange key and the seed information in the AKE unit 2405 which generates an encryption key, encrypts an MPEG-TS in the encryption unit, and outputs it to the packet generation unit 2406.

(Step S28) The AKE unit 2405 which is inside the sink and generates encrypted key exchange information receives seed information from the packet receiver unit 2410, and restores a decryption key based on the seed information and the exchange key.

(Step S29) In the sink, the decryption unit 2418 decrypts an input of the encrypted MPEG-TS signal using this decryption key, and outputs it.

Here will be described an operation in the case where here is DRM contents and the copy available times is N times (N is an integer of 2 or more).

First, in the case where the receiver terminal is copliant with the DRM, it sets the CCI indicating a transmission encryption status at Copy One Generation (COG), Copy No More (CNM) or Copy Never (CN), and transmit it. Here, as an embedded CCI encrypted and transmitted, "information of remaining copy available times" is transmitted as (N−1) times to the receiver side. The receiver side decrypts the encryption of it, and then the terminal compliant with the DRM sets the remaining copy available times as (N−1) times.

In addition, in the case where the receiver terminal is not compliant with the DRM, it deletes the DRM information of contents and transmits the contents using the CCI of the NMC to the receiver side.

The AKE unit 2405 inputs the encrypted header information to the encryption information header addition unit 2415. The encryption information header addition unit 2415 performs addition control of the encryption information header in the following manner.

Note that as related information of AV data to be inputted in the transmitting condition setting management unit 2403 (in the case of broadcast or playback of stored contents), the following are conceivable as an example.

(Case 1) The case where the AV data is contents received by a broadcasting channel which broadcasts copy-free contents. As examples of broadcasting channels like this, for example, there are VHF and UHF analog broadcasting channels or BS analog broadcasting channels.

(Case 2) The case where the AV data is contents received by a broadcasting channel which broadcasts contents other than copy-fee contents even in a predetermined period. As examples of broadcasting channels like this, for example, there are toll channels of BS digital broadcasting or toll channels of CATV broadcasting. The copy control information of broadcasting channels which broadcast contents other than copy-free contents even in this predetermined period is characteristic in that Copy Never, Copy One Generation and Copy Free with an EPN flag are changed from moment to moment depending on broadcast contents.

Here, reception of a broadcasting channel which broadcasts contents other than copy-free contents even in a predetermined period can be controlled to be performed in the case where a provider which distributes the broadcast authenticates a receiver apparatus or a receiving user as an authorized receiver apparatus or a receiving user in the authentication unit. As conceivable examples of this authentication are authentication by a security module such as a B-CAS card of digital satellite broadcasting in Japan or a POD card used in CATV broadcasting in the United States.

In addition, addition control of encryption information headers is performed, for example, in the following manner. In other words, it is not performed in the case where a broadcasting channel which broadcasts copy-free contents is received. In addition, it is added in the case where a broadcasting channel which broadcasts contents other than copy-free contents even in a predetermined period is received. Further, it is added in the case where AV data is contents, having a Copy Free title, played back from the storage medium. Further, it is added in the case where AV data is contents, having a title other than the Copy Free title, played back from the storage medium.

As described above, by performing addition control of encryption information headers, it is possible to succeed and transmit the copy control information (CCI) of AV contents which has been set by the copyright owner also in a network transmission. Further, that the transmitter side and the receiver side share a rule for addition control of encryption information headers makes it possible to secure operation compatibility between different apparatuses.

Here, the packet generation unit 2406 generates packets of inputted data and transmits them according to transmission parameters determined by the transmitting condition setting management unit 2403.

The transmitting condition setting management unit 2403 provides the transmission queue control unit 2407 with transmitting conditions such as: transmission information such as a transmission destination address or a port number; information of a path used in transmission (routing information); the bandwidth of data to be transmitted; transmission priority of the data to be transmitted.

These data set headers and payload data to be generated by the packet generation unit 2406 and the frame generation unit 2408 by the TCP/IP processing.

At the receiver side, signals inputted via a network are filtered based on MAC headers by the frame receiver unit 2409, and inputted to the packet receiver unit 2410 as IP packets. The packet receiver unit 2410 performs filtering by identifying the IP packet headers or the like, and outputs the packets to the AKE unit 2405. In this way, the AKE unit of the transmitter side and the AKE unit of the receiver side are connected through a network, and thus messages are exchanged with each other through communication protocols. In other words, they can execute authentication and key exchange according to a procedure which is set by the AKE unit.

Once authentication and key exchange are established between the transmitter side and the receiver side, encrypted AV data is transmitted.

At the transmitter side, for example, in the case where an input signal is an MPEG full TS stream, it inputs the full TS stream into the TS stream identification unit 2402, and converts the full TS stream into a partial TS stream.

Subsequently, it transmits the converted partial TS stream to the content buffer 2413, and adjusts an encryption timing.

It inputs the partial TS output of the content buffer 2413 into the encryption unit 2414 and performs encryption, and adds AKE information such as the earlier-mentioned EMI and seed information (all of the bits of the seed information or a part of bits such as O/E) in the encryption information header addition unit 2415.

Further, it inputs these signals into the packet generation unit 2406, and adds TCP/IP headers to them using conditions provided by the transmission queue control unit 2407. In order to perform transmission priority control of packets, MAC headers are added using, for example, the 802.1 Q (VLAN) scheme in the frame generation unit 2408 so as to be converted into Ethernet® frames and outputted to a network as frames to be transmitted. Here, to set Priority (user priority) in the Tag Control Information (TCI) inside a MAC header high makes it possible to set the priority of the data with the MAC header in a network transmission higher than general data.

At the receiver side, signals to be inputted via a network are filtered based on MAC headers by the frame receiver unit 2409, and inputted to the packet receiver unit 2410 as IP packets. The packet receiver unit 2410 performs filtering by identifying packet headers, outputs transmission-related data such as transmitting conditions to the condition setting unit 2417, outputs AKE-related data to the AKE unit 2405, and outputs AV contents to the decryption unit 2418. The decryption unit 2418 performs removal of encryption information headers and decryption of the contents, and outputs a decrypted MPEG-TS signal.

Note that data for providing the transmitter side with a feedback of a receiving status is inputted in the condition setting unit 2417, and a feedback of the information setting headers and payload data in the packet generation unit 2406 for IP packets and the frame generation unit 2408 for Ethernet® frames are provided to the transmitting condition setting management unit 2403.

Figure 30:
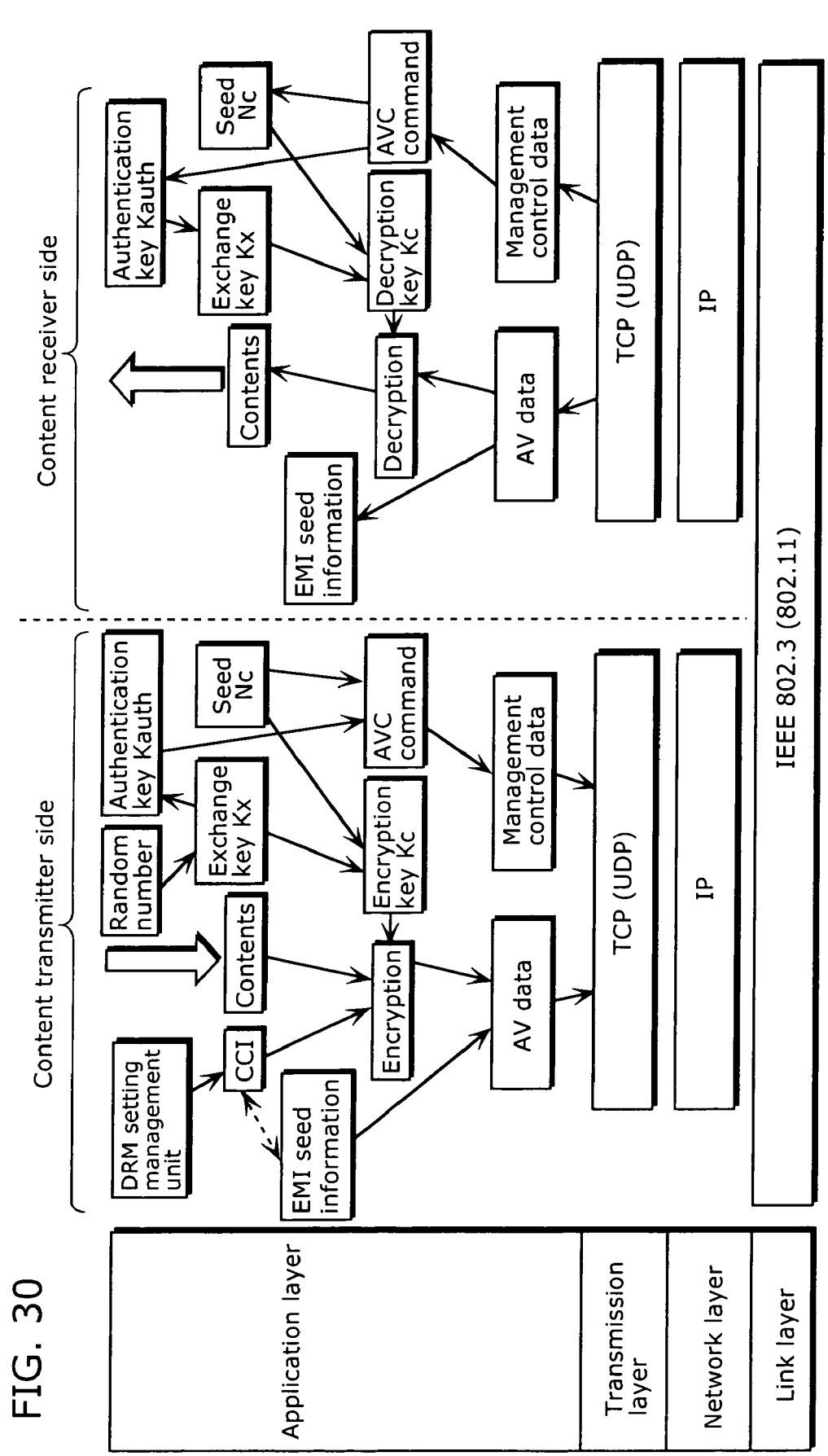
FIG. 30 is an illustration of the protocol stack in the seventh embodiment of the present invention.

Next, a supplemental description of the above procedure will be provided using a protocol stack of FIG. 30. In the transmitter side of FIG. 30, the encrypted contents and content protection mode information to be provided from the DRM setting management unit 2404 are transmitted from the transmitter side to the receiver side first. The receiver side analyzes the content copy protection information, determines an authentication method, and transmits an authentication request to the packet transmitter apparatus. Next, it generates a random number, inputs this random number into a predetermined function, and generates an exchange key. It inputs information of the exchange key into a predetermined function, and generates an authentication key. The receiver side shares the authentication key according to a predetermined procedure. Note that, as for encryption information used here, it is transmitter side's unique information (the apparatus ID, the apparatus authentication information, the MAC address or the like), information generated as a combination of one or more of a secret key, a public key, information provided from outside, or the like. To use strong encryption method with a strong encryption strength such as the DES method and the AES method makes it possible to perform strong encryption. Subsequently, the transmitter side encrypts the exchange key using the authentication key and transmits it to the receiver side, and the receiver side decrypts the exchange key. In addition, it inputs the exchange key and initial key update information into a predetermined function, and generates an encryption key. In order to change the encryption key temporally, it should be noted that the transmitter side generates key update information which changes temporally, and transmits it to the receiver side. An MPEG-TS which is the contents is encrypted using the encryption key. Subsequently, as AV data, the encrypted MPEG-TS is made into the payloads of TCP (or UDP) packets so as to generate TCP packets. Further, these TCP packets are used as the payloads of IP packets so as to generate IP packets. Further, these IP packets are used as the payloads of MAC frames so as to generate Ethernet® MAC frames. As such MACs, note that they can be applied to not only MACs by the IEEE 802.3 which is the Ethernet® but also MACs by the IEEE 802.11 which is a wireless LAN standard.

By the way, these Ethernet® MAC frames are transmitted from the transmitter side to the receiver side on the Ethernet®. The transmitter side generates a decryption key according to a predetermined procedure. Subsequently, IP packets are obtained by filtering the received Ethernet® MAC frames. Further, TCP (or UDP packets) are extracted from these IP packets. Subsequently, AV data is extracted from these TCP (or UDP) packets. An MPEG-TS (contents) is decrypted using the decryption key restored based on the exchange key and the key exchange information, and the decrypted MPEG-TS is outputted.

As described above, an AV stream such as an MPEG-TS signal is encrypted by the packet transmitter apparatus, and the IP packets are transmitted via a network. The packet receiver apparatus decrypts the IP packets into an original signal.

Note that the transmission queue control unit 2407 has an AV data queue as a first queue and a general data queue as a second queue.

As shown in FIG. 28, AKE setting information is inputted to the AKE unit 2405. The following are inputted to the packet generation unit 2406: information related to this AKE setting information (for example, copy protection information and encryption key update information), types of data to be transmitted, information of a transmission destination address and a port number, information of a path to be used in transmission (routing information), the bandwidth of the data to be transmitted, setting information of transmission conditions such as transmission priority of the data to be transmitted and the like, management control data of the apparatuses in the transmitter unit (local) and the receiver unit (remote), and the data for providing the transmitter side with a feedback of a receiving status. The information and data are subjected to TCP/IP processing performed in the packet generation unit 2406, and the packets are inputted into the first queue.

In addition, in the transmitter side, an MPEG-TS signal is inputted to the encryption unit 2414, and encrypted. Subsequently, this encrypted MPEG-TS signal is inputted into the packet generation unit 2406. The signal is subjected to TCP/IP processing performed in the packet generation unit 2406, and the packets are outputted into the AV data queue.

In the case where there are data in a first queue and a second queue, the transmission queue control unit 2407 performs output priority control of these data. In a normal state, it performs output control giving a higher priority to contents data such as an MPEG-TS and lower priority to general data. For example, it adaptively further increases the priority of the second queue so that MPEG-TS data are outputted preferentially, in the case where an MPEG-TS is transmitted between packet transmitter and receiver apparatuses at a low latency (low delay), a buffer for MPEG-TSs is become smaller, and thus the buffer tends to overflow. In the case where the buffer for MPEG-TSs in the transmitter side is about to overflow, or in the case where it is found that the buffer for MPEG-TSs in the receiver side is about to underflow by referring to a feedback information provided from the receiver side. This makes it possible to prevent these buffer failures from occurring.

It is good to give higher priority adaptively to the first queue in order to increase speed of apparatus control response such as playback and pause of the receiver side apparatus (remote apparatus), however, it should be noted that this may cause the earlier-mentioned buffers for MPEG-TSs to overflow or underflow.

It is possible to realize a fast control response by outputting only packets for apparatus control directly to the frame generation unit without passing any queue, as a method of preventing the buffers from overflowing and underflowing and increasing the speed of apparatus control response such as playback and pause of the receiver side apparatus (remote apparatus). Otherwise, it is possible to realize a fast control response according to a method of newly preparing a third queue for the packets for apparatus control.

In addition, AKE setting information is inputted to the AKE unit 2405 of FIG. 28. The following are inputted to the packet generation unit 2406: information related to this AKE setting information (for example, copy protection information and encryption key update information), types of data to be transmitted, information of a transmission destination address and a port number, information of a path to be used in transmission (routing information), the bandwidth of the data to be transmitted, setting information of transmission conditions such as transmission priority of the data to be transmitted and the like, management control data of the apparatuses in the transmitter unit (local) and the receiver unit (remote), and the data for providing the transmitter side with a feedback of a receiving status. The data is subjected to TCP/IP processing by local software processing where a processor is used, and the packets are inputted into a general data queue.

In the transmitter side, an MPEG-TS signal is inputted to the encryption unit 2414, and encrypted. Subsequently, this encrypted MPEG-TS signal is inputted to the packet generation unit 2406, subjected to UDP/IP processing by local hardware processing, and inputted to the AV data queue.

In the case where there are both an AV data queue which is the first queue and a general data queue which is the second queue, the transmission queue control unit 2407 performs priority control concerning data output from these two queues in a similar manner to the seventh embodiment.

By the way, in the receiver side, signals inputted via a network are filtered based on MAC headers in the frame receiver unit 2409 so as to obtain IP packets. Here, the IP packets outputted by the packet generation unit 2406 of the source are inputted to the packet receiver unit 2410 of the sink. These packets received in the general data queue are subjected to TCP/IP receiving processing by software processing where a processor is used, and outputted to the AKE unit 2405 or the condition setting unit 2417. In addition, the packets received in the AV data queue are subjected to UDP/IP receiving processing by hardware processing. The encrypted AV data are inputted to the decryption unit 2418 so as to be decrypted, and then outputted as an MPEG-TS.

For example, note that it is possible to generate other packets for exclusive use and transmit them, as a method of transmitting EMI and seed information from the transmitter side to the receiver side. This makes it further difficult to perform restoration of an encryption key, and thus it makes it further difficult to perform bugging and leakage of the contents. It is possible to further make it difficult to perform bugging and leakage of the contents by changing encryption parameters of AV data to be transmitted in real time in a public net such as the Internet or transmitting these parameters in a separate packet. As for management control data, they are made into TCP packets by software processing, and the TCP packets are made into the IP packets.

In addition, the AKE unit 2405 has an authentication execution mode for executing authentication between the transmitter side and the receiver side, and an authentication nonexecution mode for not executing authentication. The encryption unit 2414 performs addition of encryption information headers based on protection mode information of contents to be provided by the DRM setting management unit 2404, irrespective of whether the AKE unit 2405 is in an authentication execution mode or in an authentication non-execution mode.

By the way, the Ethernet® MAC frames are transmitted from the transmitter side to the receiver side on the Ethernet®. The receiver side generates a decryption key according to a predetermined procedure. Subsequently, IP packets are obtained by filtering the received Ethernet® MAC frames. Further, UDP packets are extracted from these IP packets, and AV data are extracted from the UDP packets. An MPEG-TS (contents) is decrypted using a decryption key Kc restored based on the exchange key and seed information, and outputted.

As described above, it becomes possible to encrypt an MPEG-TS signal and transmit it in real time between the packet transmitter apparatus and the packet receiver apparatus, and the second packet generation unit is configured to be hardware. Therefore, left packets to be transmitted and unreceived packets which inherently stem from software processing are not generated. In this way, all the priority data packets are completely transmitted. Thus, it becomes possible to transmit a high-quality video with guaranteed real-timeliness. In addition, general data are temporarily stored in a buffer unit, and intermittently transmitted while priority data transmission is preferentially performed. In addition, the first packet generation unit with a small data amount can be processed by an inexpensive processor such as a microcomputer.

Further, it is possible to receive Ethernet® frames by hardware processing even in the receiving processing and examine IP headers in the third layer and UDP headers in the fourth layer at the same time. It is possible to receive a high-quality video with guaranteed real-timeliness because no unreceived frames are generated by separating the MPEG-TS packets from general data packets and performing processing of these MPEG-TS packets by hardware processing.

It is possible to perform transmission control on a clock-by-clock basis by controlling the packet transmission timings or the data transmission ratio from these two transmission data queues not by software but by hardware. In this way, all the priority packets are completely transmitted, and thus it becomes possible to transmit a high-quality video with guaranteed real-timeliness. In addition, output packets shaping is also performed finely on a clock-by-clock basis. Therefore, it becomes possible to perform a high-quality communication with a low occurrence probability of packets discarding in the first-stage router or a switching hub.

In this way, an MPEG-TS signal is encrypted using the DTCP method and transmitted in real time between the packet transmitter apparatus and the packet receiver apparatus, and the second packet generation unit is configured to be hardware. Therefore, left packets to be transmitted and unreceived packets which inherently stem from software processing are not generated. In addition, the first packet generation unit with a small data amount can be processed by an inexpensive processor such as a microcomputer.

Note that the packet transmitter and receiver unit 2401 may notify the packet receiver apparatus of data format information, attribute information, and the control authentication information which is composed of at least one of charge information, copy control information, valid period information and valid playback times information, as a program list, by URI information specifying the access positions of AV data or URI information extended by a Query on a program-by-program basis.

Likewise, on receiving a transmission request of the program list from the receiver side (sink), the packet transmitter and receiver unit 2401 may notify the packet receiver apparatus of data format information, attribute information, and the control authentication information which is composed of at least one of charge information, copy control information, valid period information and valid playback times information, by URI information specifying the access positions of AV data on a program-by-program basis or URI information extended by a Query, as a program list.

Further, in the case where the copy control information of each program of the AV data indicates that no copy control is performed, the packet transmitter and receiver unit 2401 may generate two types of MIME-Type which are a first MIME-Type indicating data format information of the AV data and a second MIME-Type indicating data format information of the AV data with intermittently added encryption information headers, and may present these two extended URI information specifying the access positions in the AV data on a program-by-program basis to the packet receiver apparatus. It is possible to generate a logical description of each unit program (corresponding to "item" of AV data) as a resource, using "res" defined in the Universal Plug and Play (UPnP). For example, in the case of using a Content Directory Service (CDS) of the UPnP, the receiver side (client) can browse and search a unit program of a particular AV data as an item belonging to a Container mapped onto a logical directory structure inside the transmitter side (server). Here, as "res" representation to these two MIME-Types, it is possible to identify "res" as an available resource by, for example, inserting each MIME-Type into a third field of "protocolInfo" which is the attribute of the "res".

URI information representing a content position is used for specifying the URI of the "res" in the Universal Plug and Play (UPnP). Contents are identified by inserting these two MIME-Types into the third field of "protocolInfo" which is the attribute of the "res".

For example, to insert a different MIME-Type into a third field in <res protocolInfo="first field":"second field":"third field":"fourth field">"URI of res"</res> makes it possible to identify "res" which is a content resource even in the case where the other fields are the same.

As definitions of protocolInfo in the UPnP-AV, note that "first field" relates to a transmission protocol, "second field" relates to a network, "third field" relates to a content format, and "fourth field" relates to additional information.

For example, in the case where "first field" is "http-get", the "second field" is "*", the "third field" is "MIME-Type", and the "fourth field" is "additional information". In addition, in the case where "first field" is "rtp", the followings can be used: "*" as the "second field", "payload type of RTP" as the "third field", and "additional information" as the "fourth field".

In the case where transmission control where protocolInfo is used, to determine a new specification regarding the fourth field as "additional information" makes it possible to realize more detailed transmission control.

In addition, in the case of transmitting packets in multicast transmission, the packet transmitter and receiver unit 2401 may output both signals represented by these two "res", that is, packets with added encryption information headers and packets without such headers. In this case, the transmitter side adaptively select "res" to be received.

Eighth Embodiment

Next, an eighth embodiment of the present invention will be described. The configuration of a packet transmitter and receiver unit is basically the same as the one in the seventh embodiment shown in FIG. 28. The same parts as the ones in the seventh embodiment will not be described, and only the different parts will be described below.

In this embodiment, a transmission protocol is set so that contents which is being live-broadcast in the seventh embodiment is transmitted using the HTTP chunk transmission scheme in the HTTP/RTP header addition unit 2416 and the packet generation unit 2406. Note that the chunk transmission scheme is one of the transmission schemes defined by the HTTP, and it is defined as data transmission by transmission data chunk with a size determined between the receiver and the transmitter.

In this way, it becomes unnecessary that the receiver side (client) calculates a header length or a transmission content length to be added in the encryption each time an HTTP request is made, while it conventionally needs to calculate one. Thus, the processing load of the receiver side can be reduced. In particular, it is possible to reduce the processing load of the transmitter side and the receiver side while live-broadcast is being received.

As for the payload data length in HTTP, it is an integral multiple of an encryption information header and a TS which is the transmission payload to be encrypted, and the transmitter side can set a convenient value for it. In this chunk transmission, in the case where TCP connection is in a persistent connection mode (set at Keep Alive in the case of the HTTP version 1.0, or set at Persistent connection in the case of the HTTP version 2.0), it becomes unnecessary to disconnect and establish the TCP connection frequently each time a TCP transaction is made while contents are being transmitted. Thus, it is possible to perform an efficient AV transmission. Hence, in the case where it is determined that a transmission protocol of AV data is TCP as a transmission protocol of the AV data, the packet transmitter and receiver unit can bring the TCP connection to a persistent connection mode, and thus it can realize an efficient and stable transmission of AV data.

Ninth Embodiment

Figure 31:
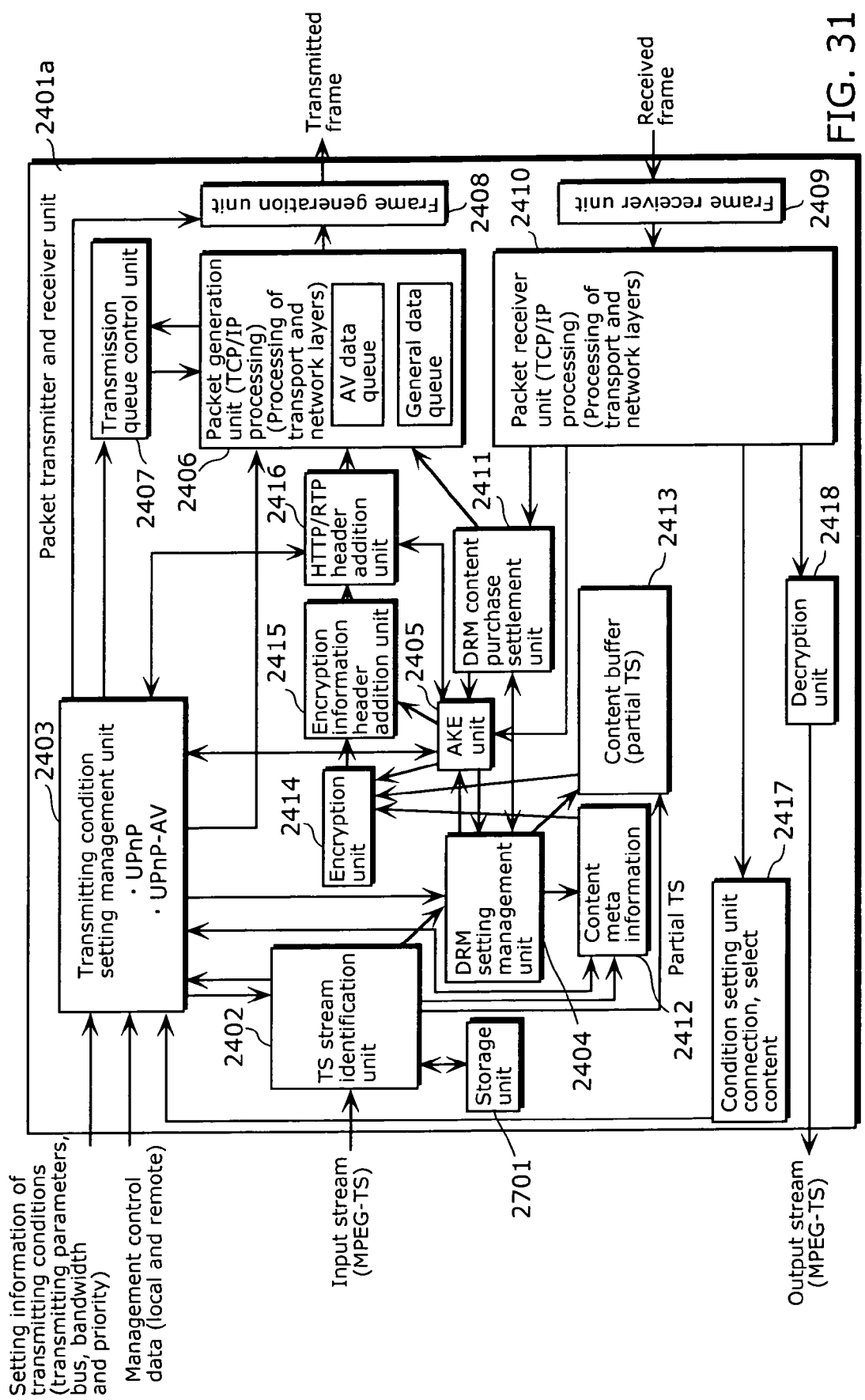
FIG. 31 is a block diagram showing the configuration of a packet transmitter and receiver unit in a ninth embodiment of the present invention.

Next, a ninth embodiment of the present invention will be described. FIG. 31 is a block diagram showing the configuration of a packet transmitter and receiver unit 2401a in this embodiment. This packet transmitter and receiver unit 2401a has a storage unit 2701 in addition to the configuration of the packet transmitter and receiver unit 2401 of the seventh embodiment shown in FIG. 28. The same parts as the ones in the seventh embodiment will not be described, and only the different parts will be described below.

This packet transmitter and receiver unit 2401a has a storage unit 2701 connected to a TS stream identification unit 2402. Here, the storage unit 2701 is a hard disc or an optical disc. In this embodiment, the packet transmitter and receiver unit 2401a transmits MPEG-TS data stored in the hard disc or the optical disc using a range request of HTTP.

This range request is a file including I-frame position information in a file which is paired with an MPEG-TS file stored in the storage unit 2701. An example is a so-called IFO file in the DVD-VR method. It is possible to realize trick playback such as fast forwarding, rewinding and slow playback by using a file with the I-frame position information which is equivalent to this IFO file in an efficient and easy manner.

As an applicable range of input data used in the present invention, it becomes possible to transmit AV contents compliant with server broadcasting or general DRMs such as different DRM schemes of manufactures, using DTCP-IP.

Note that it is possible to transmit AV data by switching transmission by HTTP and transmission by RTP. At this time, as for the transmission by HTTP, it can also be realized by performing chunk transmission in the case where an output from the source is a reception signal of live broadcast, a switching signal of reception channels, or a reproduction signal at the time of selecting a stored program, or by performing playback switching using the range request in the case where an output from the source is a reproduction signal from a program played back from a storage medium after the program selection.

Tenth Embodiment

Figure 32:
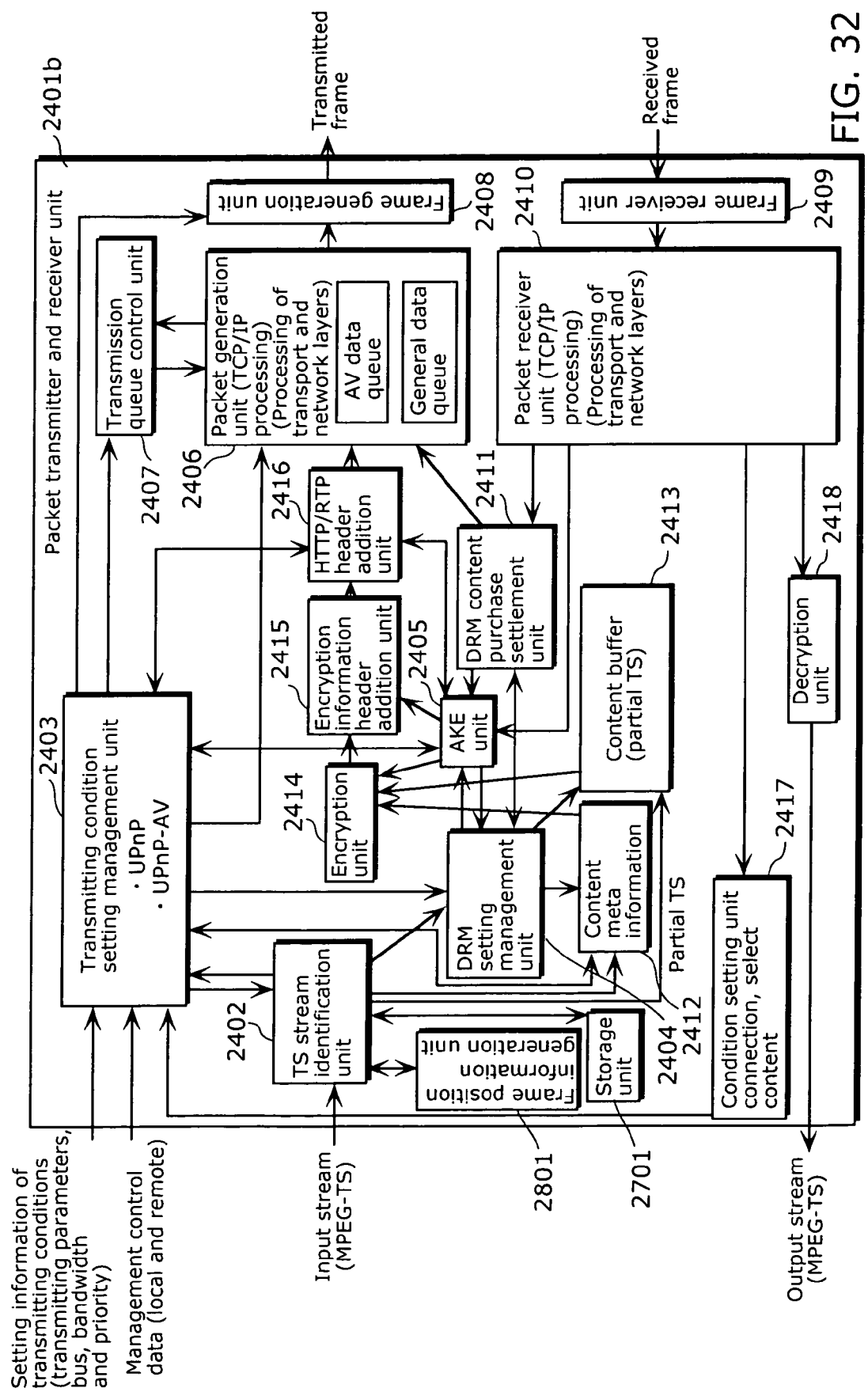
FIG. 32 is a block diagram showing the configuration of a packet transmitter and receiver unit in a tenth embodiment of the present invention.

Next, a tenth embodiment of the present invention will be described. FIG. 32 is a block diagram showing the configuration of a packet transmitter and receiver unit 2401b in this embodiment. This packet transmitter and receiver unit 2401b has an I-frame position information generation unit 2801 in addition to the configuration of the packet transmitter and receiver unit 2401a of the ninth embodiment shown in FIG. 31. The same parts as the ones in the ninth embodiment will not be described and only the different parts will be described below.

In the case of contents with different storage formats stored in a hard disc or an optical disc, the client (sink) has to understand files storing I-frame position data of all the different contents in the storage unit 2701. When the number of formats becomes great, a heavy load is placed on the transmitter side. Therefore, in this embodiment, the transmitter side generates common I-frame position information, based on different I-frame position information, using a common I-frame position information generation unit 2801. In this way, it is possible to realize trick playback such as fast forwarding, rewinding and slow playback easily even in the case of different storage formats such as an HDD storage format, a DVD-VR method, and a BD method of manufactures.

In this packet generation, HTTP receives a range request from the receiver unit or a data obtainment command, and transmits payload data including at least one of the AV data and the encryption mode information. In the case where the AV data in the transmitter side is MPEG, this range request or data obtainment command is executed referring to at least one of continuity information indicating an occurrence of discontinuity in the MPEG stream, position information of an I-picture, P-pictures, and B pictures of the MPEG stream in the AV data file, the respective numbers of P-pictures and B pictures or the total number of P-pictures and B pictures which exist between an I-picture and the next I-picture. Here, continuity information indicating an occurrence of discontinuity in the MPEG stream can be generated based on the DIT information described in the ARIB standard, the ARIB-TR-B14 or the second part of the ARIB-TR-B14. In the case of an MPEG partial TS, a discontinuity point of this stream is an occurrence point of discontinuity in a system time base of an MPEG-TS stream, for example, an occurrence point of discontinuity in PCRs or an occurrence point of discontinuity in "continuity_counter" of a transport packet header of a packet which constitutes a partial TS.

In addition, as for position information of MPEG I-pictures, P-pictures or B-pictures in an AV data file, I-picture, P-picture or B-picture's common position information which is common in different formats are generated based on position information of I-pictures, P-pictures or B-pictures which are originally included even in the case where the AV data have different formats and time information of the MPEG I-pictures, P-pictures or B-pictures. This common position information of I-pictures, P-pictures or B-pictures are used as reference information of position information and time information of MPEG I-pictures, P-pictures or B-pictures in the AV data file. In this way, there is a great merit that a remote terminal can directly access a specific picture, based on common position information or time information of I-pictures, P-pictures or B-pictures, for example, even in the case of an MPEG-TS file stored in a different format.

Figure 33:
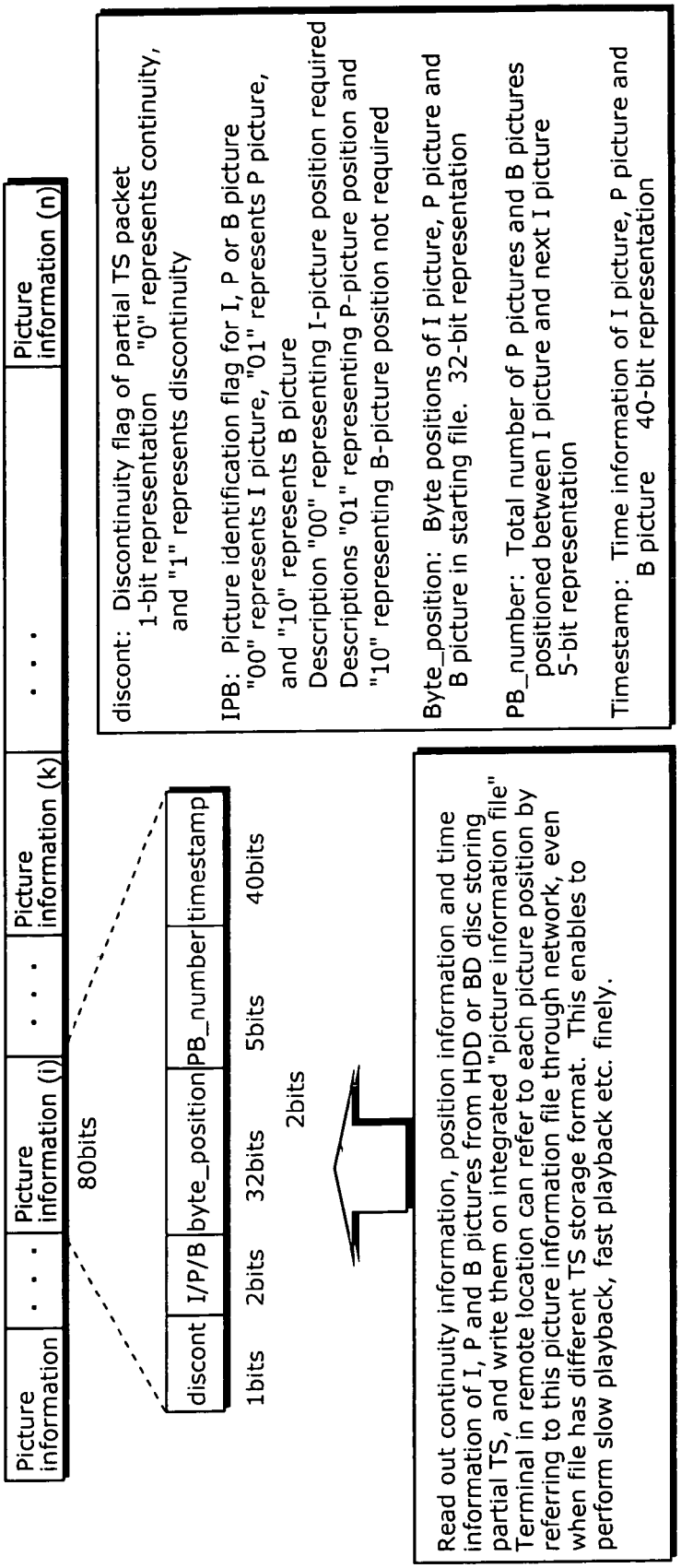
FIG. 33 is a diagram showing the configuration of a picture information file.

For example, as an example shown in FIG. 33, "picture information file" having integrated continuity and position information of I-pictures, P-pictures or B-pictures, and the like are read out from an HDD or a BD disc storing a partial TS. The terminal which exists in a remote place can refer to each picture position finely by referring to this integrated picture information file, based on byte positions and time information (timestamp) through a network, even in the case of a different TS storage format.

In FIG. 33, "discont" is a 1-bit flag indicating a discontinuity point in a partial TS. For example, a TS is continuous when the value indicates "0", and a TS is discontinuous when the value shows "1". In addition, "IPB flag" is a 2-bit identification flag indicating an I-picture, a P-picture or a B-picture. A value "00" indicates an I-picture, a value "01" indicates a P-picture, and a value "10" indicates a B-picture. Here, it is necessary to describe the "IPB flag" in the case of an I picture, but it is not always necessary to describe the "IPB flag" in the case of a P picture or a B picture. In addition, byte positions of an I-picture, P-pictures and B-pictures in a starting file is shown by "Byte_position" of 32 bits. Further, the total number of P-pictures and B-pictures which exist between an I-picture and the next I picture is indicated by "PB_number" of 5 bits. "Timestamp" is time information of I-pictures, P-pictures and B-pictures. A timestamp value of a TS in a specific position such as the starting position of a TS sequence with a timestamp which constitutes each of the MPEG I-picture, P-picture or B-picture is converted into a 40-bit timestamp, and the timestamp is used. The definitions of the respective parameters and flag values are not limited to the above-mentioned combinations.

As described above, with this embodiment, it is possible to realize trick playback such as slow playback or fast playback finely and beautifully. Note that it is possible to consider this picture information file as a filtering function which enables the remote terminal to view picture positions in the MPEG-TS file with a different storage format in the local terminal. In other words, it is possible to generate a common picture information file, based on the AV data file storing an MPEG-TS in a unique file format and the related-information file.

In addition, with this embodiment, there is provided an effect of making it possible to access an MPEG I-picture, P-picture or B-picture efficiently, even in the case of implementation by a transmitter and receiver apparatus which does not implement AKE or encryption processing of AV contents.

Further, another function of the present invention will be described. In a content buffer 2413, an error correction code of the Reed-Solomon scheme or the like is added to an MPEG-TS signal, and the MPEG-TS signal is encrypted in an encryption unit 2414. In this way, the MPEG-TS signal is encrypted using the DTCP method between the packet transmitter and receiver apparatuses, and further provided with an error correction code, and thus real-time transmission of the MPEG-TS signal becomes possible. Here, in the case where a packet generation unit for header addition and transmission processing of MPEG-TSs is configured to be hardware, left packets to be transmitted and unreceived packets which inherently stem from software processing are not generated. In addition, packets of general data with small data amount can be processed by an inexpensive processor such as a microcomputer.

In the case where packets are transmitted using a general communication network such as the IP network which does not guarantee the ordinality of packets, in the above-mentioned embodiment, packets may be provided with sequence numbers and transmitted, and the receiver side may guarantee the ordinality of the packets using the sequence numbers. The guarantee of ordinality can be performed in the fourth or the upper layers of the OSI model, that is, in RTP or video signal processing.

In addition, it is possible to take a countermeasure because AV signal packets, which are subjected to hardware processing at the transmitter side and transmitted, are not fragmented through a network. In other words, it is good that the transmitter side checks in advance the maximum size (MTU) of a packet which is not fragmented in a communication network in the application-level processing, and transmits packets having a size below the maximum size. Otherwise, since the RFC standard defines that all terminals must handle IP packets having a size of 576 bytes, IP packets having a size of 576 bytes or less are not fragmented by various network apparatuses such as routers. Consequently, it is good that the transmitter side adjusts the packet size of an AV signal to be subjected to hardware processing at the transmitter side so that the sizes of these IP packets become 576 bytes or less. Note that it is possible to process all the received fragmented packets as general packets on condition that AV signal packets to be subjected to hardware processing at the transmitter side are not fragmented. In addition, since a transmitter terminal has to fragment each packet with a size exceeding the maximum value of an IP packet of the Ethernet®, it is a matter of course that the size of each packet has to be the maximum value or below in order to prevent priority packets to be fragmented.

In addition, in the case where there is little possibility that such fragmentation occurs in a communication network, fragment processing load of a receiver terminal may be reduced by setting a fragment prohibition flag at the IP header of each packet of an AV signal subjected to hardware processing at the transmitter side and transmitted, and by causing a router to discard the IP packet in the case where the router cannot help but to fragment the IP packet. While few packets are lost in this case, it is possible to guarantee a communication quality by means that the receiver side performs error correction or error modification.

Further, the Ethernet® is taken as an example of a communication net protocol in the embodiment, but the present invention is not limited to this.

In addition, an MPEG-TS is used as an example of video signal processing, but the present invention is not limited to this. As for an applicable range of input data used in the present invention, the range is from an MPEG-1/2/4 TS stream (ISO/IEC 13818) to every stream concerning video and audio including a stream standardized by DV (IEC 61834, IEC 61883), SMPTE 314M (DV-BASED), SMPTE 259M (SDI), SMPTE 305M (SDTI) and SMPTE 292M (HD-SDI). A video or audio data rate is not limited to CBR (constant bit rate). Further, the present invention does not exclude any data as long as it is video or audio, or general real-time data or data to be transmitted and received preferentially.

In addition, as an applicable range of input data used in the present invention, it is applicable for data file transfer. In the case of file transfer, it is possible to realize transmission higher than real-time transmission under a certain condition, depending on processing capability of transmitter and receiver terminals and a propagation delay time between these transmitter and receiver terminals.

In addition, as an applicable range of input data used in the present invention, it becomes possible to transmit server broadcasting or manufacturers' general AV contents compliant with DRM such as the DRM scheme, using DTCP-IP.

In addition, in the embodiment, the packet transmitter and receiver apparatus may transmit N programs composed of AV data by assigning the programs to N ports for UDP or TCP. Here, N is an integer of 2 or more. At this time, the respective N programs assigned to the respective N ports can represent the followings: a broadcast receiving tuner or a storage media device which is built in a source, by a container format of the UPnP unit; the broadcast reception channel or the storage program, by an item format of the UPnP unit; presence positions of items (which become "res" as resources) by URIs; and a transmission protocol or attribute information by "res" representation using protocolInfor of UPnP. Thus, it is possible to realize a detailed transmission system such as simultaneous transmission of plural programs to plural clients.

In addition, here is a case where broadcast is received and there are plural transmission streams, transmitted from a source to a sink, of N programs (res) assigned to the respective N ports in the transmitter side. Each stream is represented by a property format of UPnP. Any of the followings are included as the attribute of the property of a specific transmission stream: a tuner container type; a tuner ID of each tuner container type; a channel ID selected by the tuner; availability information as to sharing/preemption with/by other clients of a transmission stream; TCP or RTP port numbers used in the transport layer by which the stream is transmitted; a connection ID, of the UPnP-AV unit of the sink, which the ConnectionManager of the UPnP-AV unit of the sink sets as to an item-related logical connection to the ConnectionManager of the UPnP-AV unit of the source; and a connection ID, of the UPnP-AV unit of the source, which the ConnectionManager of the UPnP-AV unit of the source sets as to an item-related logical connection to the ConnectionManager of the UPnP-AV unit of the sink. This enables the receiver side (client, sink) to determine whether there is space in a transmission stream or not, and determine the channel and the tuner which are selected by referring to the property and its attribute of the transmission stream, at the time of selecting a channel of a tuner inside the transmitter side (server, source).

For example, as for a UPnP-AV container structure in the case where broadcast is received, a tuner container is placed below <root>. As a container type, a tuner container is assigned to each broadcasting system such as ground digital broadcasting, BS digital broadcasting, 110 CS digital broadcasting with a wide bandwidth. In this case, a channel of each broadcasting system is assigned as an item below each tuner container. The receiver side can recognize the transmitter side's tuner container and channel item inside the tuner container, using a search or browse command of the CDS of UPnP. The item as a channel has accompaniment information transmitted from a broadcasting station.

Likewise, here is a case where a stored content is played back and there are plural transmission streams, transmitted from a source to a sink, of N programs assigned to the respective N ports in the transmitter side. Each stream is represented by a property format of UPnP. Any of the followings are included as the attribute of the property of a specific transmission stream: a container type of a storage media device, a storage media device ID of each container type of a storage media device, a program ID selected by the storage media device, availability information including sharing of a transmission stream, TCP or RTP port numbers used in the transport layer by which the stream is transmitted, a connection ID, of the UPnP-AV unit of the sink, which the ConnectionManager of the UPnP-AV unit of the sink sets as to an item-related logical connection to the ConnectionManager of the UPnP-AV unit of the source; and a connection ID, of the UPnP-AV unit of the source, which the ConnectionManager of the UPnP-AV unit of the source sets as to an item-related logical connection to the ConnectionManager of the UPnP-AV unit of the sink. This enables the sink to determine whether there is space in a transmission stream or not, and determine the program and the storage media device which are selected by referring to the property and its attribute of the transmission stream, at the time of selecting a program of a storage media device inside the source.

For example, as for a UPnP-AV container structure in the case where a storage and recording device is a hard disc drive (HDD), a DVD-RAM drive, and a BD drive, containers for them are placed below <root>. As a container type, a container is assigned to each device such as an HDD, a DVD-RAM drive, and a BD drive. In this case, a storage and recording content is assigned as an item below each container on a program-by-program basis. This enables the receiver side to recognize the storage and recording device container of the transmitter side and the storage and recording contents inside the storage and recording device container, using a search or browse command of the CDS of UPnP. The stored and recorded item has accompaniment information provided when recorded.

In addition, in the case where the client receives and stores an item belonging to a broadcasting container of the transmitter server, it generates property of each broadcasting system using the attribute (An attribute is intended for distinguishing a broadcasting system such as ground digital broadcasting, BS digital broadcasting, and 110 CS digital broadcasting with a wide bandwidth) of a tuner container of each broadcasting system, and stores the property as the property of the generated item stored and recorded in a storage and recording device. In this way, it is possible to identify contents and the broadcasting system from which the contents has been broadcast, by viewing the property of the item played back from a storage and recording device, even in the case where a container for each broadcasting system is not prepared in the storage and recording device.

As described above, the client which newly performs a server connection can grasp a use status of the server, and performs selection and transmission of contents in a further efficient manner, irrespective of whether broadcast is received or storage contents are played back.

Note that the UPnP-AV unit is logically associated with a transport unit which uses HTTP or RTP which requires TCP or UDP, based on a logical pair of "TCP or UDP port numbers used in the transport layer by which a stream is transmitted" and "a connection ID, of the UPnP-AV unit of the sink, which the ConnectionManager of the UPnP-AV unit of the sink sets as to an item-related logical connection to the ConnectionManager of the UPnP-AV unit of the source; and a connection ID, of the UPnP-AV unit of the source, which the ConnectionManager of the UPnP-AV unit of the source sets as to an item-related logical connection to the ConnectionManager of the UPnP-AV unit of the sink". This makes it possible to logically associate the UPnP-AV layer which uses the CDS or the Connection Manager Service (CMS) with the transport layer which uses HTTP/TCP/IP one-to-one. Therefore, it becomes possible to realize transmission control such as content establishment, content selection, content transmission, disconnection, management of existing connection. In addition, it is possible to associate the transmission control unit by HTTP with the UPnP-AV unit one-to-one, by describing connectionID of the UPnP-AV unit in the extension field of a message header of a request message of HTTP or in the extension field of a message header of a response message of the HTTP.

INDUSTRIAL APPLICABILITY

The present invention is applicable as packet transmitter apparatuses such as a digital tuner, a DVD recorder and the like, In particular, the present invention is applicable as a packet transmitter apparatus which prevents copy-restricted contents of digital broadcasting or a DVD disc from being copied illegally and transmits it securely through an IP network, succeeding the copy control information which has been set by the copyright owner. For example, it is also applicable as a packet transmitter apparatus which transmits premium contents such as a movie from a digital tuner or a DVD recorder in a living room on the first floor of a general home to a display in a bedroom on the second floor.

The invention claimed is:

1. A packet transmitter apparatus which transmits packet data to a packet receiver apparatus, said transmitter apparatus comprising:
an audio and video (AV) data information obtainment unit operable to obtain AV data information including: input terminal information indicating a terminal to which AV data is inputted; data format information indicating a data format of the AV data; and attribute information indicating an attribute of the AV data;
a data input unit operable to receive the AV data and non-AV data;
a transmitting condition setting management unit operable to extract at least one of charge information, playback control information and copy control information of the AV data, from the non-AV data or the AV data, and generate, based on the extracted information, encryption mode information indicating an encryption mode which serves as a condition at the time when the AV data is transmitted;
an encrypted data generation unit operable to generate encrypted data by encrypting, based on transmitting conditions, the AV data received by said data input unit, and adding encryption information headers based on the encryption mode information to the encrypted AV data, the transmitting conditions being determined as a combination of the input terminal information, the data format information and the attribute information;
a packet generation unit operable to generate packets by adding packet headers to the encrypted data generated by said encrypted data generation unit;
an authentication unit operable to perform authentication processing for encryption or decryption of the AV data with the packet receiver apparatus using Uniform Resource Identifier (URI) information indicating an access position of the AV data in the packet transmitter apparatus or extended URI information;
a transmission protocol determination unit operable to determine a transmission protocol of the AV data between said packet transmitter apparatus and said packet receiver apparatus, using at least one of the input terminal information, the attribute information and information indicating a transmission mode specified by said packet receiver apparatus; and
a transmission unit operable to transmit the packets including the encrypted data generated by said packet generation unit to said packet receiver apparatus according to the transmission protocol determined by said transmission protocol determination unit, after the authentication processing with said packet receiver apparatus is completed,
wherein said packet generation unit is operable to generate the packets according to one of HyperText Transfer Protocol (HTTP), TCP and Internet Protocol (IP).

2. The packet transmitter apparatus according to claim 1, further comprising
a copyright management unit operable to generate at least one of charge information, copy control information, valid period information and valid playback times information which are intended for performing one of playback control, output control and copy control, based on the at least one of the charge information, the playback control information and the copy control information inputted by said transmitting condition setting management unit, and notify said authentication unit of the generated information as authentication information,
wherein said authentication unit is operable to perform one of playback control, output control and copy control of the AV data in said packet receiver apparatus, by performing authentication processing with said packet receiver apparatus based on the authentication information notified by said copyright management unit.

3. The packet transmitter apparatus according to claim 1, further comprising
a content purchase settlement unit operable to perform purchase settlement of a content which is subjected to copyright protection with said packet receiver apparatus, based on one of the charge information, the playback control information and the copy control information, under control of said copyright management unit.

4. The packet transmitter apparatus according to claim 1, wherein:
said authentication unit is operable to (a) execute authentication processing by verifying that said packet transmitter apparatus and said packet receiver apparatus satisfy a prescribed condition, (b) share an encryption key between said packet transmitter apparatus and said packet receiver apparatus, after the authentication processing, and (c) update the encryption key based on the input terminal information, the data format information, the attribute information and transmitting conditions generated based on the charge information, the copy control information, the valid period information and the valid playback times information; and
said encrypted data generation unit is operable to encrypt the AV data using the encryption key.

5. The packet transmitter apparatus according to claim 1, wherein
said encrypted data generation unit is operable to add encryption information headers based on the encryption mode information irrespective of whether the copy control information indicates performing copy control or whether the copy control information indicates not performing copy control.

6. The packet transmitter apparatus according to claim 1, wherein:
said authentication unit has an authentication execution mode for executing authentication between said packet transmitter apparatus and said packet receiver apparatus and an authentication non-execution mode; and
said encrypted data generation unit is operable to perform addition of encryption information headers based on the encryption mode information irrespective of whether said authentication unit is in the authentication execution mode or whether said authentication unit is in the authentication non-execution mode.

7. The packet transmitter apparatus according to claim 6, wherein said encrypted data generation unit is operable to add the copy control information as the encryption information headers, in the case where the copy control information indicates performing copy control, and operable not to add the copy control information as the encryption information headers, in the case where the copy control information indicates not performing copy control.

8. The packet transmitter apparatus according to claim 7, wherein said authentication unit is operable to perform authentication with said packet receiver apparatus, based on the input terminal information, the data format information, the attribute information, and authentication conditions generated based on the charge information, the copy control information, the valid period information and the valid playback times information.

9. The packet transmitter apparatus according to claim 8, further comprising an access position notification unit operable to notify said packet receiver apparatus of the data format information, the attribute information, and control authentication information which is composed of at least one of the charge information, the copy control information, the valid period information and the valid playback times information, the information being notified as a list of the program by Uniform Resource Identifier (URI) information specifying an access position of each program unit of the AV data or URI information extended by a Query.

10. The packet transmitter apparatus according to claim 8, further comprising an access position notification unit operable to notify said packet receiver apparatus of the data format information, the attribute information, and control authentication information which is composed of at least one of the charge information, the copy control information, the valid period information and the valid playback times information, the information being notified as a list of the program by Uniform Resource Identifier (URI) information specifying an access position of each program unit of the AV data or URI information extended by a Query, on receiving a transmission request of the program list from said packet receiver apparatus.

11. The packet transmitter apparatus according to claim 8, further comprising an access position notification unit operable to generate a first Multipurpose Internet Mail Extensions (MIME)-Type indicating data format information of the AV data and a second MIME-Type indicating data format information of data obtained by intermittently adding the encryption information headers to the AV data, and present said packet receiver apparatus with two units of extended URI information specifying access position of each program unit of the AV data.

12. The packet transmitter apparatus according to claim 11, wherein the two units of extended URI information used for specifying a URI of "res" in Universal Plug and Play (UPnP), and a content is identified by inserting one of the two MIME-Types into a third field of protocolInfo which is an attribute of the res.

13. The packet transmitter apparatus according to claim 1, said apparatus further comprising:

a first buffer and a second buffer in which AV data and non-AV data to be transmitted to said packet receiver apparatus are temporarily stored respectively; and a priority control unit operable to perform priority control of said first buffer and second buffer, so that priority data, stored in one of said first buffer or said second buffer, is preferentially transmitted to said packet receiver apparatus.

14. The packet transmitter apparatus according to claim 13, wherein said priority control unit is operable to perform the priority control so that the AV data is preferentially outputted from said first buffer, while the non-AV data is kept from overflowing from said second buffer.

15. The packet transmitter apparatus according to claim 1, wherein said transmission unit is operable to transmit the AV data with a Transmission Control Protocol (TCP) connection set in a persistent connection mode, in the case where said transmission protocol determination unit determines TCP as a transmission protocol of the AV data.

16. The packet transmitter apparatus according to claim 1, wherein said authentication unit is operable to perform authentication and key exchange in order to share an encryption key with said packet receiver apparatus according to a Digital Transmission Content Protection (DTCP) scheme.

17. The packet transmitter apparatus according to claim 1, wherein said packet generation unit is operable to:

generate the packets by one of a range request and a data obtainment command, in the case where the packets are generated according to HTTP; and generate the packets by referring to at least one of: continuity information indicating an occurrence of discontinuity in a Moving Picture Expert Group (MPEG) stream; position information of one of an MPEG I-picture, P-picture, and B-picture in a file of the AV data; time information of one of the MPEG I-picture, P-picture, and B-picture; and one of (a) the respective numbers of P-pictures and B-pictures which are placed between an I-picture and a next I-picture and (b) the total number of the P-pictures and the B-pictures, in the case where the AV data in the transmitter side is MPEG AV data.

18. The packet transmitter apparatus according to claim 1, wherein said packet generation unit is operable to:

generate position information or time information of an I-picture, P-picture or B-picture which is common between different formats, based on position information or time information of I-pictures, P-pictures or B-pictures which is originally included in the AV data having different formats, as position information or time information of an MPEG I-picture, P-picture or B-picture in a file of the AV data; and generate the packets including reference information of the position information or the time information of the MPEG I-picture, P-picture or B-picture in the file of the AV data, using the position information or the time information of the common I-picture, P-picture or B-picture.

19. The packet transmitter apparatus according to claim 1, wherein
said packet generation unit is operable to generate the packets using a chunk transmission scheme in the case of generating the packets according to HTTP so that a payload length of an HTTP packet has a value determined by said packet transmitter apparatus.

20. The packet transmitter apparatus according to claim 1, wherein
said packet generation unit is operable to generate the packets so that the payload length of an HTTP packet has (a) a length of data composed of an encryption information header and a Transport Stream (TS) including an integer-number of AV data or (b) a length of data composed of an encryption information header and a TS with an integer-number of timestamps.

21. The packet transmitter apparatus according to claim 1, wherein
said transmission unit is operable to transmit AV data according to HTTP, switching a range request method and a chunk transmission scheme.

22. The packet transmitter apparatus according to claim 1, wherein
said transmission unit is operable to:
transmit AV data according to HTTP, using a chunk transmission in the case where an output of said packet transmitter apparatus is (a) a reception signal of live-broadcast or (b) a reproduction signal at the time of switching a reception channel of the live-broadcast or selecting a stored program; and
transmit AV data according to HTTP, performing playback switching by a range request method in the case where an output of said packet transmitter apparatus is a reproduction signal from a program played back from a storage medium after the program is selected.

23. The packet transmitter apparatus according to claim 1, wherein
said packet generation unit is operable to generate the packets according to one of Real-time Transport Protocol (RTP), User Datagram Protocol (UDP) and IP.

24. The packet transmitter apparatus according to claim 23, wherein
said transmission unit is operable to output both packets provided with the encryption information header and packets without the encryption information header, in the case where the packets are transmitted using multicast transmission.

25. The packet transmitter apparatus according to claim 24, further comprising
an access position notification unit operable to:
generate two MIME-Type which are C-Type indicating data format information of the AV data and a second MIME-Type indicating data format information of data obtained by intermittently adding the encryption information headers to the AV data; and
present said packet receiver apparatus with two units of extended URI information specifying access positions on a program unit of the AV data basis,
in the case where copy control information of each unit program of the AV data indicates not performing copy control.

26. The packet transmitter apparatus according to claim 25, wherein
the two units of extended URI information is used for specifying a URI of "res" in Universal Plug and Play (UPnP), and a content is identified by inserting one of the two MIME-Types into a third field of protocolInfo which is an attribute of the res.

27. The packet transmitter apparatus according to claim 1, wherein
said transmission unit is operable to transmit the AV data, switching HTTP transmission and RTP transmission.

28. The packet transmitter apparatus according to claim 27, wherein said transmission unit is operable to:
transmit AV data according to HTTP, using a chunk transmission in the case where an output of said packet transmitter apparatus is (a) a reception signal of live-broadcast or (b) a reproduction signal at the time of switching a reception channel of the live-broadcast or selecting a stored program; and
transmit AV data according to HTTP, performing playback switching by a range request method in the case where an output of said packet transmitter apparatus is a reproduction signal from a program played back from a storage medium after the program is selected.

29. The packet transmitter apparatus according to claim 1, wherein
said transmission unit is operable to transmit the AV data according to one of the following data stream formats: an uncompressed Secure Digital (SD) format defined by the Society of Motion Picture & Television Engineers (SMPTE) 259 standard; an uncompressed Hard Disc (HD) format defined by the SMPTE 292M standard; a transmission stream format of Digital Video (DV) by the Institute of Electric and Electronic Engineers (IEEE) 1394 defined by the International Electrotechnical Commission (IEC) 61883 standard or an MPEG-TS of digital broadcasting; an MPEG-TS format by the Digital Video Broadcasting (DVB)-Asynchronous Serial Interface (ASI) defined by the DVB standard A 010; an MPEG-Packetized Elementary Stream (PES); an MPEG-Elementary Stream (ES); an MPEG-4; and the International Organization for Standardization (ISO)/IEC H.264.

30. The packet transmitter apparatus according to claim 29, wherein
said packet generation unit is operable to generate the packets by adding timestamps to data blocks which constitute the AV data and mapping one or more integrated data blocks with a timestamp onto each RTP or HTTP packet as a payload of each RTP or HTTP packet.

31. The packet transmitter apparatus according to claim 30, wherein
said packet generation unit is operable to add timestamps to TS packets respectively and map integrated TS packets with timestamps onto the RTP or the HTTP packet, in the case of transmitting the AV data using an MPEG-TS.

32. The packet transmitter apparatus according to claim 31, wherein:
a clock of a timestamp to be added to each TS packet is equal to an MPEG system clock frequency; and
said packet transmitter apparatus further comprises a clock restoration unit operable to restore an MPEG system clock by receiving the MPEG-TS packets and removing, based on the timestamps added to the received TS packets, transmission jitters added to a Program Clock Reference (PCR) when the MPEG-TS packets are transmitted via a network.

33. The packet transmitter apparatus according to claim 31, wherein
said packet generation unit is operable to:
exchange (a) a timestamp added to TS inputted from outside or a timestamp added to a TS played back from said storage media and (b) a timestamp to be added to the TS packets, without changing the contents of timestamps, when Program Clock_Reference of an MPEG stream becomes discontinuous and no discontinuity of a system time base occurs or when no discontinuity of continuity_counter occurs in the TS, in the case where the number of valid bits of the timestamp added to the TS inputted from outside or the number of valid bits of the timestamp added to the TS played back from said storage media is different from the number of valid bits of timestamps added to the respective TS packets; and generate the packets by inserting a TS packet notifying an occurrence of discontinuity in a TS to a point at which the discontinuity has occurred, when Program_Clock_Reference of an MPEG stream becomes discontinuous and discontinuity of a system time base occurs or when discontinuity of continuity counter occurs in the TS.

34. The packet transmitter apparatus according to claim 1, wherein
said transmission unit is operable to transfer N programs using N UDP or TCP ports by assigning the programs composed of the AV data to the UDP or TCP ports respectively, N being an integer of 1 or more.

35. The packet transmitter apparatus according to claim 34, wherein
one of a broadcasting reception tuner and a storage media device which is built in said packet transmitter apparatus is represented in a container format of a UPnP unit, and one of a broadcasting reception channel and a storage program is represented as an item format of said UPnP unit, and present positions of the respective items are mapped onto a URI in a format of <res protocolInfo> of said UPnP unit, in N programs to be assigned to the respective N ports.

36. The packet transmitter apparatus according to claim 35, wherein:
N programs assigned to the respective N ports are represented in a property format of said UPnP unit, in the case where there is a transmission stream from said packet transmitter apparatus to said packet receiver apparatus;
an attribute of a property of the transmission stream includes at least one of: a container type of said tuner; an tuner ID of each container type of said tuner; an ID of a channel selected by said tuner; information of availability including sharing of the transmission stream; a port number of TCP or RTP which a transport layer uses when transmitting the stream; a connection identifier (ID), of a UPnP-AV unit of said packet receiver apparatus, which a ConnectionManager of said UPnP-AV unit of said packet receiver apparatus sets as to an item-related logical connection to a ConnectionManager of a UPnP-AV unit of said packet transmitter apparatus; and a connection ID, of said UPnP-AV unit of said packet transmitter apparatus, which the ConnectionManager of said UPnP-AV unit of said packet transmitter apparatus sets as to an item-related logical connection to the ConnectionManager of said UPnP-AV unit of said packet receiver apparatus; and
said packet transmitter apparatus further comprises
a reception control unit operable to determine (a) whether there is space in a transmission stream and (b) a tuner and a channel of said tuner by referring to a property of the transmission stream, at the time when said packet receiver apparatus selects channel of a tuner inside said packet transmitter apparatus, by functioning as said packet receiver apparatus.

37. The packet transmitter apparatus according to claim 36, wherein
a UPnP-AV unit and a transport unit which uses HTTP or RTP according to TCP or UDP are logically associated with each other based on a logical pair of "a port number of TCP or UDP intended for the transport layer which transmits the stream" and "a connection ID, of said UPnP-AV unit of said packet receiver apparatus, which the ConnectionManager of said UPnP-AV unit of said packet receiver apparatus sets as to an item-related logical connection to the ConnectionManager of said UPnP-AV unit of said packet transmitter apparatus; and a connection ID, of said UPnP-AV unit of said packet transmitter apparatus, which the ConnectionManager of said UPnP-AV unit of said packet transmitter apparatus sets as to an item-related logical connection to the ConnectionManager of said UPnP-AV unit of said packet receiver apparatus".

38. The packet transmitter apparatus according to claim 35, wherein:
N programs assigned to the respective N ports are represented in a property format of said UPnP unit, in the case where there is a transmission stream from said packet transmitter apparatus to said packet receiver apparatus;
an attribute of a property of the transmission stream includes at least one of: a container type of said storage media device; a storage media device ID of each container type of said storage media device; a program ID selected by said storage media device; information of availability including sharing of the transmission stream; a port number of TCP or RTP which a transport layer uses when transmitting the stream; a connection ID of a UPnP-AV unit of said packet receiver apparatus, which a ConnectionManager of said UPnP-AV unit of said packet receiver apparatus sets as to an item-related logical connection to a ConnectionManager of a UPnP-AV unit of said packet transmitter apparatus; and a connection ID, of said UPnP-AV unit of said packet transmitter apparatus, which the ConnectionManager of said UPnP-AV unit of said packet transmitter apparatus sets as to an item-related logical connection to the ConnectionManager of said UPnP-AV unit of said packet receiver apparatus; and
said packet transmitter apparatus further comprises
a reception control unit operable to determine whether there is space in a transmission stream, and a storage media device and a program of said storage media device by referring to a property of the transmission stream at the time of selecting the program of said storage media device inside said packet transmitter apparatus, by functioning as said packet receiver apparatus.

39. The packet transmitter apparatus according to claim 38, wherein
a UPnP-AV unit and a transport unit which uses HTTP or RTP according to TCP or UDP are logically associated with each other based on a logical pair of "a port number of TCP or UDP intended for the transport layer which transmits the stream" and "a connection ID, of said UPnP-AV unit of said packet receiver apparatus, which the ConnectionManager of said UPnP-AV unit of said packet receiver apparatus sets as to an item-related logical connection to the ConnectionManager of said UPnP-AV unit of said packet transmitter apparatus; and a connection ID, of said UPnP-AV unit of said packet transmitter apparatus, which the ConnectionManager of said UPnP-AV unit of said packet transmitter apparatus sets as to an item-related logical connection to the ConnectionManager of said UPnP-AV unit of said packet receiver apparatus".

40. The packet transmitter apparatus according to claim 1, wherein
a UPnP-AV unit and a transport unit which uses HTTP or RTP according to TCP or UDP are logically associated with each other based on a logical pair of "a port number of TCP or UDP intended for the transport layer which transmits the stream" and "a connection ID of a UPnP-AV unit of said packet receiver apparatus, which a ConnectionManager of said UPnP-AV unit of said packet receiver apparatus sets as to an item-related logical connection to a ConnectionManager of a UPnP-AV unit of said packet transmitter apparatus; and a connection ID, of said UPnP-AV unit of said packet transmitter apparatus, which the ConnectionManager of said UPnP-AV unit of said packet transmitter apparatus sets as to an item-related logical connection to the ConnectionManager of said UPnP-AV unit of said packet receiver apparatus".

41. A packet transmitting method of transmitting packet data from a packet transmitter apparatus to a packet receiver apparatus, said method comprising:
an AV data information obtainment step of obtaining AV data including input terminal information indicating a terminal to which the AV data is inputted, data format information indicating data format of the AV data, and attribute information indicating an attribute of the AV data;
a data input step of receiving the AV data and non-AV data;
a transmitting condition setting management step of extracting at least one of charge information, playback control information and copy control information of the AV data from the non-AV data or the AV data, and generating, based on the extracted information, encryption mode information indicating an encryption mode which becomes a condition at the time when the AV data is transmitted;
an encrypted data generation step of generating encrypted data by encrypting, based on transmitting conditions, the AV data received in said data input step, and adding encryption information headers based on the encryption mode information to the encrypted AV data, the transmitting conditions being determined as a combination of the input terminal information, the data format information and the attribute information;
a packet generation step of generating packets by adding packet headers to the encrypted data generated in said encrypted data generation step;
an authentication step of performing authentication processing for encryption or decryption of the AV data with the packet receiver apparatus using Uniform Resource Identifier (URI) information indicating an access position of the AV data in the packet transmitter apparatus or extended URI information;
a transmission protocol determination step of determining a transmission protocol of the AV data for transmission between the packet transmitter apparatus and the packet receiver apparatus, using at least one of the input terminal information, the attribute information and information indicating a transmission mode specified by the packet receiver apparatus; and a transmission step of transmitting packets including the encrypted data generated in said packet generation step to the packet receiver apparatus, according to the transmission protocol determined in said transmission protocol determination step, after the authentication processing with the packet receiver apparatus is completed,
wherein said packet generation step generates the packets according to one of HyperText Transfer Protocol (HTTP), TCP and Internet Protocol (IP).

42. A program, embodied on a computer-readable medium, intended for a packet transmitter apparatus which transmits packet data to a packet receiver apparatus, said program causing a computer to execute a packet transmission method which includes:
an AV data information obtainment step of obtaining AV data including input terminal information indicating a terminal to which the AV data is inputted, data format information indicating data format of the AV data, and attribute information indicating an attribute of the AV data;
a data input step of receiving the AV data and non-AV data;
a transmitting condition setting management step of extracting at least one of charge information, playback control information and copy control information of the AV data from the non-AV data or the AV data, and generating, based on the extracted information, encryption mode information indicating an encryption mode which becomes a condition at the time when the AV data is transmitted;
an encrypted data generation step of generating encrypted data by encrypting, based on transmitting conditions, the AV data received in the data input step, and adding encryption information headers based on the encryption mode information to the encrypted AV data, the transmitting conditions being determined as a combination of the input terminal information, the data format information and the attribute information;
a packet generation step of generating packets by adding packet headers to the encrypted data generated in the encrypted data generation step;
an authentication step of performing authentication processing for encryption or decryption of the AV data with the packet receiver apparatus using Uniform Resource Identifier (URI) information indicating an access position of the AV data in the packet transmitter apparatus or extended URI information;
a transmission protocol determination step of determining a transmission protocol of the AV data for transmission between the packet transmitter apparatus and the packet receiver apparatus, using at least one of the input terminal information, the attribute information and information indicating a transmission mode specified by the packet receiver apparatus; and
a transmission step of transmitting packets including the encrypted data generated in the packet generation step to the packet receiver apparatus, according to the transmission protocol determined in the transmission protocol determination step, after the authentication processing with the packet receiver apparatus is completed,
wherein said packet generation step generates the packets according to one of HyperText Transfer Protocol (HTTP) TCP and Internet Protocol (IP).

* * * * *